(12) United States Patent
Kleinhans et al.

(10) Patent No.: US 12,211,009 B2
(45) Date of Patent: Jan. 28, 2025

(54) METHOD AND SYSTEM OF PROVIDING CLOUD-BASED VEHICLE HISTORY SESSION

(71) Applicant: IDSC Holdings LLC, Kenosha, WI (US)

(72) Inventors: Christopher Kleinhans, Washington Township, MI (US); David P. Shock, Clinton Township, MI (US); James G. Sarnacke, Macomb, MI (US)

(73) Assignee: IDSC Holdings LLC, Kenosha, WI (US)

( * ) Notice: Subject to any disclaimer, the term of this patent is extended or adjusted under 35 U.S.C. 154(b) by 685 days.

(21) Appl. No.: 16/797,984

(22) Filed: Feb. 21, 2020

(65) Prior Publication Data

US 2021/0264383 A1 Aug. 26, 2021

(51) Int. Cl.
*G06Q 10/20* (2023.01)
*G07C 5/00* (2006.01)

(52) U.S. Cl.
CPC ............. *G06Q 10/20* (2013.01); *G07C 5/008* (2013.01)

(58) Field of Classification Search
None
See application file for complete search history.

(56) References Cited

U.S. PATENT DOCUMENTS 5,488,352 A 1/1996 Jasper
5,621,195 A * 4/1997 Taylor ............... G01G 19/02
33/700

(Continued)

FOREIGN PATENT DOCUMENTS

AU 775022 7/2004
CA 2391155 A1 5/2001

(Continued)

OTHER PUBLICATIONS

S. Abdelhamid, H. S. Hassanein and G. Takahara, "Vehicle as a resource (VaaR)," in IEEE Network, vol. 29, No. 1, pp. 12-17, Jan.-Feb. 2015, doi: 10.1109/MNET.2015.7018198. (Year: 2015).*

(Continued)

*Primary Examiner* — Paul R Fisher
(74) *Attorney, Agent, or Firm* — McDonnell Boehnen Hulbert & Berghoff LLP

(57) ABSTRACT

A method includes initiating a vehicle history session (VHS) for a vehicle associated with a particular identifier, generating metadata regarding the VHS, and determining action identifier(s) correlated with a respective action requested during the VHS. The method includes correlating a time stamp with each action identifier. Each time stamp indicates a time when a respective action correlated with an action identifier was performed. The method also includes correlating a detail with each action identifier. Each detail indicates a vehicle response to a respective vehicle data message sent to the vehicle during performance of each respective action. The method includes automatically transmitting a report for the VHS for remote storage. The report includes the metadata regarding the VHS and report input(s). Each report input includes an action identifier from among the action identifier(s), a respective time stamp correlated with the action identifier, and at least a summary of a respective detail.

36 Claims, 52 Drawing Sheets

(56) References Cited

U.S. PATENT DOCUMENTS

| | | | |
|---|---|---|---|
| 6,025,563 A | 2/2000 | Lesesky et al. | |
| 6,064,299 A | 5/2000 | Lesesky et al. | |
| 6,089,588 A | 7/2000 | Lesesky et al. | |
| 6,111,524 A | 8/2000 | Lesesky et al. | |
| 6,127,939 A | 10/2000 | Lesesky et al. | |
| 6,259,354 B1* | 7/2001 | Underwood | G06Q 10/10 |
| | | | 340/10.6 |
| 6,393,031 B1* | 5/2002 | Isomura | H04L 12/5692 |
| | | | 370/444 |
| 6,411,203 B1 | 6/2002 | Lesesky et al. | |
| 6,606,627 B1* | 8/2003 | Guthrie | G06F 16/24547 |
| | | | 707/999.005 |
| 6,608,554 B2 | 8/2003 | Lesesky et al. | |
| 6,744,352 B2 | 6/2004 | Lesesky et al. | |
| 6,946,953 B2 | 9/2005 | Lesesky et al. | |
| 7,015,800 B2 | 3/2006 | Lesesky et al. | |
| 7,040,435 B1 | 5/2006 | Lesesky et al. | |
| 7,102,494 B2 | 9/2006 | Lesesky et al. | |
| 7,117,075 B1 | 10/2006 | Larschan et al. | |
| 7,225,065 B1* | 5/2007 | Hunt | H01R 12/675 |
| | | | 701/33.2 |
| 7,449,993 B2 | 11/2008 | Lesesky et al. | |
| 7,555,378 B2 | 6/2009 | Larschan et al. | |
| 7,817,019 B2 | 10/2010 | Lesesky | |
| 7,881,838 B2 | 2/2011 | Larschan et al. | |
| 7,912,842 B1* | 3/2011 | Bayliss | G06F 16/215 |
| | | | 707/749 |
| 8,032,277 B2 | 10/2011 | Larschan et al. | |
| 8,140,358 B1* | 3/2012 | Ling | G07C 5/008 |
| | | | 340/439 |
| 8,232,871 B2 | 7/2012 | Lesesky | |
| 8,626,377 B2 | 1/2014 | Larschan et al. | |
| 8,680,976 B2 | 3/2014 | Lesesky | |
| 9,042,426 B1* | 5/2015 | Matsumoto | H04W 72/0453 |
| | | | 375/131 |
| 9,159,175 B2 | 10/2015 | Larschan et al. | |
| 9,633,486 B2 | 4/2017 | Lesesky et al. | |
| 9,818,120 B2 | 11/2017 | Lesesky | |
| 10,127,556 B2 | 11/2018 | Lesesky | |
| 10,885,528 B2 | 1/2021 | Lesesky | |
| 10,891,623 B2 | 1/2021 | Lesesky | |
| 11,074,589 B2 | 7/2021 | Lesesky | |
| 11,216,819 B1 | 1/2022 | Lesesky | |
| 11,386,431 B1 | 7/2022 | Lesesky | |
| 11,587,091 B1 | 2/2023 | Lesesky | |
| 11,836,734 B1 | 12/2023 | Lesesky | |
| 2002/0133273 A1* | 9/2002 | Lowrey | G01M 15/04 |
| | | | 340/438 |
| 2003/0040873 A1 | 2/2003 | Lesesky | |
| 2003/0222770 A1 | 12/2003 | Lesesky et al. | |
| 2004/0133319 A1* | 7/2004 | Pillar | G07C 5/085 |
| | | | 701/31.4 |
| 2005/0190045 A1 | 9/2005 | Lesesky et al. | |
| 2006/0047381 A1* | 3/2006 | Nguyen | H04L 43/50 |
| | | | 701/2 |
| 2009/0055044 A1* | 2/2009 | Dienst | G06F 16/24 |
| | | | 701/29.6 |
| 2010/0125661 A1* | 5/2010 | Perala | H04L 43/106 |
| | | | 709/224 |
| 2011/0034201 A1* | 2/2011 | Hamada | H04L 67/12 |
| | | | 455/517 |
| 2012/0046807 A1* | 2/2012 | Ruther | B60R 25/24 |
| | | | 701/2 |
| 2014/0009277 A1 | 1/2014 | Lesesky | |
| 2014/0059017 A1* | 2/2014 | Chaney | G06F 16/284 |
| | | | 707/736 |
| 2014/0121893 A1 | 5/2014 | Larschan et al. | |
| 2016/0306690 A1* | 10/2016 | Underseth | G06F 11/263 |
| 2018/0068311 A1 | 3/2018 | Lesesky | |
| 2018/0108013 A1 | 4/2018 | Lesesky | |
| 2018/0232959 A1* | 8/2018 | Thornburg | H04L 43/0805 |
| 2019/0122217 A1 | 4/2019 | Lesesky | |
| 2020/0380516 A1 | 12/2020 | Lesesky | |
| 2021/0125180 A1 | 4/2021 | Lesesky | |

FOREIGN PATENT DOCUMENTS

| | | | | |
|---|---|---|---|---|
| EP | 1419935 A1 | 5/2004 | | |
| MX | 02004971 A | 9/2002 | | |
| WO | WO2008074008 A2 * | 6/2008 | | |
| WO | WO2010099170 A1 * | 9/2010 | | G06F 11/00 |
| WO | WO2014165147 A1 * | 10/2014 | | F25B 45/00 |
| WO | WO2015100228 A1 * | 7/2015 | | B60R 16/02 |
| WO | WO2015100278 A1 * | 7/2015 | | G06Q 50/30 |

OTHER PUBLICATIONS

M. Amarasinghe, S. Kottegoda, A. L. Arachchi, S. Muramudalige, H. M. N. Dilum Bandara and A. Azeez, "Cloud-based driver monitoring and vehicle diagnostic with OBD2 telematics," 2015 Fifteenth International Conference on Advances in ICT for Emerging Regions (ICTer), 2015, pp. 243-249, (Year: 2015).*

IDSC Holdings LLC, eTechnician LMT Application User's Guide, Revised Oct. 4, 2016 (96 pages, downloaded document did not include p. 8).

IDSC Holdings LLC, eTechnician LMT: Supported Tests and Calibrations, Dec. 19, 2016 (136 pages).

IDSC Holdings LLC, eTechnician accessories, downloaded from the world wide web at https://www.nexiq.com/Product/Detail/856000#Accessories on Feb. 11, 2020 (7 pages).

IDSC Holdings LLC, eTechnician introduction, downloaded from the world wide web at https://www.nexiq.com/Product/Detail/856000#Introduction on Feb. 11, 2020 (6 pages).

IDSC Holdings LLC, eTechnician specifications, downloaded from the world wide web at https://www.nexiq.com/Product/Detail/856000#Specifications on Feb. 11, 2020 (6 pages).

IDSC Holdings LLC, data sheet for eTechnician Application Software Heavy Duty Standard (HDS) and Light and Medium Truck (LMT), Jul. 15, 2016 (2 pages).

* cited by examiner

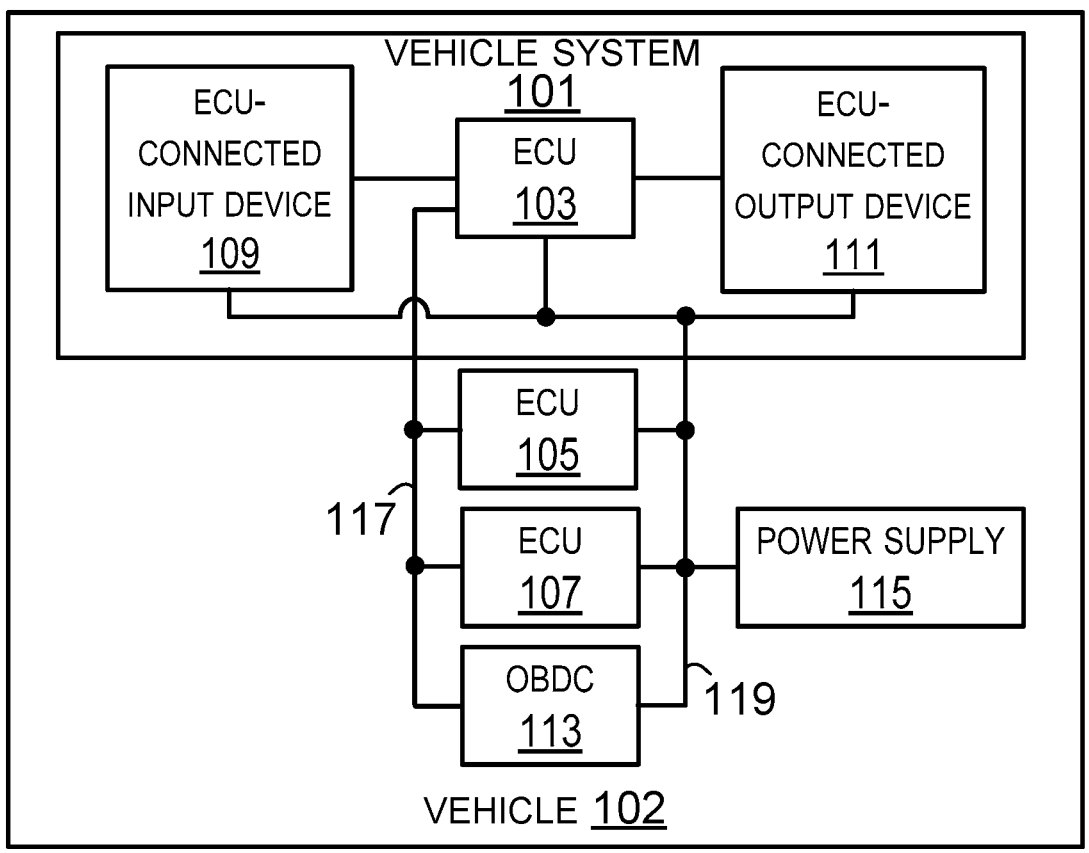
FIG. 3
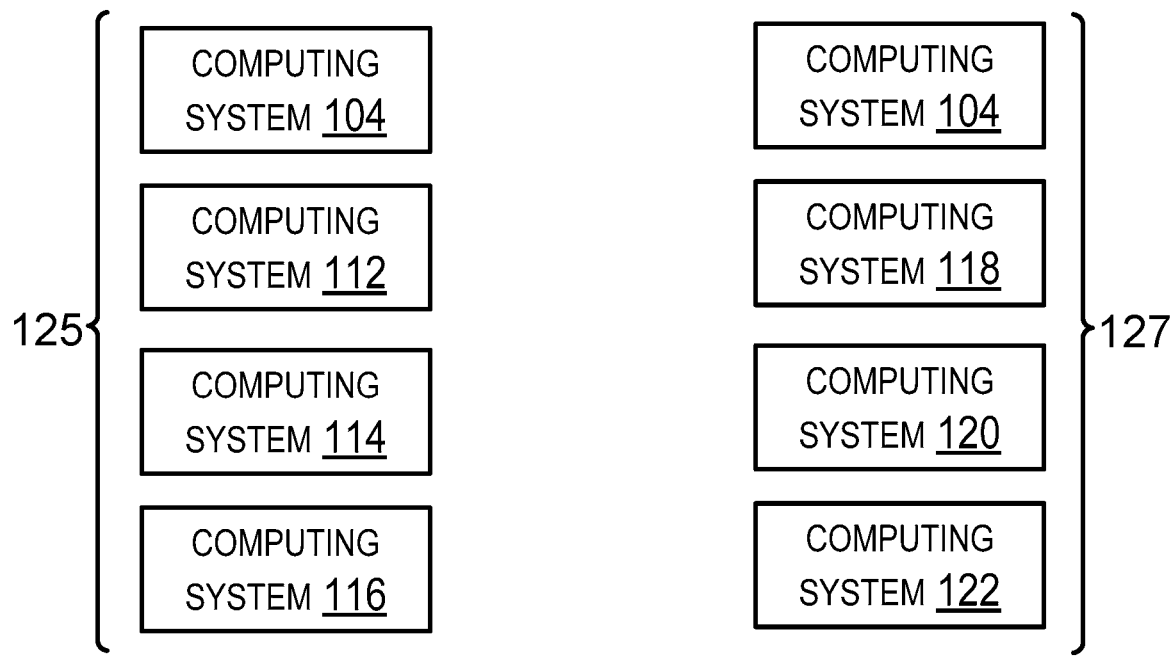
FIG. 4
FIG. 5

```
1.  <?xml version="1.0"?>
2.  <ActivityLogs Vin="1NPTM70X4DD206033" CreationDateTime="1/13/2020 5:16:18 PM" SessionId="bfed06e4-c2fe-44f8-9a16-86e7b2120bb9">
3.    <ActivityLogEntry Type="DetectedComponents" Id="69bbff87-c417-4534-b157-7bf351437e79" CreationDate="1/13/2020 5:16:18 PM">
4.      <Components>
5.        <Component ComponentName="Engine - J1939 - Ch1"/>
6.        <Component ComponentName="Retarder, Exhaust, Engine - J1939 - Ch1"/>
7.      </Components>
8.    </ActivityLogEntry>
9.    <ActivityLogEntry Type="ScannedComponents" Id="b0ec0442-d5c5-400d-883c-8492728 3d331" CreationDate="1/13/2020 5:16:18 PM">
10.     <Components>
11.       <Component ComponentName="Engine - J1939 - Ch1">
12.         <ComponentDetail>VIN: 1NPTM70X4DD206033</ComponentDetail>
13.         <ComponentDetail>
14.         <ComponentDetail>Engine Make: CMMNS</ComponentDetail>
15.         <ComponentDetail>Engine Model: 6B u10D0670000000</ComponentDetail>
            <ComponentDetail>
16.         <ComponentDetail>Product ID: BBN</ComponentDetail>
17.         <ComponentDetail>Engine Type: ISB6.7 CM2250</ComponentDetail>
            <ComponentDetail>
18.         <ComponentDetail>ECM Part Number: 4993120</ComponentDetail>
19.         <ComponentDetail>ECM Code: BZ90005.44</ComponentDetail>
20.         <ComponentDetail>ECM Name: CM2250</ComponentDetail>
            <ComponentDetail>ECM Serial Number: 36399</ComponentDetail>
            <ComponentDetail>Engine Serial Number: 35289237<
            ComponentDetail>
```

| FIG. 37A |
| FIG. 37B |
| FIG. 37C |
| FIG. 37D |
| FIG. 37E |
| FIG. 37F |
| FIG. 37G |
| FIG. 37H |
| FIG. 37I |
| FIG. 37J |
| FIG. 37K |
| FIG. 37L |
| FIG. 37M |
| FIG. 37N |
| FIG. 37O |
| FIG. 37P |
| FIG. 37Q |
| FIG. 37R |
| FIG. 37S |
| FIG. 37T |

21. <ComponentDetail>Vehicle or Equipment Year: \*\*\*\*\*\*\*\*\*</ComponentDetail>
22. <ComponentDetail>OEM Vehicle or Equipment Model: ??????????</ComponentDetail>
23. <ComponentDetail>Customer Name: Customer Came\*\*</ComponentDetail>
24. </Component>
25. <Component ComponentName="Retarder, Exhaust, Engine - J1939 - Ch1"/>
26. </Components>
27. <ScannedFaults>
28. <Component SourceAddress="0" Protocol="J1939" ModuleDescription="Engine - J1939 - Ch1">
29. <Fault Id="222" IdType="OEM Code" State="Active" FmiDescription="Voltage Below Normal, Or Shorted To Low Source" Fmi="" IsPid="False" IsActive="True" Count="1" FaultDescription="Barometric Pressure Sensor Circuit"/>
30. <Fault Id="2274" IdType="OEM Code" State="Active" FmiDescription="Voltage Below Normal, Or Shorted To Low Source" Fmi="" IsPid="False" IsActive="True" Count="1" FaultDescription="Exhaust Gas Recirculation Differential Pressure Sensor Circuit"/>
31. <Fault Id="153" IdType="OEM Code" State="Active" FmiDescription="Voltage Above Normal, Or Shorted To High Source" Fmi="" IsPid="False" IsActive="True" Count="1" FaultDescription="Intake Manifold 1 Temperature Sensor Circuit"/>
32. <Fault Id="2374" IdType="OEM Code" State="Active" FmiDescription="Voltage Below Normal, Or Shorted To Low Source" Fmi="" IsPid="False" IsActive="True" Count="1" FaultDescription="Exhaust Gas Bank 1 Pressure Sensor 1 Circuit"/>
33. <Fault Id="2375" IdType="OEM Code" State="Active" FmiDescription="Voltage Above Normal, Or Shorted To High Source" Fmi="" IsPid="False" IsActive="True" Count="1" FaultDescription="Exhaust Gas Recirculation Temperature Sensor Circuit"/>

FIG. 37B

34. <Fault Id="451" IdType="OEM Code" State="Active" FmiDescription="Voltage Above Normal, Or Shorted To High Source" Fmi="" IsPid="False" IsActive="True" Count="1" FaultDescription="Injector Metering Rail 1 Pressure Sensor Circuit"/>

35. <Fault Id="195" IdType="OEM Code" State="Active" FmiDescription="Voltage Above Normal, Or Shorted To High Source" Fmi="" IsPid="False" IsActive="True" Count="1" FaultDescription="Coolant Level Sensor 1 Circuit"/>

36. <Fault Id="435" IdType="OEM Code" State="Active" FmiDescription="Data Erratic, Intermittent Or Incorrect" Fmi="" IsPid="False" IsActive="True" Count="1" FaultDescription="Engine Oil Rifle Pressure"/>

37. <Fault Id="272" IdType="OEM Code" State="Active" FmiDescription="Voltage Above Normal, Or Shorted To High Source" Fmi="" IsPid="False" IsActive="True" Count="1" FaultDescription="Engine Fuel Pump Pressurizing Assembly 1 Circuit"/>

38. <Fault Id="1239" IdType="OEM Code" State="Active" FmiDescription="Voltage Above Normal, Or Shorted To High Source" Fmi="" IsPid="False" IsActive="True" Count="1" FaultDescription="Accelerator Pedal or Lever Position Sensor 2 Circuit"/>

39. <Fault Id="1844" IdType="OEM Code" State="Active" FmiDescription="Voltage Below Normal, Or Shorted To Low Source" Fmi="" IsPid="False" IsActive="True" Count="1" FaultDescription="Crankcase Pressure Circuit"/>

40. <Fault Id="2636" IdType="OEM Code" State="Active" FmiDescription="Abnormal Update Rate" Fmi="" IsPid="False" IsActive="True" Count="1" FaultDescription="VGT Actuator Driver Circuit"/>

41. <Fault Id="2272" IdType="OEM Code" State="Active" FmiDescription="Voltage Below Normal, Or Shorted To Low Source" Fmi="" IsPid="False" IsActive="True" Count="1" FaultDescription="EGR Valve Position Circuit"/>

FIG. 37C

42. <Fault Id="3597" IdType="OEM Code" State="Active" FmiDescription="Abnormal Update Rate" Fmi="" IsPid="False" IsActive="True" Count="1" FaultDescription="AFT DEF Controller"/>

43. <Fault Id="3232" IdType="OEM Code" State="Active" FmiDescription="Abnormal Update Rate" Fmi="" IsPid="False" IsActive="True" Count="1" FaultDescription="AFT 1 Intake NOx Sensor"/>

44. <Fault Id="2771" IdType="OEM Code" State="Active" FmiDescription="Abnormal Update Rate" Fmi="" IsPid="False" IsActive="True" Count="1" FaultDescription="AFT 1 Outlet NOx Sensor"/>

45. <Fault Id="3314" IdType="OEM Code" State="Active" FmiDescription="Voltage Above Normal, Or Shorted To High Source" Fmi="" IsPid="False" IsActive="True" Count="1" FaultDescription="AFT 1 DOC Intake Temperature Sensor Circuit"/>

46. <Fault Id="3317" IdType="OEM Code" State="Active" FmiDescription="Voltage Above Normal, Or Shorted To High Source" Fmi="" IsPid="False" IsActive="True" Count="1" FaultDescription="AFT 1 DPF Intake Temperature Sensor Circuit"/>

47. <Fault Id="3319" IdType="OEM Code" State="Active" FmiDescription="Voltage Above Normal, Or Shorted To High Source" Fmi="" IsPid="False" IsActive="True" Count="1" FaultDescription="AFT 1 DPF Outlet Temperature Sensor Circuit"/>

48. <Fault Id="1881" IdType="OEM Code" State="Active" FmiDescription="Voltage Below Normal, Or Shorted To Low Source" Fmi="" IsPid="False" IsActive="True" Count="1" FaultDescription="AFT DPF Differential Pressure Sensor Circuit"/>

49. <Fault Id="3134" IdType="OEM Code" State="Active" FmiDescription="Voltage Below Normal, Or Shorted To Low Source" Fmi="" IsPid="False" IsActive="True" Count="1" FaultDescription="AFT 1 DPF Outlet Pressure Sensor Circuit"/>

FIG. 37D

50. <Fault Id="691" IdType="OEM Code" State="Active" FmiDescription="Voltage Above Normal, Or Shorted To High Source" Fmi="" IsPid="False" IsActive="True" Count="1" FaultDescription="Turbocharger 1 Compressor Intake Temperature Circuit"/>
51. <Fault Id="428" IdType="OEM Code" State="Active" FmiDescription="Voltage Above Normal, Or Shorted To High Source" Fmi="" IsPid="False" IsActive="True" Count="1" FaultDescription="Water in Fuel Indicator Sensor Circuit"/>
52. <Fault Id="3142" IdType="OEM Code" State="Active" FmiDescription="Voltage Above Normal, Or Shorted To High Source" Fmi="" IsPid="False" IsActive="True" Count="1" FaultDescription="AFT 1 SCR Intake Temperature Sensor Circuit"/>
53. <Fault Id="3146" IdType="OEM Code" State="Active" FmiDescription="Voltage Above Normal, Or Shorted To High Source" Fmi="" IsPid="False" IsActive="True" Count="1" FaultDescription="AFT 1 SCR Outlet Temperature Sensor Circuit"/>
54. <Fault Id="584" IdType="OEM Code" State="Active" FmiDescription="Voltage Above Normal, Or Shorted To High Source" Fmi="" IsPid="False" IsActive="True" Count="1" FaultDescription="Engine Starter Motor Relay Circuit"/>
55. </Component>
56. <Component SourceAddress="41" Protocol="J1939" ModuleDescription="Retarder, Exhaust, Engine - J1939 - Ch1"/>
57. </ScannedFaults>
58. </ActivityLogEntry>
59. <ActivityLogEntry Type="LifeTripData" Id="59cbcf46-d161-4d65-bd10-5e5c494f27e5" CreationDate="1/13/2020 5:16:56 PM">

FIG. 37E

```
60. <Components>
61. <Component SourceAddress="0" Protocol="J1939" ModuleDescription="Engine - J1939 - Ch1"/>
62.   <Datapoint MetricUnits="" MetricValue="00:00 HH:MM" EnglishUnits="" EnglishValue="00:00 HH:MM" Description="Trip Engine Protection Time Derated"/>
63.   <Datapoint MetricUnits="km" MetricValue="0" EnglishUnits="mi" EnglishValue="0" Description="Trip Vehicle Overspeed 2 Distance"/>
64.   <Datapoint MetricUnits="kph" MetricValue="0" EnglishUnits="mph" EnglishValue="0" Description="Trip Maximum Vehicle Speed"/>
65.   <Datapoint MetricUnits="km" MetricValue="0" EnglishUnits="mi" EnglishValue="0" Description="Trip Drive Distance"/>
66.   <Datapoint MetricUnits="km" MetricValue="0" EnglishUnits="mi" EnglishValue="0" Description="Trip Engine Brake Distance"/>
67.   <Datapoint MetricUnits="hr" MetricValue="0.00" EnglishUnits="hr" EnglishValue="0.00" Description="Trip Fan On Time"/>
68.   <Datapoint MetricUnits="hr" MetricValue="0.00" EnglishUnits="hr" EnglishValue="0.00" Description="Trip Fan Time Due To Air Conditioning Pressure Switch"/>
69.   <Datapoint MetricUnits="L" MetricValue="0.0" EnglishUnits="gal" EnglishValue="0.0" Description="Trip Fuel Consumed for AFT Injection"/>
70.   <Datapoint MetricUnits="hr" MetricValue="0.00" EnglishUnits="hr" EnglishValue="0.00" Description="Trip Fan Time With Vehicle Speed"/>
71.   <Datapoint MetricUnits="L" MetricValue="0.0" EnglishUnits="gal" EnglishValue="0.0" Description="Trip Maximum Accelerator Vehicle Speed Fuel Used"/>
```

FIG. 37F

72. <Datapoint MetricUnits="L" MetricValue="0.0" EnglishUnits="gal" EnglishValue="0.0" Description="Trip Vehicle Overspeed 1 Fuel Used"/>
73. <Datapoint MetricUnits="hr" MetricValue="0.00" EnglishUnits="hr" EnglishValue="0.00" Description="Trip Gear Down Time"/>
74. <Datapoint MetricUnits="km" MetricValue="0" EnglishUnits="mi" EnglishValue="0" Description="Trip Top Gear Distance"/>
75. <Datapoint MetricUnits="" MetricValue="Normal" EnglishUnits="" EnglishValue="Normal" Description="Trip Maximum DPF Soot Load"/>
76. <Datapoint MetricUnits="hr" MetricValue="0.00" EnglishUnits="hr" EnglishValue="0.00" Description="Trip Vehicle Overspeed 1 Time"/>
77. <Datapoint MetricUnits="hr" MetricValue="0.00" EnglishUnits="hr" EnglishValue="0.00" Description="Trip Vehicle Overspeed 2 Time"/>
78. <Datapoint MetricUnits="hr" MetricValue="0.00" EnglishUnits="hr" EnglishValue="0.00" Description="Trip Drive Time"/>
79. <Datapoint MetricUnits="km" MetricValue="0" EnglishUnits="mi" EnglishValue="0" Description="Trip Service Brake Distance"/>
80. <Datapoint MetricUnits="hr" MetricValue="0.00" EnglishUnits="hr" EnglishValue="0.00" Description="Trip Maximum Accelerator Vehicle Speed Time"/>
81. <Datapoint MetricUnits="hr" MetricValue="0.00" EnglishUnits="hr" EnglishValue="0.00" Description="Trip Fan Time Without Vehicle Speed"/>
82. <Datapoint MetricUnits="" MetricValue="0" EnglishUnits="" EnglishValue="0" Description="Trip Number of Idle Shutdown Overrides"/><Datapoint MetricUnits="RPM" MetricValue="0" EnglishUnits="RPM" EnglishValue="0" Description="Trip Average Engine Speed"/>

FIG. 37G

83. `<Datapoint MetricUnits="" MetricValue="0" EnglishUnits="" EnglishValue="0" Description="Trip Service Brake Actuations"/>`
84. `<Datapoint MetricUnits="hr" MetricValue="0.00" EnglishUnits="hr" EnglishValue="0.00" Description="Trip Out of Gear Coast Time"/>`
85. `<Datapoint MetricUnits="kPa" MetricValue="0.0" EnglishUnits="inHg" EnglishValue="0.0" Description="Trip Maximum DPF Differential Pressure"/>`
86. `<Datapoint MetricUnits="km" MetricValue="0" EnglishUnits="mi" EnglishValue="0" Description="Trip Engine Distance"/>`
87. `<Datapoint MetricUnits="hr" MetricValue="0.00" EnglishUnits="hr" EnglishValue="0.00" Description="Trip Fan Time Due To Engine Conditions"/>`
88. `<Datapoint MetricUnits="" MetricValue="41" EnglishUnits="" EnglishValue="41" Description="Trip Keyswitch Cycles"/>`
89. `<Datapoint MetricUnits="hr" MetricValue="0.00" EnglishUnits="hr" EnglishValue="0.00" Description="Trip Engine Run Time"/><Datapoint MetricUnits="hr" MetricValue="0.00" EnglishUnits="hr" EnglishValue="0.00" Description="Trip Full Load Operation Time"/>`
90. `<Datapoint MetricUnits="kph" MetricValue="0" EnglishUnits="mph" EnglishValue="0" Description="Trip Average Vehicle Speed"/>`
91. `<Datapoint MetricUnits="L" MetricValue="0.0" EnglishUnits="gal" EnglishValue="0.0" Description="Trip Fuel Used"/>`
92. `<Datapoint MetricUnits="hr" MetricValue="0.00" EnglishUnits="hr" EnglishValue="0.00" Description="Trip Service Brake Time"/>`
93. `<Datapoint MetricUnits="" MetricValue="0" EnglishUnits="" EnglishValue="0" Description="Trip Number of Sudden Decelerations"/>`

FIG. 37H

94. <Datapoint MetricUnits="L" MetricValue="0.0" EnglishUnits="gal" EnglishValue="0.0" Description="Trip Idle Fuel Used"/>
95. <Datapoint MetricUnits="km/l" MetricValue="0.00" EnglishUnits="mpg" EnglishValue="0.00" Description="Trip Drive Average Fuel Economy"/>
96. <Datapoint MetricUnits="" MetricValue="0" EnglishUnits="" EnglishValue="0" Description="Trip Engine Brake Activations"/><Datapoint MetricUnits="km" MetricValue="0" EnglishUnits="mi" EnglishValue="0" Description="Trip ECM Distance"/><Datapoint MetricUnits="" MetricValue="0" EnglishUnits="" EnglishValue="0" Description="Trip Number of Idle Shutdowns"/>
97. <Datapoint MetricUnits="hr" MetricValue="0.00" EnglishUnits="hr" EnglishValue="0.00" Description="Trip Cruise Control Time"/>
98. <Datapoint MetricUnits="kWh" MetricValue="0.00" EnglishUnits="bhp" EnglishValue="0.00" Description="Trip Drive Average Power"/>
99. <Datapoint MetricUnits="km/l" MetricValue="0.00" EnglishUnits="mpg" EnglishValue="0.00" Description="Trip Average Fuel Economy"/>
100. <Datapoint MetricUnits="" MetricValue="0" EnglishUnits="" EnglishValue="0" Description="Trip Engine Protection Shutdown Manual Override"/>
101. <Datapoint MetricUnits="L" MetricValue="0.0" EnglishUnits="gal" EnglishValue="0.0" Description="Trip Coast Fuel Used"/>
102. <Datapoint MetricUnits="km" MetricValue="0" EnglishUnits="mi" EnglishValue="0" Description="Trip Cruise Control Distance"/>
103. <Datapoint MetricUnits="RPM" MetricValue="0" EnglishUnits="RPM" EnglishValue="0" Description="Trip Maximum Engine Speed"/>
104. <Datapoint MetricUnits="km" MetricValue="0" EnglishUnits="mi" EnglishValue="0" Description="Trip Coast Distance"/>

FIG. 37I

105. <Datapoint MetricUnits="" MetricValue="0" EnglishUnits="" EnglishValue="0" Description="Trip Number of Incomplete Regenerations"/>
106. <Datapoint MetricUnits="L" MetricValue="0.0" EnglishUnits="gal" EnglishValue="0.0" Description="Trip Cruise Control Fuel Used"/><Datapoint MetricUnits="L" MetricValue="0.0" EnglishUnits="gal" EnglishValue="0.0" Description="Trip Top Gear Fuel Used"/>
107. <Datapoint MetricUnits="%" MetricValue="0" EnglishUnits="%" EnglishValue="0" Description="Trip Drive Average Load"/>
108. <Datapoint MetricUnits="hr" MetricValue="0.00" EnglishUnits="hr" EnglishValue="0.00" Description="Trip Top Gear Time"/>
109. <Datapoint MetricUnits="hr" MetricValue="0.00" EnglishUnits="hr" EnglishValue="0.00" Description="Trip Idle Time"/>
110. <Datapoint MetricUnits="" MetricValue="0" EnglishUnits="" EnglishValue="0" Description="Trip Out of Gear Coasts"/>
111. <Datapoint MetricUnits="RPM" MetricValue="0" EnglishUnits="RPM" EnglishValue="0" Description="Trip Drive Average Engine Speed"/>
112. <Datapoint MetricUnits="" MetricValue="0" EnglishUnits="" EnglishValue="0" Description="Trip Number of Complete Regenerations"/>
113. <Datapoint MetricUnits="L" MetricValue="0.0" EnglishUnits="gal" EnglishValue="0.0" Description="Trip Gear Down Fuel Used"/>
114. <Datapoint MetricUnits="km" MetricValue="0" EnglishUnits="mi" EnglishValue="0" Description="Trip Gear Down Distance"/>
115. <Datapoint MetricUnits="hr" MetricValue="0.00" EnglishUnits="hr" EnglishValue="0.00" Description="Trip Fan Time Due To Fan Control Switch"/>

FIG. 37J

116. <Datapoint MetricUnits="km" MetricValue="0" EnglishUnits="mi" EnglishValue="0" Description="Trip Vehicle Overspeed 1 Distance"/>
117. <Datapoint MetricUnits="L" MetricValue="0.0" EnglishUnits="gal" EnglishValue="0.0" Description="Trip Drive Fuel Used"/>
118. <Datapoint MetricUnits="km" MetricValue="0" EnglishUnits="mi" EnglishValue="0" Description="Trip Maximum Accelerator Vehicle Speed Distance"/>
119. <Datapoint MetricUnits="%" MetricValue="0" EnglishUnits="%" EnglishValue="0" Description="Trip Average Engine Load"/><Datapoint MetricUnits="L" MetricValue="0.0" EnglishUnits="gal" EnglishValue="0.0" Description="Trip Vehicle Overspeed 2 Fuel Used"/>
120. <Datapoint MetricUnits="L" MetricValue="0.0" EnglishUnits="gal" EnglishValue="0.0" Description="Trip AFT DEF Used"/>
121. <Datapoint MetricUnits="hr" MetricValue="0.00" EnglishUnits="hr" EnglishValue="0.00" Description="Trip Coast Time"/>
122. <Datapoint MetricUnits="hr" MetricValue="0.00" EnglishUnits="hr" EnglishValue="0.00" Description="Trip Engine Brake Time"/>
123. <Datapoint MetricUnits="" MetricValue="0" EnglishUnits="" EnglishValue="0" Description="Number Of Trip Resets"/>
124. <Datapoint MetricUnits="" MetricValue="161:59:06" EnglishUnits="" EnglishValue="161:59:06" Description="ECM Time"/>
125. </Component>

FIG. 37K

126. <Component SourceAddress="41" Protocol="J1939" ModuleDescription="Retarder, Exhaust, Engine - J1939 - Ch1"/>
127. </Components>
128. </ActivityLogEntry>
129. <ActivityLogEntry Type="ClearFaults" Id="41343936-7291-4b4d-b182-ac4f1ea4de6e" CreationDate="1/13/2020 5:17:57 PM">
130. <ClearFaults>
131. <Component SourceAddress="0" Protocol="J1939" ModuleDescription="Engine - J1939 - Ch1">
132. <Fault Id="222" IdType="OEM Code" State="Active" FmiDescription="Voltage Below Normal, Or Shorted To Low Source" Fmi="" IsPid="False" IsActive="True" Count="1" FaultDescription="Barometric Pressure Sensor Circuit"/>
133. <Fault Id="2274" IdType="OEM Code" State="Active" FmiDescription="Voltage Below Normal, Or Shorted To Low Source" Fmi="" IsPid="False" IsActive="True" Count="1" FaultDescription="Exhaust Gas Recirculation Differential Pressure Sensor Circuit"/>
134. <Fault Id="153" IdType="OEM Code" State="Active" FmiDescription="Voltage Above Normal, Or Shorted To High Source" Fmi="" IsPid="False" IsActive="True" Count="1" FaultDescription="Intake Manifold 1 Temperature Sensor Circuit"/>
135. <Fault Id="2374" IdType="OEM Code" State="Active" FmiDescription="Voltage Below Normal, Or Shorted To Low Source" Fmi="" IsPid="False" IsActive="True" Count="1" FaultDescription="Exhaust Gas Bank 1 Pressure Sensor 1 Circuit"/>
136. <Fault Id="2375" IdType="OEM Code" State="Active" FmiDescription="Voltage Above Normal, Or Shorted To High Source" Fmi="" IsPid="False" IsActive="True" Count="1" FaultDescription="Exhaust Gas Recirculation Temperature Sensor Circuit"/>

FIG. 37L

137. <Fault Id="451" IdType="OEM Code" State="Active" FmiDescription="Voltage Above Normal, Or Shorted To High Source" Fmi="" IsPid="False" IsActive="True" Count="1" FaultDescription="Injector Metering Rail 1 Pressure Sensor Circuit"/>

138. <Fault Id="435" IdType="OEM Code" State="Active" FmiDescription="Data Erratic, Intermittent Or Incorrect" Fmi="" IsPid="False" IsActive="True" Count="1" FaultDescription="Engine Oil Rifle Pressure"/>

139. <Fault Id="272" IdType="OEM Code" State="Active" FmiDescription="Voltage Above Normal, Or Shorted To High Source" Fmi="" IsPid="False" IsActive="True" Count="1" FaultDescription="Engine Fuel Pump Pressurizing Assembly 1 Circuit"/>

140. <Fault Id="1239" IdType="OEM Code" State="Active" FmiDescription="Voltage Above Normal, Or Shorted To High Source" Fmi="" IsPid="False" IsActive="True" Count="1" FaultDescription="Accelerator Pedal or Lever Position Sensor 2 Circuit"/>

141. <Fault Id="1844" IdType="OEM Code" State="Active" FmiDescription="Voltage Below Normal, Or Shorted To Low Source" Fmi="" IsPid="False" IsActive="True" Count="1" FaultDescription="Crankcase Pressure Circuit"/>

142. <Fault Id="2636" IdType="OEM Code" State="Active" FmiDescription="Abnormal Update Rate" Fmi="" IsPid="False" IsActive="True" Count="1" FaultDescription="VGT Actuator Driver Circuit"/>

143. <Fault Id="2272" IdType="OEM Code" State="Active" FmiDescription="Voltage Below Normal, Or Shorted To Low Source" Fmi="" IsPid="False" IsActive="True" Count="1" FaultDescription="EGR Valve Position Circuit"/>

144. <Fault Id="3597" IdType="OEM Code" State="Active" FmiDescription="Abnormal Update Rate" Fmi="" IsPid="False" IsActive="True" Count="1" FaultDescription="AFT DEF Controller"/>

FIG. 37M

145. <Fault Id="3232" IdType="OEM Code" State="Active" FmiDescription="Abnormal Update Rate" Fmi="" IsPid="False" IsActive="True" Count="1" FaultDescription="AFT 1 Intake NOx Sensor"/>

146. <Fault Id="2771" IdType="OEM Code" State="Active" FmiDescription="Abnormal Update Rate" Fmi="" IsPid="False" IsActive="True" Count="1" FaultDescription="AFT 1 Outlet NOx Sensor"/><Fault Id="3314" IdType="OEM Code" State="Active" FmiDescription="Voltage Above Normal, Or Shorted To High Source" Fmi="" IsPid="False" IsActive="True" Count="1" FaultDescription="AFT 1 DOC Intake Temperature Sensor Circuit"/>

147. <Fault Id="3317" IdType="OEM Code" State="Active" FmiDescription="Voltage Above Normal, Or Shorted To High Source" Fmi="" IsPid="False" IsActive="True" Count="1" FaultDescription="AFT 1 DPF Intake Temperature Sensor Circuit"/>

148. <Fault Id="3319" IdType="OEM Code" State="Active" FmiDescription="Voltage Above Normal, Or Shorted To High Source" Fmi="" IsPid="False" IsActive="True" Count="1" FaultDescription="AFT 1 DPF Outlet Temperature Sensor Circuit"/>

149. <Fault Id="1881" IdType="OEM Code" State="Active" FmiDescription="Voltage Below Normal, Or Shorted To Low Source" Fmi="" IsPid="False" IsActive="True" Count="1" FaultDescription="AFT DPF Differential Pressure Sensor Circuit"/>

150. <Fault Id="3134" IdType="OEM Code" State="Active" FmiDescription="Voltage Below Normal, Or Shorted To Low Source" Fmi="" IsPid="False" IsActive="True" Count="1" FaultDescription="AFT 1 DPF Outlet Pressure Sensor Circuit"/>

151. <Fault Id="691" IdType="OEM Code" State="Active" FmiDescription="Voltage Above Normal, Or Shorted To High Source" Fmi="" IsPid="False" IsActive="True" Count="1" FaultDescription="Turbocharger 1 Compressor Intake Temperature Circuit"/>

FIG. 37N

152. <Fault Id="195" IdType="OEM Code" State="Active" FmiDescription="Voltage Above Normal, Or Shorted To High Source" Fmi="" IsPid="" IsActive="True" Count="1" FaultDescription="Coolant Level Sensor 1 Circuit"/>
153. <Fault Id="428" IdType="OEM Code" State="Active" FmiDescription="Voltage Above Normal, Or Shorted To High Source" Fmi="" IsPid="" IsActive="True" Count="1" FaultDescription="Water in Fuel Indicator Sensor Circuit"/>
154. <Fault Id="3142" IdType="OEM Code" State="Active" FmiDescription="Voltage Above Normal, Or Shorted To High Source" Fmi="" IsPid="" IsActive="True" Count="1" FaultDescription="AFT 1 SCR Intake Temperature Sensor Circuit"/>
155. <Fault Id="3146" IdType="OEM Code" State="Active" FmiDescription="Voltage Above Normal, Or Shorted To High Source" Fmi="" IsPid="" IsActive="True" Count="1" FaultDescription="AFT 1 SCR Outlet Temperature Sensor Circuit"/>
156. </Component>
157. <Component SourceAddress="41" Protocol="J1939" ModuleDescription="Retarder, Exhaust, Engine - J1939 - Ch1"/>
158. </ClearFaults>
159. </ActivityLogEntry>
160. <ActivityLogEntry Type="ReceivedFault" Id="07cb7cd9-6d2b-43e9-ae74-5db99645675b" CreationDate="11/28/2018 12:30:21 PM">
161. <ReceivedFaults>
162. <Component SourceAddress="0" Protocol="J1939" ModuleDescription="Engine - J1939 - Ch1"/>
163. <Fault Id="986" IdType="SPN" State="Inactive" FmiDescription="" Fmi="9" IsPid="False" IsActive="False" Count="" FaultDescription="J1939 CM1 Message Is Missing" IsNew="False"/>

FIG. 37O

164. <Fault Id="2025" IdType="SPN" State="Inactive" FmiDescription="" Fmi="9" IsPid="False" IsActive="False" Count="" FaultDescription="J1939 Message Is Missing From Source Address 25 (dec)" IsNew="False"/>
165. <Fault Id="111" IdType="SPN" State="Inactive" FmiDescription="" Fmi="1" IsPid="False" IsActive="False" Count="" FaultDescription="Coolant Level Very Low" IsNew="False"/>
166. <Fault Id="168" IdType="SPN" State="Inactive" FmiDescription="" Fmi="18" IsPid="False" IsActive="False" Count="" FaultDescription="Battery Voltage Low" IsNew="False"/>
167. <Fault Id="84" IdType="SPN" State="Inactive" FmiDescription="" Fmi="4" IsPid="False" IsActive="False" Count="" FaultDescription="Vehicle Speed Sensor Circuit Failed Low" IsNew="False"/>
168. <Fault Id="3464" IdType="SPN" State="Inactive" FmiDescription="" Fmi="31" IsPid="False" IsActive="False" Count="" FaultDescription="ITV H Bridge 1 Ciruit - Open Load" IsNew="False"/>
169. <Fault Id="111" IdType="SPN" State="Inactive" FmiDescription="" Fmi="19" IsPid="False" IsActive="False" Count="" FaultDescription="Coolant Level Low (CAN)" IsNew="False"/>
170. <Fault Id="168" IdType="SPN" State="Inactive" FmiDescription="" Fmi="1" IsPid="False" IsActive="False" Count="" FaultDescription="Battery Voltage Low" IsNew="False"/>
171. <Fault Id="1231" IdType="SPN" State="Inactive" FmiDescription="" Fmi="9" IsPid="False" IsActive="False" Count="" FaultDescription="ACM Message Not Received Or Has Stopped Arriving" IsNew="False"/>

FIG. 37P

172. <Fault Id="168" IdType="SPN" State="Inactive" FmiDescription="" Fmi="0" IsPid="False" IsActive="False" Count="" FaultDescription="Battery Voltage High" IsNew="False"/>

173. <Fault Id="4364" IdType="SPN" State="Inactive" FmiDescription="" Fmi="18" IsPid="False" IsActive="False" Count="" FaultDescription="SCR NOX Coversion Efficiency Low" IsNew="False"/>

174. <Fault Id="4364" IdType="SPN" State="Inactive" FmiDescription="" Fmi="1" IsPid="False" IsActive="False" Count="" FaultDescription="SCR NOX Coversion Efficiency Very Low" IsNew="False"/>

175. <Fault Id="3364" IdType="SPN" State="Inactive" FmiDescription="" Fmi="2" IsPid="False" IsActive="False" Count="" FaultDescription="Improper DEF Quality" IsNew="False"/>

176. <Fault Id="3364" IdType="SPN" State="Inactive" FmiDescription="" Fmi="17" IsPid="False" IsActive="False" Count="" FaultDescription="Improper DEF Quality Warning" IsNew="False"/>

177. <Fault Id="3364" IdType="SPN" State="Inactive" FmiDescription="" Fmi="1" IsPid="False" IsActive="False" Count="" FaultDescription="Improper DEF Quality Final Warning" IsNew="False"/>

FIG. 37Q

178. </Component>
179. <Component SourceAddress="11" Protocol="J1939" ModuleDescription="Brakes - System ECU - J1939 - Ch1"/>
180. <Component SourceAddress="136" Protocol="J1708" ModuleDescription="Brakes, Power Unit - J1708">
181. <Fault Id="251" IdType="SID" State="Inactive" FmiDescription="Voltage Above Normal Or Shorted High" Fmi="3" IsPid="False" IsActive="False" Count="4" FaultDescription="Power Supply" IsNew="True"/>
182. </Component>
183. <Component SourceAddress="206" Protocol="J1708" ModuleDescription="Base Unit (Radio Gateway to Fixed End) - J1708"/>
184. <Component SourceAddress="248" Protocol="J1708" ModuleDescription="Forward Road Image Processor - J1708"/><Component SourceAddress="33" Protocol="J1939" ModuleDescription="Body ECU - J1939 - Ch1">
185. <Fault Id="521905" IdType="SPN" State="Active" FmiDescription="Current below Normal or Open Circuit" Fmi="5" IsPid="False" IsActive="True" Count="1" FaultDescription="Undefined" IsNew="False"/>
186. </Component>
187. <Component SourceAddress="49" Protocol="J1939" ModuleDescription="Cab ECU - Primary - J1939 - Ch1"/>
188. <Component SourceAddress="25" Protocol="J1939" ModuleDescription="Cab Climate Control - J1939 - Ch1"/>
189. <Component SourceAddress="33" Protocol="J1939" ModuleDescription="Body ECU - J1939 - Ch2">

FIG. 37R

190. <Fault Id="521905" IdType="SPN" State="Active" FmiDescription="Current below Normal or Open Circuit" Fmi="5" IsPid="False" IsActive="True" Count="1" FaultDescription="Undefined" IsNew="False"/>
191. </Component>
192. <Component SourceAddress="23" Protocol="J1939" ModuleDescription="Instrument Cluster - J1939 - Ch1"/>
193. </ReceivedFaults>
194. </ActivityLogEntry>
195. <ActivityLogEntry Type="FullReport" Id="57bbf92f-dc2a-47af-925d-5a605b99160b" CreationDate="1/13/2020 5:18:14 PM">
196. <FileName>a9857b4f-3921-42fd-9dcb-adafb32ba5f7.pdf</FileName>
197. </ActivityLogEntry>
198. <ActivityLogEntry Type="FullReport" Id="4af3eca1-03fa-4f7c-ae32-220a8761f6d8" CreationDate="1/13/2020 5:18:18 PM">
199. <FileName>56716ec0-b3ea-4ef7-b8ab-9d005e17489b.pdf</FileName>
200. </ActivityLogEntry>
201. <ActivityLogEntry Type="LogNote" Id="0c122fef-96c5-4c31-b3ec-6ac5228037ea" CreationDate="1/13/2020 5:18:33 PM"><LogNote>5:18 pm</LogNote>
202. </ActivityLogEntry>
203. <ActivityLogEntry Type="FullReport" Id="c4398b71-e0f8-4642-b09e-75136ef2810f" CreationDate="1/13/2020 5:18:40 PM">
204. <FileName>020803ac-823a-46f9-8428-2edfea87e434.pdf</FileName>
205. </ActivityLogEntry>
206. <ActivityLogEntry Type="FullReport" Id="05d25877-38fc-44af-aab0-a2dd0d80ba51" CreationDate="1/13/2020 5:18:52 PM">

FIG. 37S

```
207.      <FileName>eb70aa1a-2381-4cb2-bfa4-bdf0c96efbb5.pdf</FileName>
208.    </ActivityLogEntry>
209.    <ActivityLogEntry Type="StartRecording" Id="2e906b4a-af1e-4552-9b17-
        19726c05bf96" CreationDate="8/7/2019 2:11:39 PM"/>
210.    <ActivityLogEntry Type="StartRecording" Id="2e906b4a-af1e-4552-9b17-
        19726c05bf96" CreationDate="8/7/2019 2:13:39 PM"/>
211.    <ActivityLogEntry Type="StopRecording" Id="0aaf735e-3e41-4ba8-b6d3-
        5e4f9b8ec257" CreationDate="8/7/2019 2:12:30 PM">
212.      <Recording Duration="00:50" FileName="d304915d-53f9-48d9-86bf-
        e002190aef06.rec"/></ActivityLogEntry>
213.    <ActivityLogEntry Type="StopRecording" Id="0aaf735e-3e41-4ba8-b6d3-
        5e4f9b8ec257" CreationDate="8/7/2019 2:14:30 PM"><Recording Duration="00:50"
        FileName="d304915d-53f9-48d9-86bf-e002190aef06.rec"/>
214.    </ActivityLogEntry>
215.  </ActivityLogs>
```

FIG. 37T

METHOD AND SYSTEM OF PROVIDING CLOUD-BASED VEHICLE HISTORY SESSION

BACKGROUND

There are nefarious individuals and/or groups of individuals that use computing systems for arguably unethical, unlawful, and/or unsavory reasons. These uses can include breaching a database and stealing information, spoofing information, phishing scams, hijacking user accounts, uploading malware and computer viruses, to name but a few. A large amount of resources is expended to try to prevent the nefarious individuals and groups from wreaking havoc on certain computing systems.

Vehicle technicians operate computing systems that are configured to communicate with a vehicle. Original equipment manufacturers and after-market providers are examples of vehicle information service providers that can operate computing systems to provide vehicle technicians with data that can be used to service a vehicle. The vehicle technicians have a desire to receive service information that can be relied upon when servicing a vehicle. The vehicle service information providers have an interest in providing vehicle technicians with reliable service information. A vehicle information service provider would increase its ability to provide reliable service information by not receiving vehicle service information unless it has been confirmed that the vehicle service information is from a valid and/or known vehicle.

Furthermore, a vehicle technician could potentially fix a vehicle quicker and more reliably if the vehicle technician could access a record of the vehicle, such as a record showing work previously performed on the vehicle at a repair shop where the vehicle technician is located or at a different vehicle shop.

OVERVIEW

In a first implementation, a method is provided. The method includes initiating, by a computing system, a first vehicle history session for a vehicle associated with a particular vehicle identification number; generating, by the computing system, metadata regarding the first vehicle history session; determining, by the computing system, one or more action identifiers, wherein each action identifier is correlated with a respective action requested by the computing system during the first vehicle history session; correlating, by the computing system, a respective time stamp with each of the one or more action identifiers, wherein each respective time stamp indicates a time when a respective action correlated with each of the one or more action identifiers was performed; correlating, by the computing system, a respective detail with each of the one or more action identifiers, wherein each detail indicates a vehicle response to a respective vehicle data message sent to the vehicle during performance of each respective action; and automatically transmitting, by the computing system, a report for the first vehicle history session over an off-board communication network for storage at a remote cloud-based computer-readable media, wherein the report includes the metadata regarding the first vehicle history session and one or more report inputs, wherein each report input includes an action identifier from among the one or more action identifiers, a respective time stamp correlated with the action identifier, and at least a summary of the respective detail correlated with the action identifier.

In a second implementation, a computing system is provided. The computing system includes one or more processors and computer readable data storage storing executable instructions. Execution of the executable instructions by the one or more processors causes the computing system to perform functions. The functions comprise initiating, by the computing system, a first vehicle history session for a vehicle associated with a particular vehicle identification number; generating, by the computing system, metadata regarding the first vehicle history session; determining, by the computing system, one or more action identifiers, wherein each action identifier is correlated with a respective action requested by the computing system during the first vehicle history session; correlating, by the computing system, a respective time stamp with each of the one or more action identifiers, wherein each respective time stamp indicates a time when a respective action correlated with each of the one or more action identifiers was performed; correlating, by the computing system, a respective detail with each of the one or more action identifiers, wherein each detail indicates a vehicle response to a respective vehicle data message sent to the vehicle during performance of each respective action; and automatically transmitting, by the computing system, a report for the first vehicle history session over an off-board communication network for storage at a remote cloud-based computer-readable media, wherein the report includes the metadata regarding the first vehicle history session and one or more report inputs, wherein each report input includes an action identifier from among the one or more action identifiers, a respective time stamp correlated with the action identifier, and at least a summary of the respective detail correlated with the action identifier.

In a third implementation, a computer-readable medium is provided. The computer readable medium has stored therein instructions executable by one or more processors to cause a computing system to perform functions. The functions include initiating, by the computing system, a first vehicle history session for a vehicle associated with a particular vehicle identification number; generating, by the computing system, metadata regarding the first vehicle history session; determining, by the computing system, one or more action identifiers, wherein each action identifier is correlated with a respective action requested by the computing system during the first vehicle history session; correlating, by the computing system, a respective time stamp with each of the one or more action identifiers, wherein each respective time stamp indicates a time when a respective action correlated with each of the one or more action identifiers was performed; correlating, by the computing system, a respective detail with each of the one or more action identifiers, wherein each detail indicates a vehicle response to a respective vehicle data message sent to the vehicle during performance of each respective action; and automatically transmitting, by the computing system, a report for the first vehicle history session over an off-board communication network for storage at a remote cloud-based computer-readable media, wherein the report includes the metadata regarding the first vehicle history session and one or more report inputs, wherein each report input includes an action identifier from among the one or more action identifiers, a respective time stamp correlated with the action identifier, and at least a summary of the respective detail correlated with the action identifier.

In a fourth implementation, a computing system is provided. The computing system includes means for initiating a first vehicle history session for a vehicle associated with a particular vehicle identification number; means for generating metadata regarding the first vehicle history session; means for determining one or more action identifiers, wherein each action identifier is correlated with a respective action requested by the computing system during the first vehicle history session; means for correlating a respective time stamp with each of the one or more action identifiers, wherein each respective time stamp indicates a time when a respective action correlated with each of the one or more action identifiers was performed; means for correlating a respective detail with each of the one or more action identifiers, wherein each detail indicates a vehicle response to a respective vehicle data message sent to the vehicle during performance of each respective action; and means for automatically transmitting a report for the first vehicle history session over an off-board communication network for storage at a remote cloud-based computer-readable media, wherein the report includes the metadata regarding the first vehicle history session and one or more report inputs, wherein each report input includes an action identifier from among the one or more action identifiers, a respective time stamp correlated with the action identifier, and at least a summary of the respective detail correlated with the action identifier.

Other implementations will become apparent to those of ordinary skill in the art by reading the following detailed description, with reference where appropriate to the accompanying drawings.

BRIEF DESCRIPTION OF THE DRAWINGS

Example implementations are described herein with reference to the drawings.

FIG. 3 is a block diagram of an example vehicle in accordance with the example implementations.

FIG. 4, FIG. 5, and FIG. 6 are diagrams of different example groups of computing systems in accordance with the example implementations.

FIG. 37 shows an arrangement of FIG. 37A, FIG. 37B, FIG. 37C, FIG. 37D, FIG. 37E, FIG. 37F, FIG. 37G, FIG. 37H, FIG. 37I, FIG. 37J, FIG. 37K, FIG. 37L, FIG. 37M, FIG. 37N, FIG. 37O, FIG. 37P, FIG. 37Q, FIG. 37R, FIG. 37S, and FIG. 37T, which extend across twenty drawing sheets. FIG. 37A, FIG. 37B, FIG. 37C, FIG. 37D, FIG. 37E, FIG. 37F, FIG. 37G, FIG. 37H, FIG. 37I, FIG. 37J, FIG. 37K, FIG. 37L, FIG. 37M, FIG. 37N, FIG. 37O, FIG. 37P, FIG. 37Q, FIG. 37R, FIG. 37S, and FIG. 37T show an example vehicle history session file.

Figure 1:
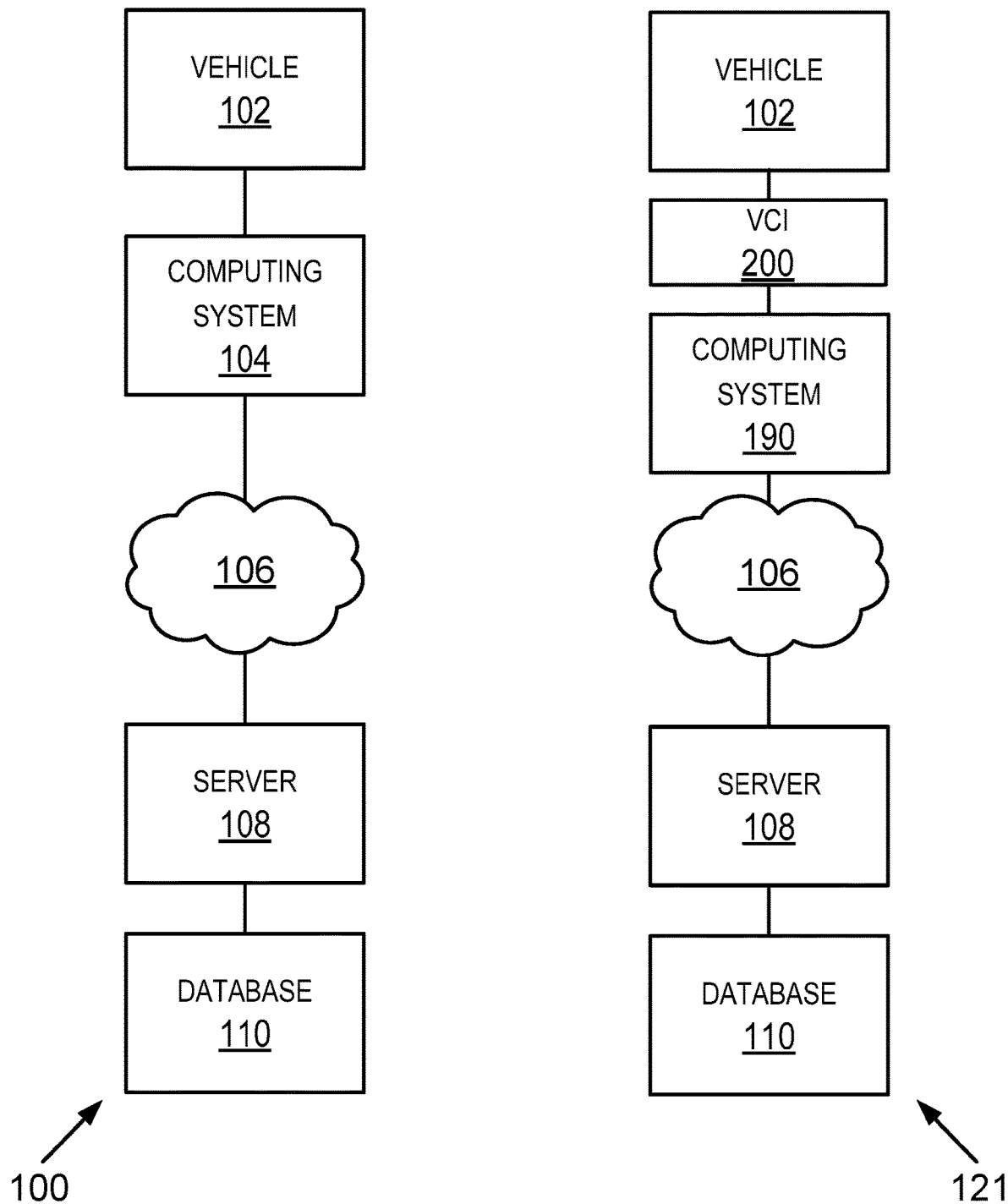
FIG. 1 shows block diagrams of network arrangements in accordance with the example implementations.

All the figures are schematic, not necessarily to scale, and generally only show parts which are necessary to elucidate example embodiments, wherein other parts may be omitted or merely suggested.

DETAILED DESCRIPTION

I. Introduction

This description describes several example implementations, at least some which pertain to using a computing system to generate a vehicle history session with respect to a vehicle operatively connected to the computing system. The computing system can include within the vehicle history session details regarding multiple actions performed by the computing system and/or the vehicle during generation of the vehicle history session.

The computing system can determine whether vehicle service information received from the vehicle is from a vehicle with a valid vehicle identification number (VIN). Transmission of the vehicle history session and/or the vehicle service information by the computing system to a remote server and/or database in the cloud can be conditioned on whether the computing system has confirmed that the vehicle service information has been received from a vehicle with a valid VIN.

Moreover, transmission of the vehicle history session and/or the vehicle service information by the computing system to a remote server and/or database can alternatively or further be conditioned on a share-option identifier associated with the computing device. As an example, the share-option identifier can indicate sharing or no sharing. Further still, the share-option identifier that indicates sharing could indicate sharing with the computing devices controlled by a single user, sharing with computing systems in a particular domain, or global sharing.

The computing system can include an application executable by a processor of the computing system. In at least some implementations, the computing system executes the application to generate the vehicle history session. In those or in other implementations, the computing system executes the application to access a vehicle history session from the cloud-based storage and to display the vehicle history session on a display of the computing system. That vehicle history session accessed from the cloud-based storage can include a vehicle history session generated by the computing system that accesses the vehicle history session or a vehicle history session by a different computing system, such as a different computing system that belongs to: a set of computing systems associated with a user of the computing system, a set of computing systems associated with a particular domain, or a set of computing systems associated with users that agree to share their vehicle history sessions with other users based on a global share setting.

In some instances, a user of the computing system and the application is a vehicle technician. The computing system can allow the technician or other user to view a previous connection made to a particular vehicle via the computing system. In some cases, the technician can access a prior vehicle history session for the particular vehicle from any location where the technician is working. Accessing a prior vehicle history session can allow a user to view prior faults set in the vehicle, log notes generated during the prior vehicle history session, and recordings of live data generated during the prior vehicle history session. Accessing a prior vehicle history session can allow a user to verify that previous faults were cleared during the prior vehicle history session. Accessing a prior vehicle history session can allow a user to verify a change made to a programmable vehicle component parameter such as a parameter for road speed or cruise speed for an engine in a vehicle. Displaying a prior vehicle history session on the computing system can cause the technician to take certain actions to make a current repair to the particular vehicle based on data contained within the prior vehicle history session.

The cloud-based storage can store vehicle history sessions in a synchronized manner based on vehicle identification number associated with each vehicle history session when multiple vehicle history sessions are stored for the particular vehicle.

II. Example Systems

FIG. 1 shows block diagrams of a network arrangement 100 and a network arrangement 121 in accordance with the example implementations. The network arrangement 100 includes a vehicle 102, a computing system 104, a communication network 106, a server 108, and a database 110. The network arrangement 121 includes the vehicle 102, a computing system 190, a vehicle communication interface 200, the communication network 106, the server 108, and the database 110.

The vehicle 102, the computing system 104, the server 108, the database 110, the computing system 190, and/or the vehicle communication interface 200 can be a network node of the communication network 106. In other words, the vehicle 102, the computing system 104, the server 108, the database 110, the computing system 190, and/or the vehicle communication interface 200 can operatively connect to the communication network 106. Those operative connections can be direct connections to the communication network 106 or indirect connections to the communication network 106.

Figure 8:
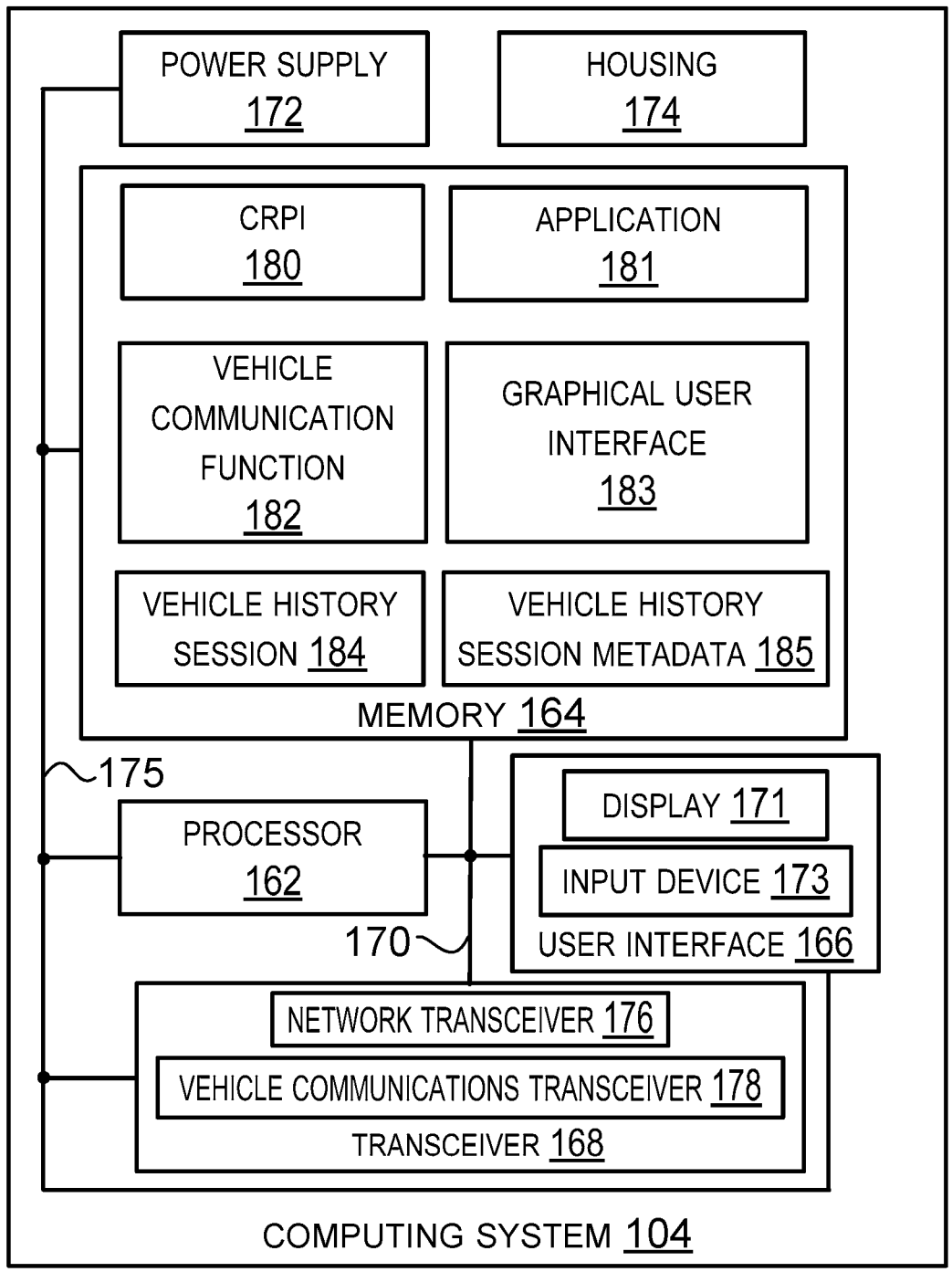
FIG. 8 and FIG. 9 are block diagrams of example computing systems in accordance with the example implementations.
Figure 9:
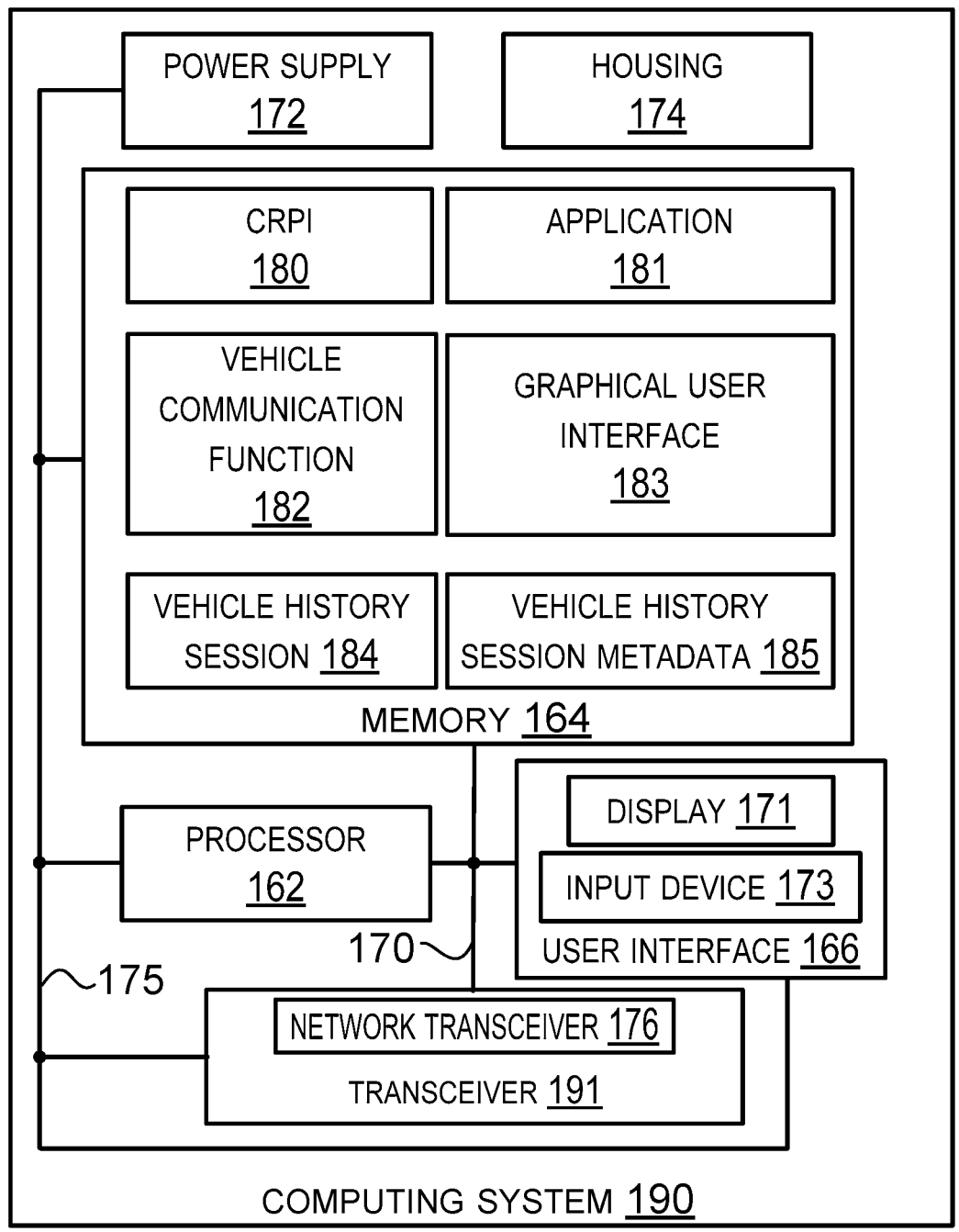
Figure 10:
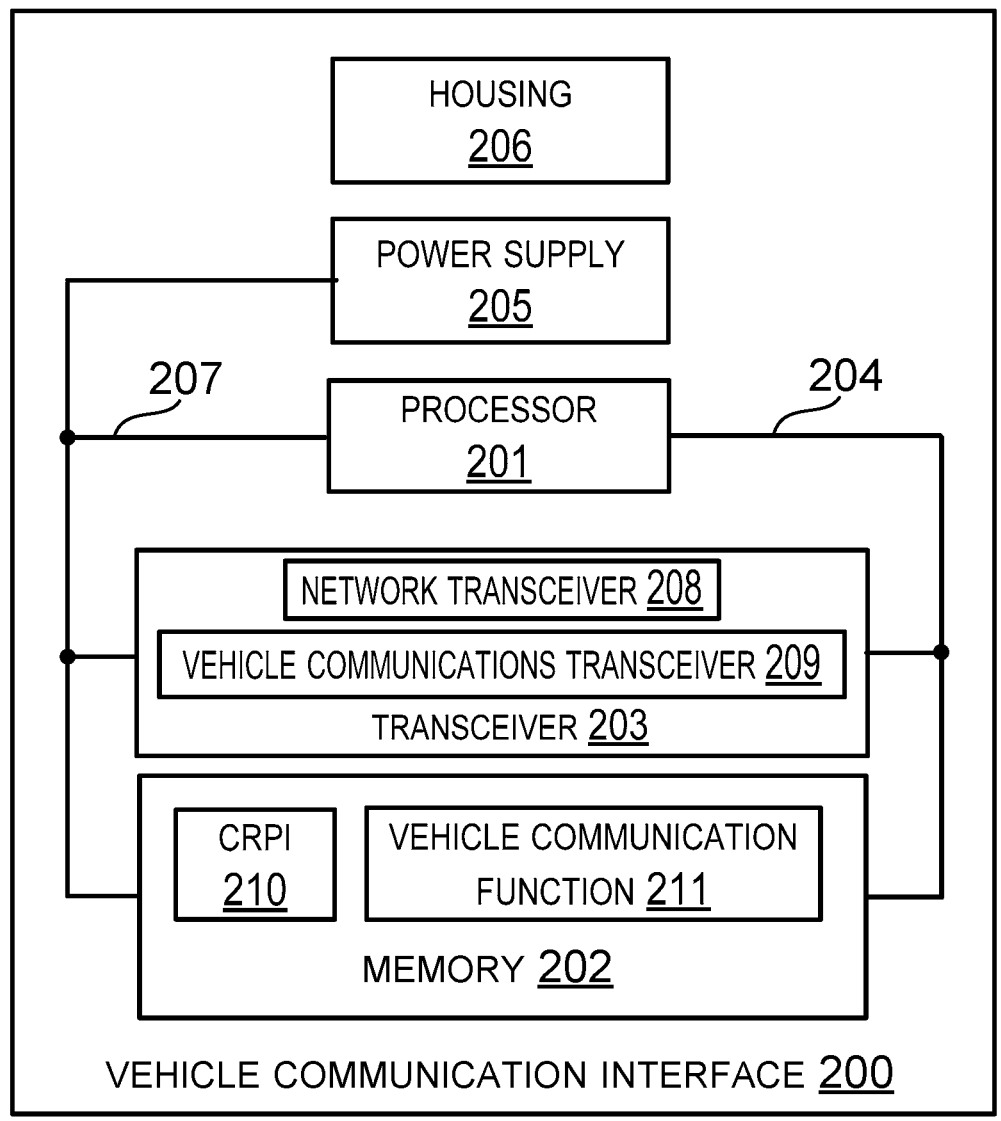
FIG. 10 is a block diagram of an example vehicle communication interface in accordance with the example implementations.
Figure 12:
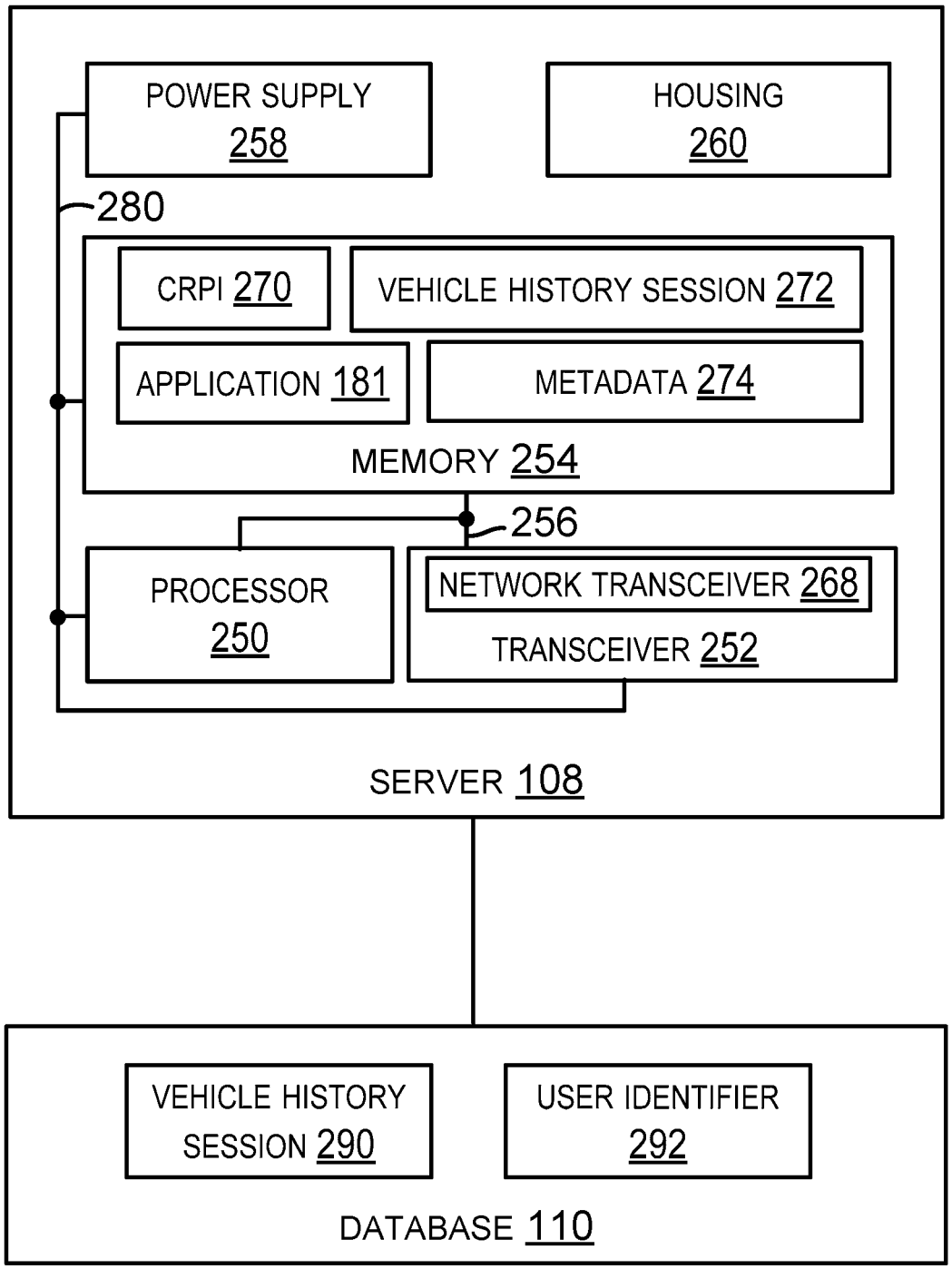
FIG. 12 is a block diagram of an example server and database in accordance with the example implementations.

The vehicle 102 can be arranged like an example vehicle described in section V of this description. Further example details regarding the vehicle 102 are shown in FIG. 3. Example details regarding the computing system 104, 190 are shown in FIG. 8, FIG. 9, respectively. The communication network 106 can include one or more other nodes, but for clarity of FIG. 1, the one or more other network nodes (not including the vehicle 102, the computing system 104, the server 108, the database 110, the computing system 190, and/or the vehicle communication interface 200) are not shown. As an example, the one or more other network nodes can include a network interface controller, a repeater, a hub, a bridge, a switch, a router, a modem, a firewall, and/or some other network node. Example details regarding the vehicle communication interface 200 are shown in FIG. 10. Example details regarding the server 108 and the database 110 are shown in FIG. 12.

Figure 2:
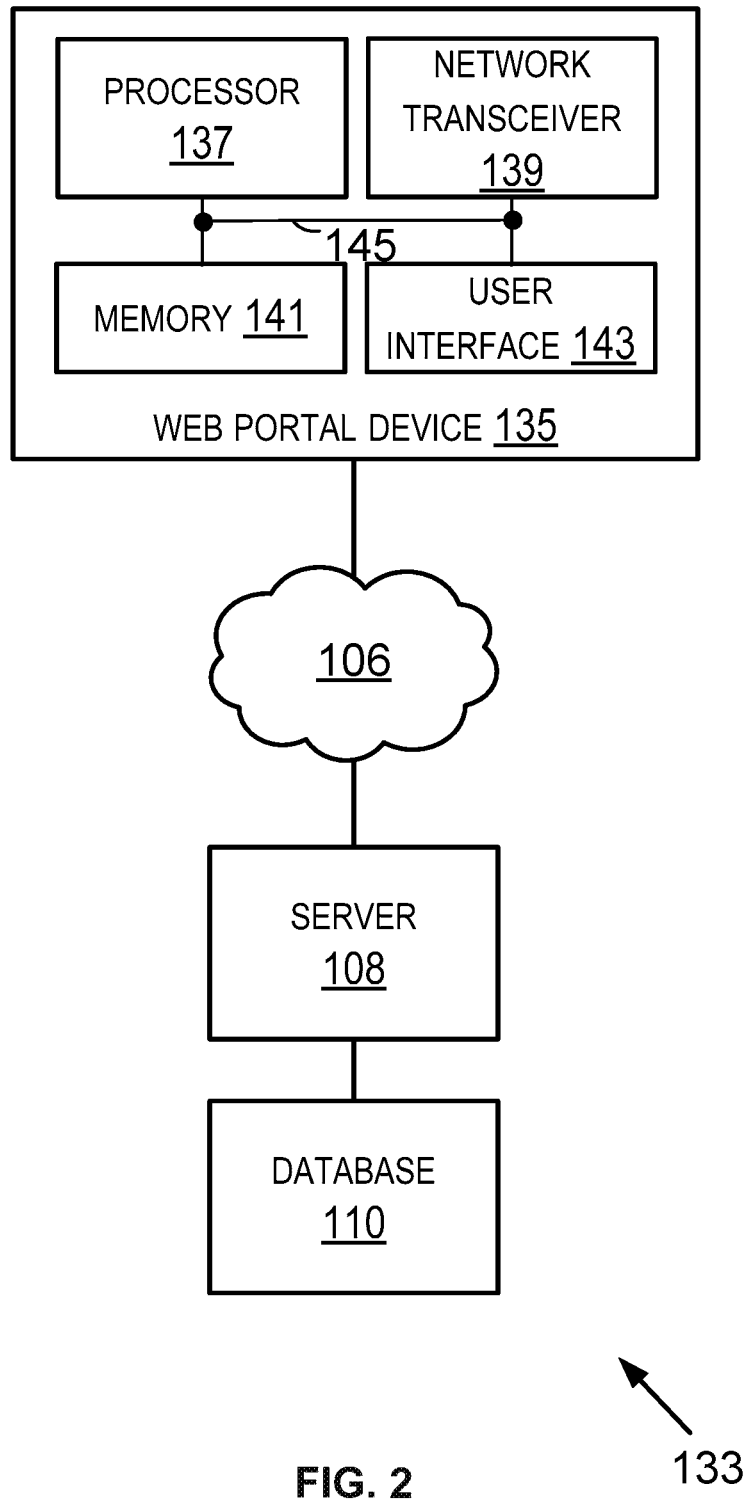
FIG. 2 shows a block diagram of a network arrangement in accordance with the example implementations.

Next, FIG. 2 shows a block diagram of a network arrangement 133 in accordance with the example implementations. The network arrangement 133 includes a web portal device 135, the communication network 106, the server 108, and the database 110. The vehicle 102, the computing system 104, the computing system 190, and the VCI 200 are not shown in FIG. 2, but one or more of the vehicle 102, the computing system 104, the computing system 190, or the VCI 200 can be connected to the communication network 106 (shown in FIG. 2) directly or indirectly as shown in FIG. 1.

Next, FIG. 3 is a block diagram showing example details of the vehicle 102. In accordance with at least some implementations, a vehicle, such as the vehicle 102 or any other vehicle discussed in this description, includes one or more vehicle systems, one or more electronic control units (ECU), an onboard diagnostic connector (OBDC), and a power supply.

As shown in FIG. 3, the vehicle 102 can include a vehicle system 101 that comprises an electronic control unit (ECU) 103, an ECU-connected input device 109, and an ECU-connected output device 111. As shown in FIG. 3, the vehicle 102 also includes an ECU 105, an ECU 107, an OBDC 113, a power supply 115, a vehicle network 117, and a power supply circuit 119. The power supply 115 can include a battery or a battery pack. The power supply circuit 119 can include an electrical voltage supply circuit, an electrical ground circuit, a fuse, a circuit breaker, and/or a ground lug or some other electrical circuit component.

The ECU-connected input device 109 includes one or more input devices. As an example, the ECU-connected input device 109 includes a sensor, a relay, or a switch. The ECU-connected output device 111 includes one or more output devices. As an example, the ECU-connected output device 111 includes a pump, a motor, a solenoid, a valve, a relay, an injector, a horn, a light, a display, a compressor, or an aural output device (e.g., speaker). Examples of vehicle data message (VDM) protocols used to communicate on the vehicle network 117 are listed in Section V of this description. Examples of the ECU 103, 105, 107 and examples of the OBDC 113 are discussed in Section V of this description. The computing system 104, 190 can request an ECU, such as the ECU 103, or the ECU-connected input device 109, or the ECU-connected output device 111 to set a parameter stored therein, and the computing system 104, 190 can log setting of the parameter as a detail and/or action of a report input to a vehicle history session.

Next, FIG. 4 shows a group of computing systems 125 in accordance with the example implementations. The group of computing systems 125 includes the computing system 104, 112, 114, 116. In accordance with the example implementations, each of the computing system 104, 112, 114, 116 is associated with a particular user and is configured to access the server 108 and/or the database 110.

In one respect, an association between the computing system 104, 112, 114, 116 and the particular user can exist as a result of the particular user using the computing system 104, 112, 114, 116 to access the server 108 and/or the database 110 based on a user identifier associated with the particular user. As an example, the user identifier can include an e-mail address associated with the particular user. As another example, the user identifier can include a global user identifier (GUID), such as the user GUID 401 shown in FIG. 31. In that same respect or in another respect, an association between the computing system 104, 112, 114, 116 and the particular user can exist as a result of the computing system 104, 112, 114, 116 being associated with a share-option identifier that indicates sharing and a sharing type, user for the particular user. A user GUID or some other GUID, such as a domain GUID, may be used instead of an e-mail address in order to comply with privacy regulations like the European Union's General Data Protection Regulation (GDPR), the California Consumer Protection Act (CCPA), or some other privacy regulations. Once the e-mail address is mapped to the user GUID at the server 108, the computing system 104, 190 does not have to resend the e-mail address to access a vehicle history session stored at the database 110.

Although FIG. 4 shows that a user is associated with four computing systems, other users that access the server 108 and/or the database 110 can be associated with one, two, three, four or some other number of computing systems configured to access the server 108 and/or the database 110. In accordance with at least some example implementations, a computing system can be configured for accessing the server 108 and/or the database 110 by being programmed with a particular application, such as the application 181 shown in FIG. 8 and FIG. 9. In accordance with an alternative implementation, one of the computing system 104, 112, 114, 116 can be replaced by or configured as the computing system 190.

Next, FIG. 5 shows a group of computing systems 127 in accordance with the example implementations. The group of computing systems 127 includes the computing system 104, 118, 120, 122. In accordance with the example implementations, each of the computing system 104, 118, 120, 122 is associated with a particular network domain and is configured to access the server 108 and/or the database 110.

In one respect, an association between the computing system 104, 118, 120, 122 and the particular network domain can exist as a result of the computing system 104, 118, 120, 122 accessing the server 108 and/or the database 110 based on a user identifier associated with the particular network domain. As an example, the user identifier can include an e-mail address associated with the particular network domain. As another example, the user identifier can include a GUID associated with the particular network domain. The domain GUID 407 shown in FIG. 31 can be associated with the particular network domain. In that same respect or in another respect, an association between the computing system 104, 118, 120, 122 and the particular network domain can exist as a result of the computing system 104, 118, 120, 122 being associated with a share-option identifier that indicates sharing and a sharing type, domain for the particular network domain.

Although FIG. 5 shows that a group of computing systems associated with a particular network domain includes four computing systems, another computing system that accesses the server 108 and/or the database 110 based on a particular network domain can be associated with none, one, two, three, four or some other number of computing systems that accesses the server 108 and/or the database 110 based on a particular network domain. In accordance with an alternative implementation, one of the computing system 104, 118, 120, 122 can be replaced by or configured as the computing system 190.

Figure 6:
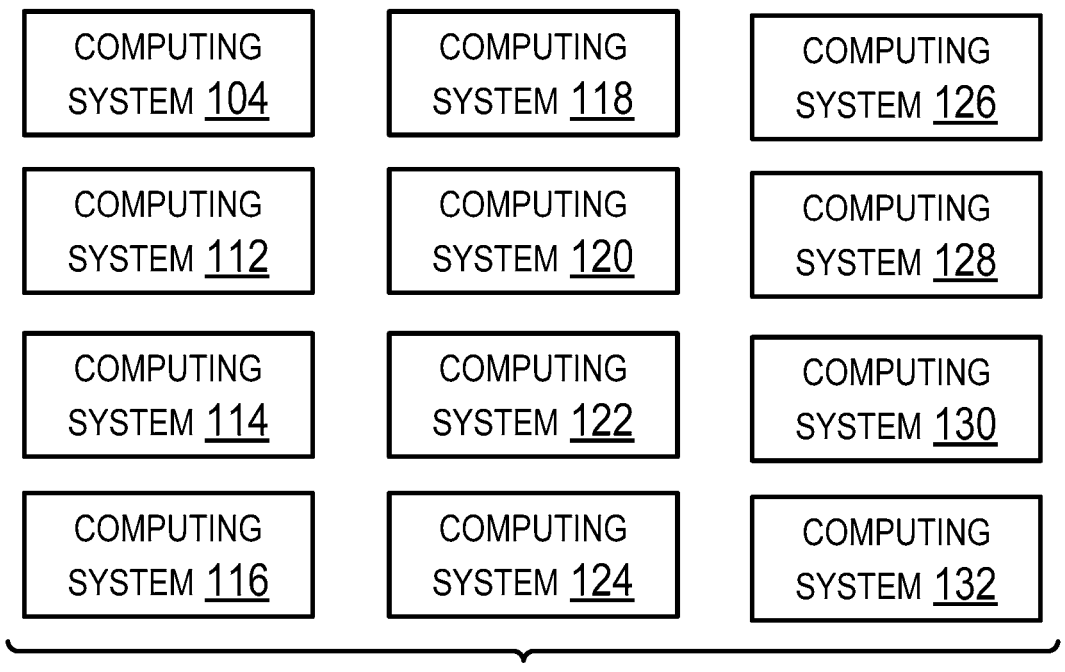

Next, FIG. 6 shows a group of computing systems 129 in accordance with the example implementations. The group of computing systems 129 includes the computing system 104, 112, 114, 116, 118, 120, 122, 124, 126, 128, 130, 132. In accordance with at least some example implementations, each of the computing system 104, 112, 114, 116, 118, 120, 122, 124, 126, 128, 130, 132 is associated with a community of users and is configured to access the server 108 and/or the database 110.

In one respect, an association between the computing system 104, 112, 114, 116, 118, 120, 122, 124, 126, 128, 130, 132 and the community of users can arise by the computing system 104, 112, 114, 116, 118, 120, 122, 124, 126, 128, 130, 132 being configured to share vehicle history sessions with other users in the community of users. A number of computing systems that are configured to share vehicle history sessions with other users in the community of users and/or other computing system(s) used by those other users can include two or more computing systems. In that same respect or in another respect, an association between the computing system 104, 112, 114, 116, 118, 120, 122, 124, 126, 128, 130, 132 and the community of users can exist as a result of the computing system 104, 112, 114, 116, 118, 120, 122, 124, 126, 128, 130, 132 being associated with a share-option identifier that indicates sharing and a sharing type, global. In accordance with an alternative implementation, one of the computing system 104, 112, 114, 116, 118, 120, 122, 124, 126, 128, 130, 132 can be replaced by or configured as the computing system 190.

Figure 7:
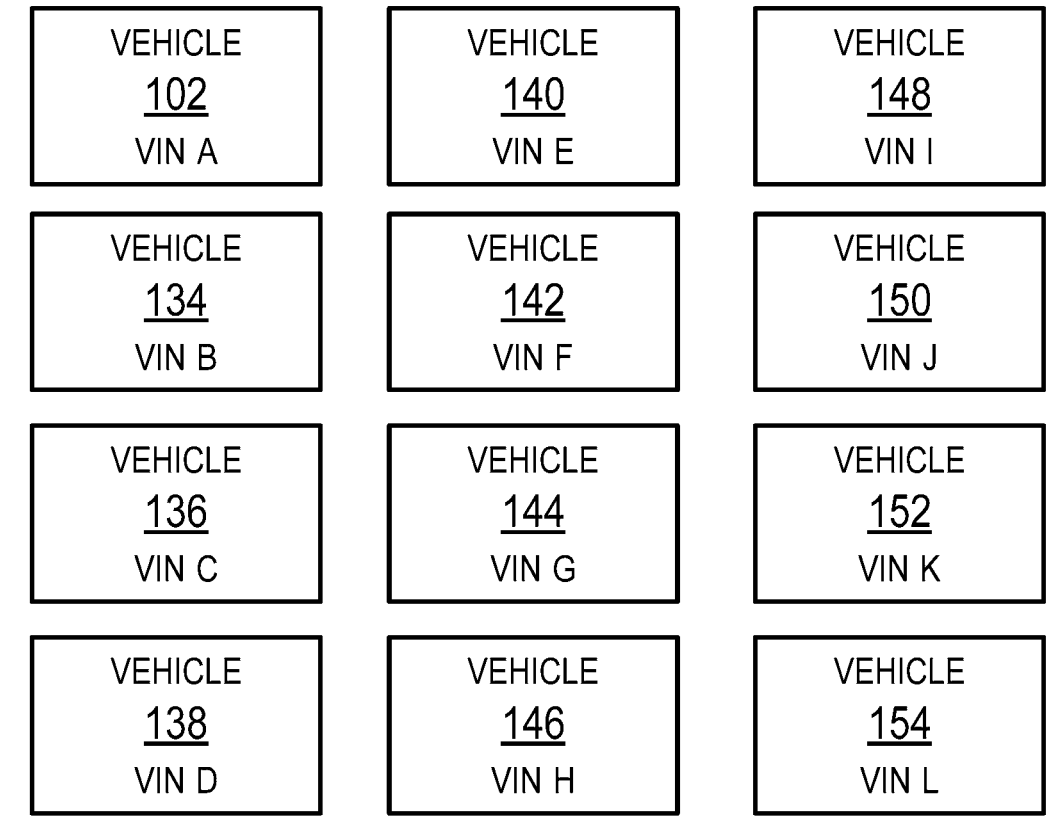
FIG. 7 is a diagram of an example group of vehicles in accordance with the example implementations.

Next, FIG. 7 shows a group of vehicles 131 in accordance with the example implementations. The group of vehicles 131 includes the vehicle 102, 134, 136, 138, 140, 142, 144, 146, 148, 150, 152, 154, and those vehicles are associated with a VIN A, B, C, D, E, F, G, H, I, J, K, L, respectively. As an example, the VIN A, B, C, D may indicate that the vehicle 102, 134, 136, 138 is a first type of vehicle, such as a model year 2008 Freightliner® vehicle, one of which can be identified with the vehicle history session summary 892 shown in FIG. 26. As another example, the VIN E, F, G, and H may indicate that the vehicle 140, 142, 144, 146 is a second type of vehicle, such as a model year 2016 Freightliner® vehicle, one of which can be identified with the vehicle information 894 shown in FIG. 26. As yet another example, the VIN I may indicate that the vehicle 148 is a third type of vehicle, such as a model year 2012 Freightliner® vehicle, which can be identified with the vehicle information 896 shown in FIG. 26. As yet another example, the VIN J may indicate the vehicle 150 is a fourth type of vehicle, such as a model year 2005 Volvo® vehicle, which can be identified with the vehicle information 898 shown in FIG. 26. As still yet another example, the VIN K may indicate the vehicle 152 is a fifth type of vehicle, such as a model year 2015 Freightliner® vehicle, which can be identified with the vehicle information 900 shown in FIG. 26. As still yet another example, the VIN L may indicate the vehicle 154 is a sixth type of vehicle, such as a model year 2013 Peterbuilt® vehicle, which can be identified with the vehicle information 902 shown in FIG. 26.

A. Computing System

Next, FIG. 8 is a block diagram of the computing system 104. The computing system 112, 114, 116, 118, 120, 122, 124, 126, 128, 130, 132 can be arranged like the computing system 104. As shown in FIG. 8, the computing system 104 includes a processor 162, a memory 164, a user interface 166, a transceiver 168, and a data bus 170. The data bus 170 operatively connects the processor 162, the memory 164, the user interface 166, and/or the transceiver 168 to one another. In other words, the data bus 170 provides an operative connection between two or more of the processor 162, the memory 164, the user interface 166, and/or the transceiver 168. In at least some implementations, the computing system 104 also includes a power supply 172, a housing 174, and a power supply circuit 175.

The operative connection provided by the data bus 170 allows the processor 162 to request and receive data from the memory 164. The operative connection provided by the data bus 170 allows the processor 162 to provide and store data within the memory 164. The operative connection provided by the data bus 170 allows the processor 162 to receive data input using the user interface 166 and to output data to the user interface 166 for outputting by the user interface 166. The operative connection provided by the data bus 170 allows the processor 162 to receive data received by the transceiver 168 and to provide the transceiver 168 with data that is to be transmitted by the transceiver 168.

1. Processor

A processor, such as the processor 162 or any other processor discussed in this description, can include one or more processors. Any processor discussed in this description can thus be referred to as "at least one processor" or "one or more processors." Furthermore, any processor discussed in this description can include a general purpose processor (e.g., an INTEL® single core microprocessor or an INTEL® multicore microprocessor), a special purpose processor (e.g., a digital signal processor, a graphics processor, an embedded processor, a field-programmable gate array (FPGA), or an application specific integrated circuit (ASIC) processor). Furthermore still, any processor discussed in this description can include or be operatively connected to a memory controller that controls a flow of data going to and from a memory, such as the memory 164.

Any processor discussed in this description can be configured to execute computer-readable program instructions (CRPI). Any CRPI discussed in this description can, for example, include assembler instructions, machine instructions, machine dependent instructions, microcode, firmware instructions, state-setting data, and/or either source code or object code written in one or any combination of two or more programming languages. As an example, a programming language can include an object oriented programming language such as Java, Python, or C++, or a procedural programming language, such as the "C" programming language. Any processor discussed in this description can be configured to execute hard-coded functionality in addition to or as an alternative to software-coded functionality (e.g., via CRPI). In at least some implementations of the computing system 104, 190, the processor 162 can be programmed to perform any function(s) described in this description as being performed by the computing system 104, 112, 114, 116, 118, 120, 122, 124, 126, 128, 130, 132, 190.

An embedded processor refers to a processor with a dedicated function or functions within a larger electronic, mechanical, pneumatic, and/or hydraulic device, and is contrasted with a general purpose computer. The embedded processor can include a central processing unit chip used in a system that is not a general-purpose workstation, laptop, or desktop computer. In some implementations, the embedded processor can execute an operating system, such as a real-time operating system (RTOS). As an example, the RTOS can include the SMX® RTOS developed by Micro Digital, Inc., such that the embedded processor can, but need not necessarily, include (a) an advanced RISC (reduced instruction set computer) machine (ARM) processor (e.g., an AT91SAM4E ARM processor provided by the Atmel Corporation, San Jose, California), or (b) a COLDFIRE® processor (e.g., a 52259 processor) provided by NXP Semiconductors N.V., Eindhoven, Netherlands. A general purpose processor, a special purpose processor, and/or an embedded processor can perform analog signal processing and/or digital signal processing.

2. Memory

A memory, such as the memory 164 or any other memory discussed in this description, can include one or more memories. Any memory discussed in this description can thus be referred to as "at least one memory" or "one or more memories." A memory can include a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

A non-transitory memory can include a volatile or non-volatile storage component, such as an optical, magnetic, organic or other memory or disc storage component. Additionally or alternatively, a non-transitory memory can include or be configured as a random-access memory (RAM), a read-only memory (ROM), a programmable read-only memory (PROM), an erasable programmable read-only memory (EPROM), a flash memory, an electrically erasable programmable read-only memory (EEPROM), or a compact disk read-only memory (CD-ROM). The RAM can include static RAM or dynamic RAM. A non-transitory memory can be configured as a removable storage device, a non-removable storage device, or a combination thereof. A removable storage and/or a non-removable storage device can, but need not necessarily, include a magnetic disk device such as a flexible disk drive or a hard-disk drive (HDD), an optical disk drive such as a compact disc (CD) drive and/or a digital versatile disk (DVD) drive, a solid state drive (SSD), or a tape drive.

A transitory memory can include, for example, CRPI provided over a communication network, such as the communication network 106 and/or the data bus 170.

A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable mediums." Any of those alternative terms can be preceded by the prefix "transitory" if the memory is transitory or "non-transitory" if the memory is non-transitory. For a memory including multiple memories, two or more of the multiple memories can be the same type of memory or different types of memories.

3. Transceiver

A transceiver, such as the transceiver 168 or any other transceiver discussed in this description, can include one or more transceivers. Each transceiver includes one or more transmitters configured to transmit data onto a network and/or a data bus within the device (e.g., the computing system 104, 190, the VCI 200, or the server 108) including the transceiver. Each transceiver includes one or more receivers configured to receive data or a communication carried over a network and/or a data bus within the device (e.g., the computing system 104, 190, the VCI 200, or the server 108) including the transceiver. Unless stated differently, any data described as being transmitted to a device or system is considered to be received by that device or system. Similarly, unless stated differently, any data described as being received from a device or system is considered to be transmitted by that device or system directly or indirectly to the receiving device or system. For some implementations, a transceiver can include a transmitter and a receiver in a single semiconductor chip. In at least some of those implementations, the semiconductor chip can include a processor.

For purposes of this description and with respect to a particular vehicle (e.g., the vehicle 102, 134, 136, 138, 140, 142, 144, 146, 148, 150, 152, 154), a network can be configured as a vehicle network, a non-vehicle network, or a multi-purpose network. The vehicle network is at least partly on-board the particular vehicle and has an OBDC and one or more electronic controls units interconnected to the OBDC and/or to each other. In at least some implementations, the computing system 104 includes a harness that operatively connects to the OBDC in the particular vehicle and allows the computing system 104 to be disposed outside of the particular vehicle. In those or in other implementations, the computing system 104 is configured to communicate with the OBDC and can be disposed within or outside of the particular vehicle. The non-vehicle network is off-board of the particular vehicle and includes one or more network nodes outside of the particular vehicle. The multi-purpose network is contained at least partly within the particular vehicle and at least partly off-board the particular vehicle. The multi-purpose network can include a vehicle network and a non-vehicle network.

In at least some of the example implementations, a transmitter, such as a transmitter within any transceiver described in this description, transmits radio signals carrying data, and a receiver, such as a receiver within any transceiver described in this description, receives radio signals carrying data. A transceiver with a radio transmitter and radio receiver can include one or more antennas and can be referred to as a "radio transceiver," an "RF transceiver," or a "wireless transceiver." "RF" represents "radio frequency."

A radio signal transmitted or received by a radio transceiver can be arranged in accordance with one or more wireless communication standards or protocols such as an IEEE® standard, such as (i) an IEEE® 802.11 standard for wireless local area networks (wireless LAN) (which is sometimes referred to as a WI-FI® standard) (e.g., 802.11a, 802.11b, 802.11g, or 802.11n), (ii) an IEEE® 802.15 standard (e.g., 802.15.1, 802.15,3, 802.15.4 (ZIGBEE®), or 802.15.5) for wireless personal area networks (PANs), (iii) a BLUETOOTH® version 4.1 or 4.2 standard developed by the Bluetooth Special Interest Group (SIG) of Kirkland, Washington, (iv) a cellular wireless communication standard such as a long term evolution (LTE) standard, (v) a code division multiple access (CDMA) standard, (vi) an integrated digital enhanced network (IDEN) standard, (vii) a global system for mobile communications (GSM) standard, (viii) a general packet radio service (GPRS) standard, (ix) a universal mobile telecommunications system (UMTS) standard, (x) an enhanced data rates for GSM evolution (EDGE) standard, (xi) a multichannel multipoint distribution service (MMDS) standard, (xii) an International Telecommunication Union (ITU) standard, such as the ITU-T G.9959 standard referred to as the Z-Wave standard, (xiii) a 6LoW-PAN standard, (xiv) a Thread networking protocol, (xv) an International Organization for Standardization (ISO/International Electrotechnical Commission (IEC) standard such as the ISO/IEC 18000-3 standard for Near Field Communication (NFC), (xvi) the Sigfox communication standard, (xvii) the Neul communication standard, (xviii) the LoRaWAN communication standard, or (xix) a 5G new radio (5G NR) communication standard by the $3^{rd}$ Generation Partnership Project (3GPP) standards organization, such as the 5G NR, phase 1 or 5G NR, phase 2 communication standard. Other examples of the wireless communication standards or protocols are possible.

In at least some of the implementations, a transmitter, such as a transmitter within any transceiver described in this description, can be configured to transmit a signal (e.g., one or more signals or one or more electrical waves) carrying or representing data onto an electrical circuit (e.g., one or more electrical circuits). Similarly, a receiver, such as a receiver within any transceiver described in this description, can be configured to receive via an electrical circuit a signal carrying or representing data over the electrical circuit. The electrical circuit can be part of a non-vehicle network, a vehicle network, or a multi-purpose network. The signal carried over an electrical circuit can be arranged in accordance with a wired communication standard such as a Transmission Control Protocol/Internet Protocol (TCP/IP), an IEEE® 802.3 Ethernet communication standard for a LAN, a data over cable service interface specification (DOCSIS standard), such as DOCSIS 3.1, a universal serial bus (USB) specification, a vehicle data message (VDM) protocol, or some other wired communication standard or protocol. Examples of a VDM protocol are listed in Section V of this description. An electrical circuit can include a wire, a printed circuit on a circuit board, and/or a network cable (e.g., a single wire, a twisted pair of wires, a fiber optic cable, a coaxial cable, a wiring harness, a power line, a printed circuit, a CAT5 cable, and/or CAT6 cable). The wire can be referred to as a "conductor". Transmission of data over the conductor can occur electrically and/or optically.

In accordance with at least some implementations, the transceiver 168 includes a network transceiver 176 and a vehicle communications transceiver 178. The network transceiver 176 is configured to communicate over a non-vehicle network and/or a multi-purpose network. The vehicle communications transceiver 178 is configured to communicate over a vehicle network and/or a multi-purpose network. The transceiver 168 can be configured as a gateway to communicate over a multi-purpose network. The transceiver 168 is also configured to communicate over the data bus 170.

In at least some implementations, the network transceiver 176 includes a modem, a network interface card, a local area network (LAN) on motherboard (LOM), and/or a chip mountable on a circuit board. As an example, the chip can include a CC3100 Wi-Fi® network processor available from Texas Instruments, Dallas, Texas, a CC256MODx Bluetooth® Host Controller Interface (HCI) module available from Texas instruments, or a different chip for communicating via Wi-Fi®, Bluetooth® or another communication protocol.

In at least some implementations, the vehicle communications transceiver 178 includes a chip mountable on a circuit board. As an example, for the SAE J1939 VDM protocol, the chip could include a CAN transceiver, part number SN65HVD251-Q1 sold by Texas Instruments, Dallas, Texas, the high-speed CAN transceiver, part number TJA1043 sold by NXP Semiconductors N.V., Eindhoven, Netherlands, or some other chip configured for the SAE J1939 VDM protocol. As another example, for the SAE J1708 VDM protocol, the chip can include a J1708 transceiver, part number MAX344E sold by Maxim Integrated Products, Inc., San Jose, California, or some other chip configured for the SAE J1708 VDM protocol. Other examples of chips configured for communicating using a particular VDM protocol are also possible.

A network node that is within and/or coupled to a non-vehicle network and/or that communicates via a non-vehicle network or a multi-purpose network using a packet-switched technology can be locally configured for a next 'hop' in the network (e.g., a device or address where to send data to, and where to expect data from). As an example, a device (e.g., a transceiver) configured for communicating using an IEEE® 802.11 standard can be configured with a network name, a network security type, and a password. Some devices auto-negotiate this information through a discovery mechanism (e.g., a cellular phone technology).

The network transceiver 176 can be arranged to transmit a request and/or receive a response using a transfer protocol, such a hypertext transfer protocol (i.e., HTTP), an HTTP over a secure socket link (SSL) or transport layer security (TLS) (i.e., HTTPS), a file transfer protocol (i.e., FTP), or a simple mail transfer protocol (SMTP). The network transceiver 176 can be arranged to transmit an SMS message using a short message peer-to-peer protocol or using some other protocol.

The data transmitted by the transceiver 168, the network transceiver 176, and/or the vehicle communications transceiver 178 can include a destination identifier or address of a computing device (e.g., an ECU within a vehicle, the server 108, or the database 110) to which the data is to be transmitted. The data or communications transmitted by the transceiver 168, the network transceiver 176, and/or the vehicle communications transceiver 178 can include a source identifier or address of the computing system 104, 190. The source identifier or address data for generating a vehicle history session or other data instead or as well.

4. User Interface

The user interface 166 includes a display 171. The display 171 can include one or more displays. As an example, each display of the one or more displays includes a capacitive touch screen display, a resistive touch screen display, a plasma display, a light emitting diode (LED) display, a cathode ray tube display, an organic light-emitting diode (OLED) display (such as an active-matrix OLED or a passive-matrix OLED), a liquid crystal display (LCD) (such as include a backlit, color LCD), a touch screen display with the LCD, a capacitive touch screen display, or a resistive touch screen display. The display 171 can include a different type of display as well or instead.

In at least some implementations, a display of the display 171 is affixed (e.g., removably affixed) to a substrate of the housing 174 and/or to the housing 174. In those or in other implementations, a display of the display 171 is on and/or within a wearable device, such as a pair of glasses or goggles, a head-mountable display, or a wrist display, such as a wristwatch (e.g., a smartwatch). In at least some implementations, the housing 174 includes a laptop housing.

The display 171 is configured to display a graphical user interface, such as a graphical user interface 183 stored in the memory 164 and/or a graphical user interface shown in any one of FIG. 16 to FIG. 30. The display 171 can also be configured to display a still image (such as a visible light image, a thermal image, and/or a blended image based on a visible light image and a thermal image), a video, a text file (such as a text file with a PDF file extension or an XML file extension), a hypertext markup language file, and/or a web page. In at least some implementations, the display 171 is configured to display a horizontal scroll bar and/or a vertical scroll bar. The horizontal scroll bar and the vertical scroll bar can be used to cause the display 171 to display content not currently displayed on the display 171. A web page displayable on the display 171 can include any content shown in or described with respect to any one or more of FIG. 16 to FIG. 30. Other examples of content displayable on the display 171 are also possible.

The user interface 166 includes an input device 173. The input device 173 is configured to receive user inputs from a user of the computing system 104, 190. In at least some implementations, the input device 173 includes a keyboard or keypad including one or more keys configured to be pressed or otherwise manipulated by the user. In those or in other implementations, the input device 173 includes a touchpad or trackpad of a laptop computer housing. In those or in still other implementations, the input device 173 can include a computer mouse. In those or in still other implementations, the input device 173 includes a microphone configured for receiving sound waves, such as sound waves produced by the user speaking words in a vocabulary of the computing system 104, 190. The display 171 configured as a touch screen display can also receive user inputs from a user of the computing system 104, 190. Accordingly, the input device 173 can include the display 171 when configured as a touch screen display.

5. Additional Components

A power supply, such as the power supply 172 or any other power supply discussed in this description, can be arranged in any of a variety of configurations. As an example, the power supply can be configured to include circuitry to receive AC current from an AC electrical supply (e.g., electrical circuits operatively connected to an electrical wall outlet) and convert the AC current to a DC current for supplying to one or more of the components connected to the power supply 172. As another example, the power supply can be configured to include a battery or be battery operated. As yet another example, the power supply can be configured to include a solar cell or be solar operated. Moreover, a power supply can be configured to include electrical circuit (s) to distribute electrical current throughout the device or system including that power supply. As an example, those electrical circuit(s) include the power supply circuit 175 that connects to the processor 162, the memory 164, the user interface 166, and/or the transceiver 168. Other examples of a power supply are also possible.

In at least some implementations, the computing system 104, 190 includes a housing 174. The housing 174 surrounds at least a portion of the following: the processor 162, the memory 164, the user interface 166, the transceiver 168, the data bus 170, the power supply 172, and/or the power supply circuit 175. The housing 174 can support a substrate. In at least some example implementations, at least a portion of the following: the processor 162, the memory 164, the user interface 166, the transceiver 168, 191 the data bus 170, the power supply 172, and/or the power supply circuit 175 is/are mounted on and/or connected to a substrate of the housing 174. The housing 174 can be made from various materials. For example, the housing 174 can be made from a plastic material (e.g., acrylonitrile butadiene styrene (ABS)) and a thermoplastic elastomer used to form a grip on the housing 174.

6. Memory Content

The example implementations can determine, receive, transmit, generate, store, display, and/or use a variety of computer-readable data. At least some of the computer-readable data can be stored in a memory, such as the memory 164. As an example, the memory 164 contains computer-readable programming instructions (CRPI) 180, an application 181, a vehicle communication function 182, a graphical user interface 183, a vehicle history session 184, and/or vehicle history session metadata 185.

The vehicle communication function 182 include one or more functions that include the computing system 104, 190 transmitting a vehicle data message to the vehicle 102 and/or receiving a vehicle data message from the vehicle 102. As an example, the vehicle communication function 182 includes a function that includes the vehicle communications transceiver 178 transmitting a vehicle data message to the vehicle 102 and/or receiving a vehicle data message from the vehicle 102. Examples pertaining to a vehicle data message are described in Section V below. In at least some implementations, a vehicle data message received from the vehicle 102 can include data indicative of a type of vehicle and/or a particular vehicle. In those or other implementations, a vehicle data message received from the vehicle 102 can include data indicative of a DTC set in the vehicle 102. The data indicative of a type of vehicle and/or a particular vehicle can include a VIN. In at least some implementations, a vehicle data message from the vehicle 102 can include a detail associated with an action identifier. Each detail indicates a vehicle response to a vehicle data message sent to the vehicle 102 during performance of a respective action. The vehicle communication function 182 can be arranged as programmable instructions.

The graphical user interface 183 includes one or more graphical user interfaces. A GUI in the graphical user interface 183 can include a GUI displayable on the display 171. A GUI displayable on the display 171 can include any of the GUI 500 to the GUI 516 shown in FIG. 16 to FIG. 30. In at least some implementations, the GUI stored in the graphical user interface 183 includes one or more GUI elements that the server 108 populates with content stored in the memory 164. As an example, the GUI element(s) can include a field, a grid, a display card, an indicator, or some other element including content shown in FIG. 16 to FIG. 30. In those or in other implementations, the graphical user interface 183 includes a graphical user interface the computing system 104, 190 receives from the server 108.

The vehicle history session 184 includes one or more vehicle history sessions. In one respect, the vehicle history session 184 includes a vehicle history session generated by the computing system 104, 190. In another respect, the vehicle history session 184 includes a vehicle history session summary and/or details correlated with a vehicle history session generated by a different computing system. As an example, the different computing system can include a computing system within a group of computing systems that are associated with a particular network domain, such as the group of computing system 127. As another example, the different computing system can include a computing system within a group of computing system associated with a community of users, such as the group of computing systems 129. In yet another respect, the vehicle history session can include any vehicle history session or vehicle history session summary discussed in this description and/or shown in the application drawings.

The vehicle history session metadata 185 includes metadata the processor 162 transmits in connection with transmitting a vehicle history session to the server 108. In at least some implementations, at least a portion of the vehicle history session metadata 185 is generated in response to use of a GUI 512 shown in FIG. 28. In accordance with those or other implementations, at least a portion of the vehicle history session metadata 185 is provided by the server 108 based on an identifier, such as an e-mail address, the computing system 104, 190 transmits to the server 108.

Figure 31:
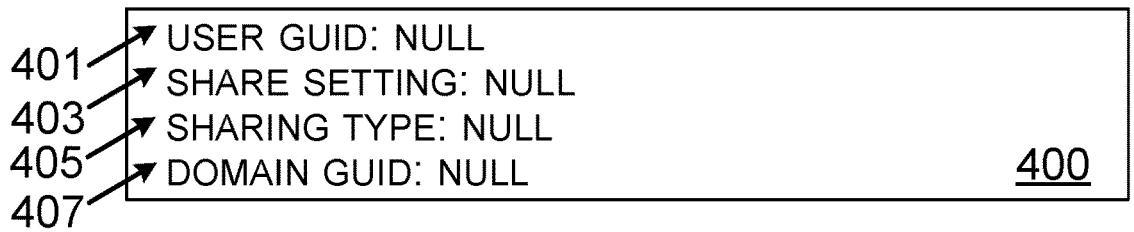
FIG. 31 shows example metadata in accordance with the example implementations.
Figure 31:
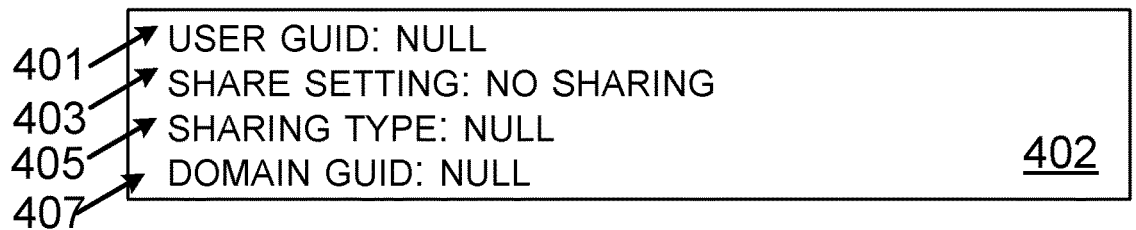
Figure 31:
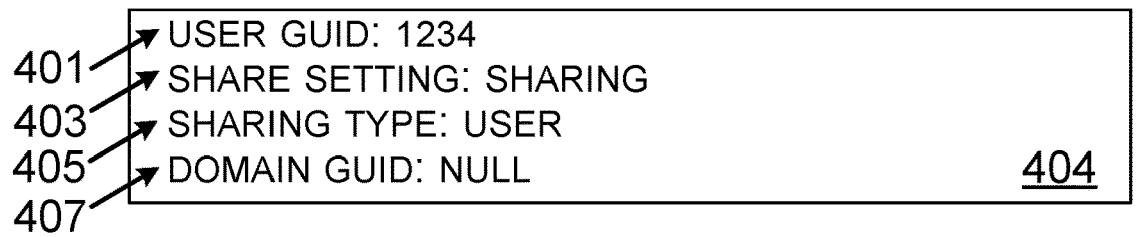
Figure 31:
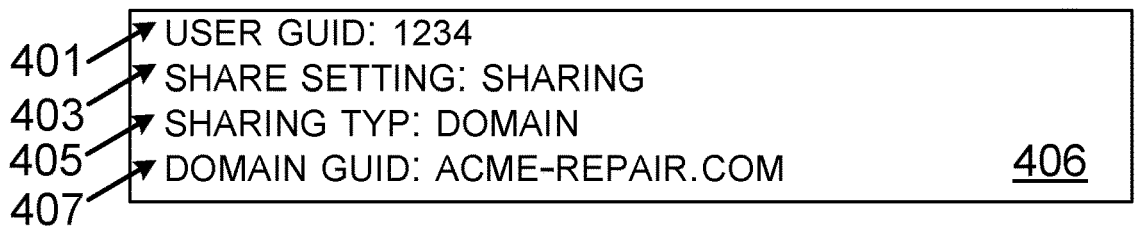
Figure 31:
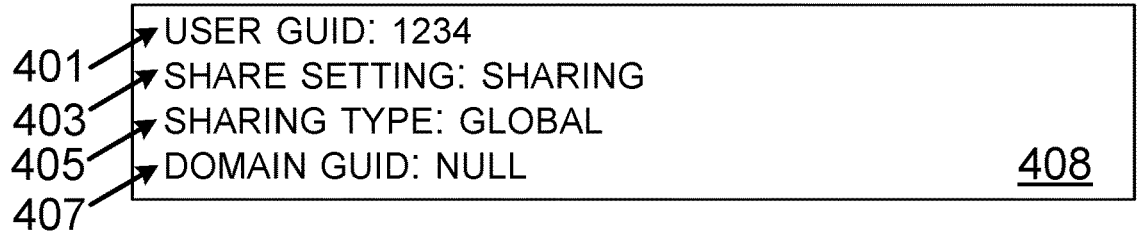

Examples of the vehicle history session metadata 185 are shown in FIG. 31. In particular, FIG. 31 shows metadata 400, 402, 404, 406, 408. Each of the metadata 400, 402, 404, 406, 408 includes a user GUID 401, a share setting 403, a sharing type 405, and a domain GUID 407. In at least some implementations, default settings of the user GUID 401, the share setting 403, the sharing type 405, and the domain GUID 407 are null, as shown by the metadata 400. The metadata 402 represents a state of the computing system 104, 190 in which a non-null value for the share setting 403 has been saved, but the user GUID 401, the sharing type 405 and the domain GUID 407 are null. The metadata 404, 408 represent states of the computing system 104, 190 in which non-null values have been saved in the user GUID 401, the share setting 403, and the sharing type 405, but the domain GUID 407 is null. The metadata 406 represents a state in which non-null values are saved within the user GUID 401, the share setting 403, the sharing type 405, and the domain GUID 407.

An advantage of storing the vehicle history session metadata 185 can include the processor 162 having metadata it can provide with each vehicle history session the computing system 104, 190 generates. Moreover, in at least some implementations, the processor 162 can refer to the vehicle history session metadata 185 to determine whether to automatically upload a vehicle history session to the server 108 and/or the database 110. Accordingly, the vehicle history session metadata 185 can set the computing system 104, 190 into a particular operating state, such as an operating state discussed with respect to FIG. 14.

Returning to FIG. 8, the CRPI 180 can include program instructions executable by the processor 162 to cause the computing system 104, 190 to perform any function described in this description as being performed by the computing system 104, 190.

Figure 13:
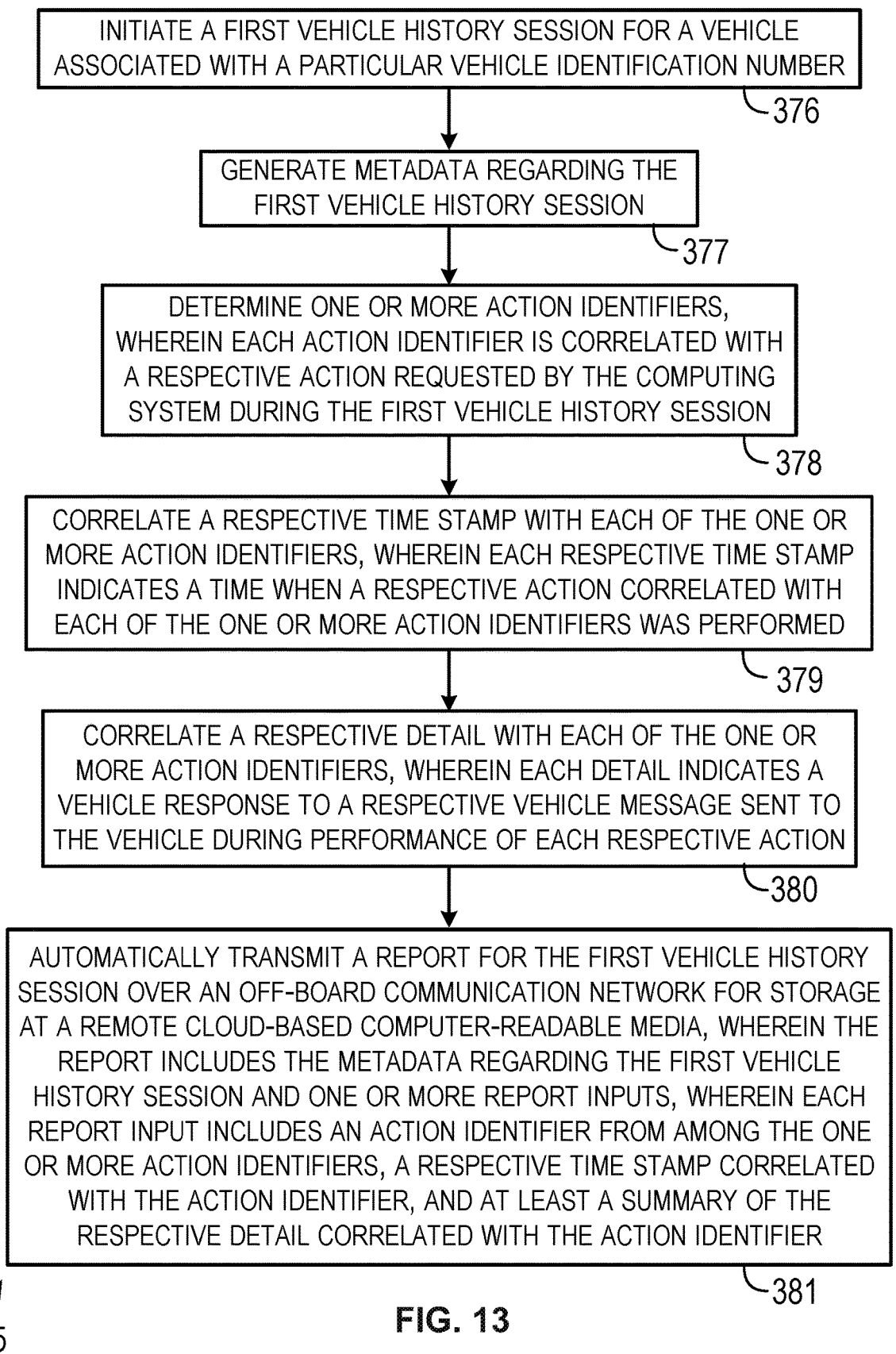
FIG. 13 is a flow chart showing example functions of a method in accordance with the example implementations.
Figure 14:
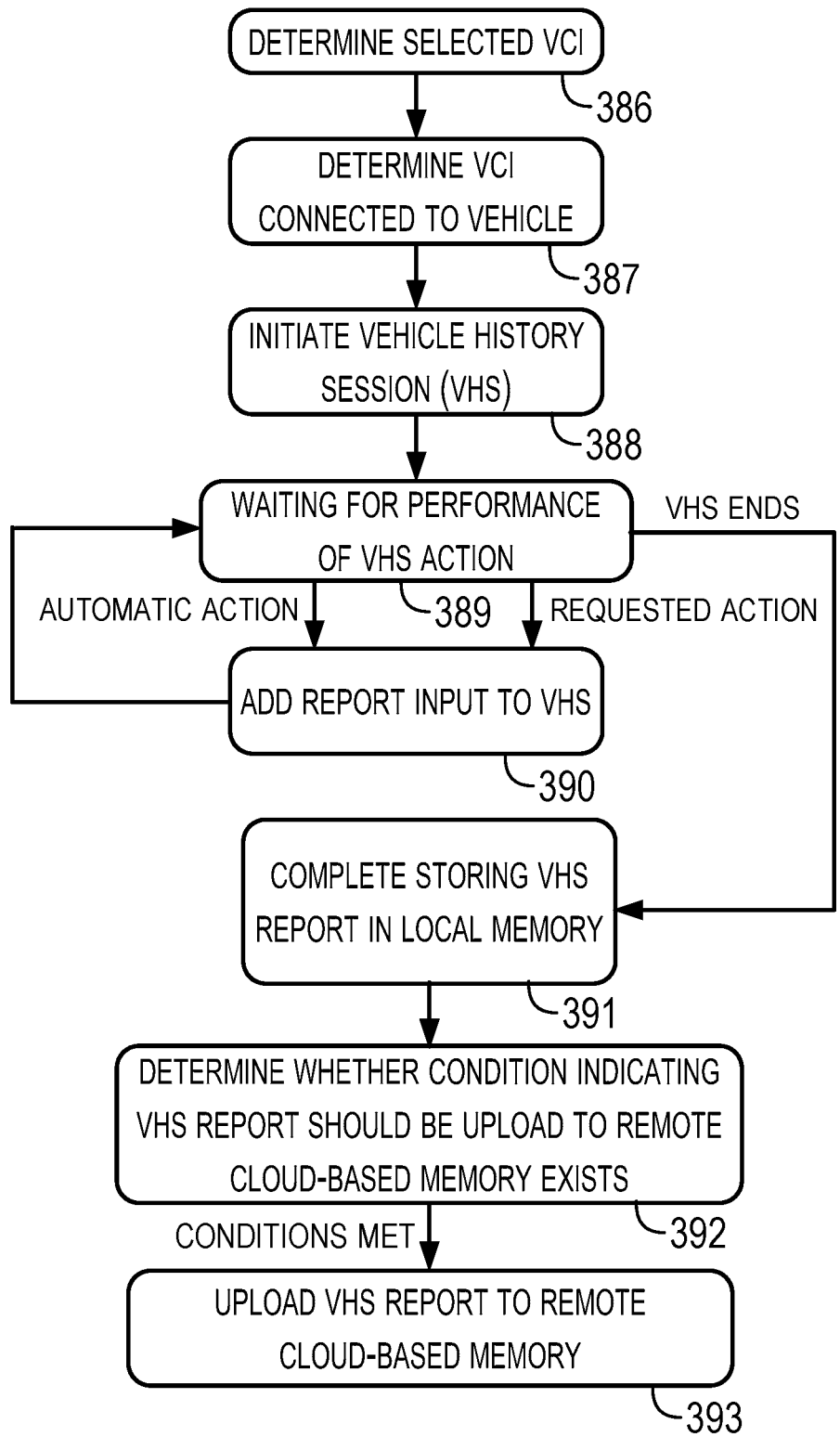
FIG. 14 is flow chart showing example functions of a method in accordance with the example implementations.
Figure 15:
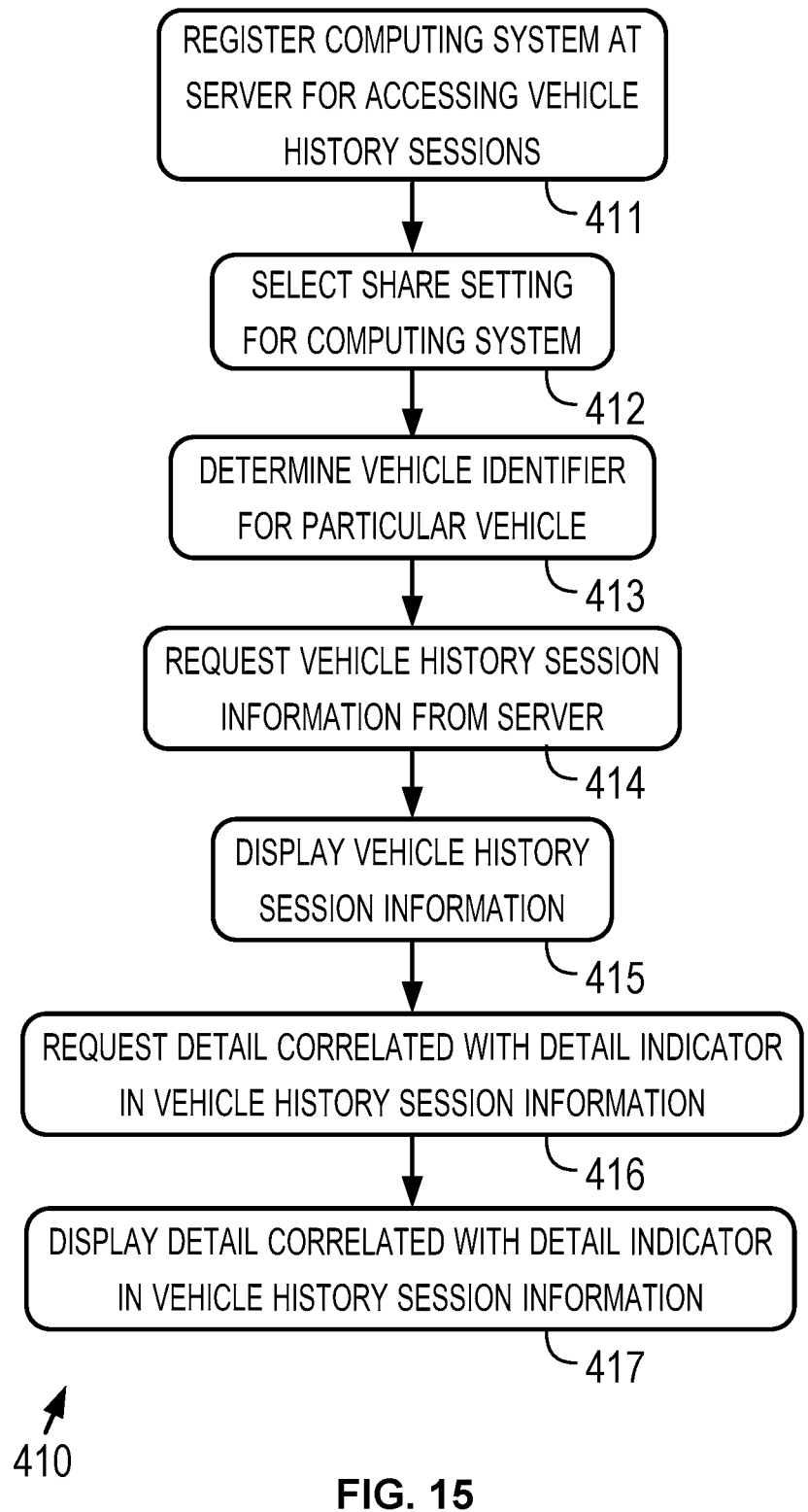
FIG. 15 is flow chart showing example functions of a method in accordance with the example implementations.

As an example, the CRPI 180 can include program instructions executable to perform any function of the set of functions 375 shown in FIG. 13, any function shown in the set of functions 385 shown in FIG. 14, and/or any function shown in the set of functions 410 shown in FIG. 15

As an example, the CRPI 180 can include the application 181. The application 181 can include one or more software applications executable by the processor 162. Each application of the application 181 can be downloaded into the memory 164 in various ways. For example, the application 181 can be downloaded over the communication network 106 from the server 108. As another example, the application 181 can be downloaded from an optical disc, such as a compact disc (CD) or a digital versatile disc (DVD). Other examples of how the application 181 is downloaded to the computing system 104, 190 and into the memory 164 are also possible.

In accordance with at least some implementations, the application 181 includes an operating system configured to manage both components of the computing system 104, 190 and other application(s) and CRPI in the computing system 104, 190. As an example, the operating system can include the WINDOWS® 7 (32-bit or 64-bit) operating system, the WINDOWS® 8 (32-bit or 64-bit) operating system, or the WINDOWS® 10 (32-bit or 64-bit) operating system. Other examples of the operating system are also possible. Additionally or alternatively, the application 181 can include a data structure, program module, dynamic link library, and/or a graphical user interface to perform a function performable by the eTechnician™ software application sold by Nexiq Technologies in Rochester Hills, Michigan.

As another example, the CRPI 180 includes program instructions to determine a USC within a GUI has been selected and responsively cause the processor 162 to perform a function described as being associated with the USC.

B. Computing System

Next, FIG. 9 is a block diagram of a computing system 190. The computing system 112, 114, 116, 118, 120, 122, 124, 126, 128, 130, 132 can be arranged like the computing system 190. In at least some implementations, the computing system 190 is arranged like the computing system 104 except that the computing system 190 includes a transceiver 191, whereas the computing system 104 includes the transceiver 168. The transceiver 191 incudes the network transceiver 176 such that the transceiver 191 and the computing system 190 can communicate with the network transceiver 176 in a VCI 200 shown in FIG. 10. The other components of the computing system 190 are described above with respect to the computing system 104.

In at least some implementations, the computing system 104, 190 is arranged as and/or includes a desktop personal computer, such as an XPS desktop computer sold by Dell Technologies Inc., Round Rock, Texas; a laptop computer, such as an Inspiron 15 5000 laptop computer sold by Dell Technologies, Inc., or a tablet device, such as an IPAD® tablet device from Apple Inc. of Cupertino, California or a SAMSUNG GALAXY TAB tablet device from Samsung Electronics Co., Ltd. of Maetan-Dong, Yeongtong-Gu Suwon-Si, Gyeonggi-Do, Republic of Korea.

C. Vehicle Communication Interface

Next, FIG. 10 is a block diagram of a VCI 200. The VCI 200 includes a processor 201, a memory 202, a transceiver 203, and a data bus 204. The data bus 204 operatively connects the processor 201, the memory 202, and/or the transceiver 203 to one another. In other words, the data bus 204 provides an operative connection between two or more of the processor 201, the memory 202, and/or the transceiver 203. In at least some implementations, the VCI 200 also includes a power supply 205, a housing 206, and a power supply circuit 207.

The transceiver 203 includes a network transceiver 208 and a vehicle communications transceiver 209. The network transceiver 208 is configured to communicate over a non-vehicle network and/or a multi-purpose network. The vehicle communications transceiver 209 is configured to communicate over a vehicle network and/or a multi-purpose network. The transceiver 203 is also configured to communicate over the data bus 204.

The memory 202 includes CRPI 210 and the vehicle communication function 211.

The vehicle communication function 211 include one or more functions that include the VCI 200 transmitting a vehicle data message to the vehicle 102 and/or receiving a vehicle data message from the vehicle 102. As an example, the vehicle communication function 211 includes a function that includes the vehicle communications transceiver 209 transmitting a vehicle data message to the vehicle 102 and/or receiving a vehicle data message from the vehicle 102. Examples pertaining to a vehicle data message are described in Section V below. In at least some implementations, a vehicle data message received from the vehicle 102 can include data indicative of a type of vehicle and/or a particular vehicle. In those or other implementations, a vehicle data message received from the vehicle 102 can include data indicative of a DTC set in the vehicle 102. The data indicative of a type of vehicle and/or a particular vehicle can include a VIN. In at least some implementations, a vehicle data message from the vehicle 102 can include a detail associated with an action identifier. Each detail indicates a vehicle response to a vehicle data message sent to the vehicle 102 during performance of a respective action.

As an example, the CRPI 210 can include program instructions executable by the processor 201 to receive from the network transceiver 176 of the computing system 190 a request to transmit a vehicle data message to a vehicle and to responsively transmit the vehicle data message to the vehicle using the vehicle communications transceiver 209.

As another example, the CRPI 210 can include program instructions executable by the processor 201 to receive a vehicle data message at the vehicle communications transceiver 209 from the vehicle 102 and to responsively transmit the vehicle data message to the network transceiver 176 of the computing system 190 using the network transceiver 208.

In at least some implementations, the VCI 200 is arranged as and/or includes a one of the following VCI available from Nexiq Technologies, Waterford, Michigan: USB-LINK™ VCI, part number 125032; USB-LINK™2 VCI: Bluetooth edition, part number 124032; or USB-LINK™2 VCI: Wi-Fi Edition, part number 124034. In those and/or at least some other implementations, the VCI 200 is arranged as and/or includes a one of the following VCI available from Cummins Inc., Columbus, IN: a Cummins Inline 5 VCI, a Cummins Inline 6 VCI, or a Cummins Inline 7 VCI. Other examples of the VCI 200 are also possible.

Figure 11:
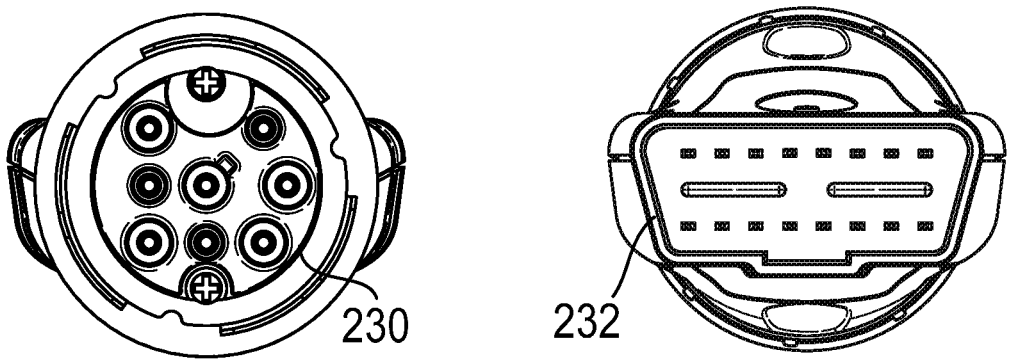
FIG. 11 shows examples of vehicle communication interfaces in accordance with the example implementations.

Next, FIG. 11 shows a VCI 230, 232 in accordance with the example implementations. The VCI 230, 232 can be arranged like the VCI 200. For example, the VCI 230, 232 can include the network transceiver 176 to communicate wirelessly with the network transceiver 176 in the computing system 190. The VCI 230 includes a connector that meets the SAE® J1939_13 standard and/or that is configured to connect to an OBDC in compliance with the SAE® J1939_13 standard. The VCI 232 includes a connector that meets the SAE® J1962 standard and/or that is configured to connect to an OBDC in compliance with the SAE® J1962 standard. In an alternative implementation, the VCI 230 and/or the VCI 232 can include a connector that meets a different vehicle data message protocol and/or that is configured to connect to an OBDC in compliance with the different vehicle data message protocol.

D. Server and Database

Next, FIG. 12 is a block diagram of the server 108 and the database 110 in accordance with the example implementations. The server 108 includes a processor 250, a transceiver 252, a memory 254, and a data bus 256. The data bus 256 operatively connects the processor 250, the transceiver 252, and/or the memory 254 to one another. In other words, the data bus 256 provides an operative connection between two or more of the processor 250, the transceiver 252, and/or the memory 254. In at least some implementations, the server 108 also includes a power supply 258 and a housing 260. The power supply 258 can supply electrical current to the processor 250, the transceiver 252, and/or the memory 254 using a power bus 280.

The description of a processor above refers to "any other processor discussed in this description. The processor 250 is such a processor and thus the aforementioned description of a processor, in general, pertains to the processor 250. Moreover, for the implementations in which the processor 250 is arranged like the INTEL® multicore microprocessor, the processor 250 can include one or more INTEL® XEON® processors having between four and twenty-eight cores. In at least some implementations of the server 108, the processor 250 can be programmed to perform any function(s) described in this description as being performed by the server 108. The description of functions that include the processor 250 transmitting data can include the processor 250 causing the transceiver 252 and/or the network transceiver 268 transmitting the data. Similarly, the description of functions that include the processor 250 receiving data can include the processor 201 receiving the data from the transceiver 252 and/or the network transceiver 268.

The description of a transceiver above refers to "any other transceiver discussed in this description. The transceiver 252 is such a transceiver and thus the aforementioned description of a transceiver, in general, pertains to the transceiver 252. Moreover, the transceiver 252 includes a network transceiver 268 that is configured to communicate over a nonvehicle network such as the communication network 106. The examples of components within the network transceiver 176 are applicable to the network transceiver 268. The network transceiver 268 can transmit data to the computing system 104, 190 and receive data transmitted from the computing system 104, 190.

The description of a memory above refers to "any other memory discussed in this description. The memory 254 is such a memory and thus the aforementioned description of a memory, in general, pertains to the memory 254.

The description of a power supply above refers to "any other power supply discussed in this description. The power supply 258 is such a power supply and thus the aforementioned description of a power supply, in general, pertains to the power supply 258.

The housing 260 surrounds at least a portion of the following: the processor 250, the transceiver 252, the memory 254, the data bus 256, the power supply 258 and/or the power bus 280. The housing 260 can support a substrate. In at least some example implementations, at least a portion of the following: the processor 250, the transceiver 252, the memory 254, the data bus 256, the power supply 258 and/or the power bus 280 is/are mounted on and/or connected to a substrate of the housing 260. In at least some implementations, the housing 260 includes a rack and/or cabinet having one or more shelves.

The memory 254 includes the CRPI 270, a vehicle history session 272, metadata 274, and an application 181. The CRPI 270 can include program instructions executable by the processor 250 to cause the server 108 to perform any function described in this description as being performed by the server 108. The vehicle history session 272 can include one or more vehicle history sessions. The metadata 274 can include metadata for each respective vehicle history session. As an example, the metadata for each respective vehicle history session includes a user GUID, a domain GUID, and a share-option identifier.

The database 110 is contained within a memory. The database 110 includes a vehicle history session 290 and a user identifier 292. The vehicle history session 290 can include one or more vehicle history sessions. The user identifier 292 can include one or more user identifiers. The vehicle history session 290 can include data parsed from a particular vehicle history session the server 108 receives from the computing system 104, 190 and data from metadata 274 corresponding to the particular vehicle history session.

As an example, the CRPI 270 can include program instructions executable by the processor 250 to receive a search request transmitted from the computing system 104, 190 and to transmit to the computing system 104, 190 a response to the search request.

As another example, the CRPI 270 can include program instructions executable by the processor 250 to receive a vehicle history session from a computing system, such as the computing system 104, 190, and to store the vehicle history session in the memory 254, as at least a part of the vehicle history session 290. In at least some implementations, the vehicle history session received from the computing system can include data in a Java Script Object Notation (JSON) format.

As another example, the CRPI 270 can include program instructions executable by the processor 250 to parse a vehicle history session received from the computing system 104, 190 and/or stored in the vehicle history session 272. The processor 250 can further execute those program instructions to cause the database 110 to store the data parsed from the vehicle history session 272 as the vehicle history session 290 within the database 110. In at least some implementations, the processor 250 parses the vehicle history session 272 arranged in the JSON format and then stores the data parsed from the vehicle history session 272 in the database 110 as a vehicle history session 290 arranged as a structured query language (SQL) database.

As another example, the CRPI 270 can include program instructions executable by the processor 250 to receive from the computing system 104, 190 a request for the application 181 and to transmit the application 181 to the computing system 104, 190 for storage in the memory 164.

E. Web Portal Device

The web portal device 135 is a computing device that includes a processor 137, a network transceiver 139, a memory 141, a user interface 143, and a data bus 145. The data bus 145 operatively connects the processor 137, the network transceiver 139, the memory 141, and/or the user interface 143 to one another. In other words, the data bus 145 provides an operative connection between two or more of the processor 137, the network transceiver 139, the memory 141, and/or the user interface 143.

The description of a processor above refers to "any other processor discussed in this description. The processor 137 is such a processor and thus the aforementioned description of a processor, in general, pertains to the processor 137.

The description of a transceiver above refers to "any other transceiver discussed in this description. The network transceiver 139 is such a transceiver and thus the aforementioned description of a transceiver, in general, pertains to the network transceiver 139.

The description of a memory above refers to "any other memory discussed in this description. The memory 141 is such a memory and thus the aforementioned description of a memory, in general, pertains to the memory 141.

The user interface 143 includes a display. The example types of displays discussed above with respect to the display 171 are applicable to the display of the user interface 143. The user interface 143 includes an input device. The example types of input devices discussed above with respect of the input device 173 are applicable to the input device of the user interface 143.

The memory 141 can include a browser application executable by the processor 137. The processor 137 can cause the user interface 143 to display the browser application. The input device of the user interface 143 can be used to input and/or select data to be transmitted to the server 108 via the network transceiver 139. The user interface 143 can display a response the network transceiver 139 receives from the server 108.

As an example, the user interface 143 can be used to input a vehicle identifier and/or a user GUID into the browser. As another example, the user interface 143 can be used to select a vehicle identifier and/or a user GUID from within the browser displayed on a display of the user interface 143. The network transceiver 139 can transmit a request for vehicle history session information from the server 108 and/or the database 110. The request can include the vehicle identifier and the user GUID. The network transceiver 139 can receive and the user interface 143 can display vehicle history session information sent from the server 108 and/or the database 110. As an example, the vehicle history session information can include a session activity log, such as the session activity log 757 shown in FIG. 22 or a summary of vehicle history sessions, such as the summary of vehicle history sessions 951 shown in FIG. 27.

In at least some implementations, the web portal device 135 is arranged as and/or includes a desktop personal computer, a laptop computer, a tablet device, or a smartphone. Examples of the personal computer, laptop computer, and tablet device listed above are applicable to the web portal device 135. As an example, the smartphone can include an IPHONE® smartphone from Apple Inc., a GALAXY® smartphone from Samsung Electronics Co., Ltd., or some other type of smartphone. Additionally or alternatively, in at least some implementations, the web portal device 135 does not include an application for generating a vehicle history session, such as the application 181.

III. Example Operation

FIG. 13 shows a flow chart depicting a set of functions 375 of a method in accordance with one or more of the example implementations. Two or more functions and/or portions of two or more functions of the set of functions 375 may, but need not necessarily, be performed at the same time. The set of functions 375 can be performed by one or more processors and/or some other component of the computing system 104, 190. For example, the set of functions 375 can be performed by the processor 162 described in this description.

Block 376 includes initiating a first vehicle history session for a vehicle associated with a particular vehicle identification number. In at least some implementations, the particular vehicle identification number includes a seventeen character VIN. One or more of those seventeen characters can be an alphanumeric character. In at least some other implementations, the particular vehicle identification number includes a unit number assigned to a vehicle by a particular vehicle fleet operator.

Next, block 377 includes generating metadata regarding the first vehicle history session. With respect to block 377, in at least some implementations, at least a portion of the metadata is generated after the first vehicle history session is initiated. As an example, the metadata that is generated after the first vehicle history session is initiated can include an identifier of the first vehicle history session. As another example, the metadata that is generated after the first vehicle history session is initiated can include metadata that indicates a VIN of the vehicle 102.

Also with respect to block 377, in the aforementioned implementations or in other implementations, at least a portion of the metadata regarding the first vehicle history session can be generated before the first vehicle history session is initiated. As an example, the metadata generated before the first vehicle history session is initiated can include metadata that indicates a user GUID associated with the computing system 104, 190, a domain GUID associated with the computing system 104, 190, and or a share-option identifier associated with the computing system 104, 190.

Further with respect to block 377, in the aforementioned implementations or in still other implementations, at least a portion of the metadata regarding the first vehicle history session can be generated proximate to a time when a report for the first vehicle history session is to be uploaded to a remote cloud-based computer-readable media. As an example, the metadata generated proximate to a time when a report for the first vehicle history session is to be uploaded can include metadata that indicates a user GUID associated with the computing system 104, 190, a domain GUID associated with the computing system 104, 190, and or a share-option identifier associated with the computing system 104, 190. In at least some implementations, proximate to the time when the report for the first vehicle history session is to be uploaded is a time within one, two, three, four, or five seconds before uploading of the report.

Next, block 378 includes determining one or more action identifiers, wherein each action identifier is correlated with a respective action requested by the computing system during the first vehicle history session.

Next, block 379 includes correlating a respective time stamp with each of the one or more action identifiers. Each respective time stamp indicates a time when a respective action correlated with each of the one or more action identifiers was performed.

Next, block 380 includes correlating a respective detail with each of the one or more action identifiers. Each detail indicates a vehicle response to a respective vehicle data message sent to the vehicle during performance of each respective action.

Figure 18:
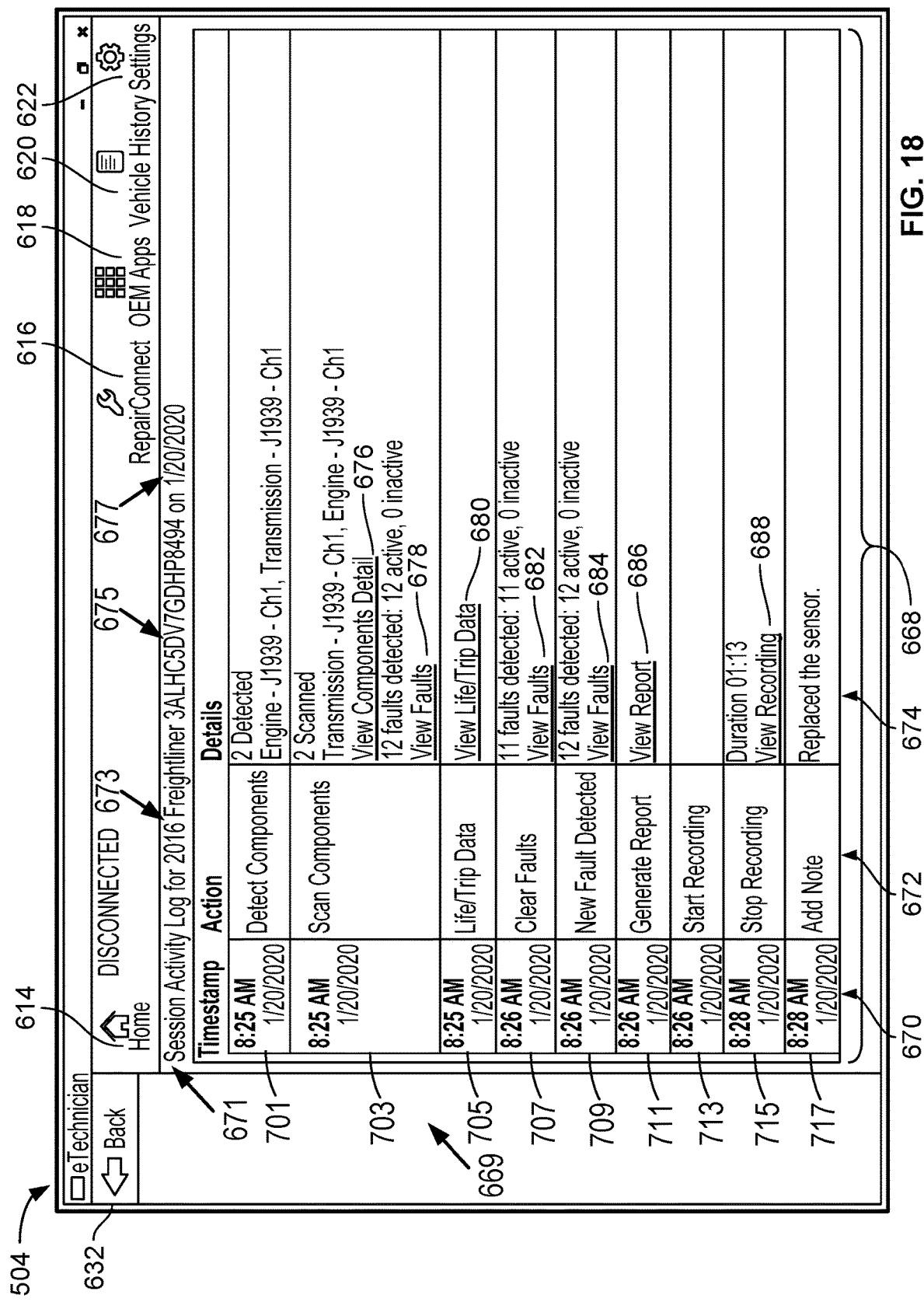

Next, block 381 includes automatically transmitting a report for the first vehicle history session over an off-board communication network for storage at a remote cloud-based computer-readable media. The report includes the metadata regarding the first vehicle history session and one or more report. Each report input includes an action identifier from among the one or more action identifiers, a respective time stamp correlated with the action identifier, and at least a summary of the respective detail correlated with the action identifier. FIG. 18 shows example report inputs. For instance, a report input 707 includes a time stamp "8:26 AM, 1/20/2020," an action identifier "Clear Faults," and the following portion of a detail "11 faults detected: 11 active, 0 inactive, view faults."

In at least some implementations, transmitting the metadata of the report includes transmitting the metadata separate from a report file including the report inputs. As an example, the metadata can be transmitted as independent parameters or a metadata object including one or more of the following parameters: a user GUID, a domain GUID, a share-option identifier, or an identifier of a vehicle history session.

In accordance with a first further implementation that includes a computing system performing one or more functions of the set of functions 375 or all of the functions of the set of functions 375, the metadata includes the particular vehicle identification number. Moreover, the method includes determining whether the particular vehicle identification number is a valid vehicle identification number. The method also includes that automatically transmitting the report for the first vehicle history session is conditioned on the particular vehicle identification number being a valid vehicle identification number.

In accordance with at least some of instances of the first further implementation, the metadata includes a share-option identifier that is associated with the first vehicle history session, and the method further includes determining whether the share-option identifier associated with the first vehicle history session is sharing or no-sharing. In these implementations, automatically transmitting the report for the first vehicle history session is further conditioned on the share-option identifier associated with the first vehicle history session being sharing.

As an example, the sharing share-option identifier for the aforementioned implementations can be set as global sharing, domain sharing, or user sharing. If the share-option identifier indicates domain sharing, the metadata can include a domain identifier (e.g., a domain GUID) of a domain associated with the computing system or a user using the computing system. If the share-option identifier indicates user sharing, the metadata can include a user identifier associated with the computing system or a user using the computing system. The user identifier can include a globally unique identifier, such as a user GUID mapped to an e-mail address at the server 108 and/or the database 110.

In accordance with a second further implementation that includes a computing system performing one or more functions of the set of functions 375 or all of the functions of the set of functions 375, the metadata includes a share-option identifier associated with the first vehicle history session, and the method further includes determining whether the share-option identifier associated with the first vehicle history session is sharing or no-sharing. Moreover, automatically transmitting the report for the first vehicle history session is conditioned on the share-option identifier associated with the first vehicle history session being sharing. In at least some implementations, determining whether the share-option identifier associated with the first vehicle history session is sharing or no-sharing includes determining whether the share-option identifier associated with the computing device 104, 190 that generated the first vehicle history session is sharing or no-sharing and using the same share-option identifier.

As an example, the sharing share-option identifier for the aforementioned implementations can be set as global sharing, domain sharing, or user sharing. If the share-option identifier indicates domain sharing, the metadata can include a domain identifier of a domain associated with the computing system or a user using the computing system. If the share-option identifier indicates user sharing, the metadata can include a user identifier associated with the computing system or a user using the computing system. The user identifier can include a globally unique identifier, such as a GUID mapped to an e-mail address at the server 108 and/or the database 110.

In accordance with a third further implementation that includes a computing system performing one or more functions of the set of functions 375 or all of the functions of the set of functions 375, the method further includes determining, by the computing system, a type of vehicle communication interface of a particular vehicle communication interface selected as an interface between the vehicle and the computing system. The method also includes transmitting, by the computing system to the particular vehicle communication interface, a request to scan electronic control units on the vehicle. The request is based on the type of vehicle communication interface. Furthermore, the method includes receiving, at the computing system from the particular vehicle communication interface, a response to the request. The response includes a list of electronic control units disposed on the vehicle. Furthermore still, the method includes receiving, at the computing system, a selection to connect to one or more electronic control units contained on the list of electronic control units.

In accordance with a fourth further implementation that includes a computing system performing one or more functions of the set of functions 375 or all of the functions of the set of functions 375, the method also includes determining, by the computing system, that the computing system is connected to the vehicle. For at least the fourth further implementation, initiating the first vehicle history session for the vehicle occurs in response to determining that the computing system is connected to the vehicle.

In accordance with a fifth further implementation that includes a computing system performing one or more functions of the set of functions 375 or all of the functions of the set of functions 375, the report also includes a further report input. The further report input includes a further action identifier and a further time stamp correlated with the further action identifier. The further action identifier is indicative of an action performed by the computing system that does not require sending a vehicle data message to the vehicle. The further time stamp indicates when the further action was performed.

In at least some instances of the fifth further implementations, the action performed by the computing system that does not require sending a vehicle data message to the vehicle includes adding a note to the report or generating the report. In those or at least some other instances of the fifth further implementations, the further report input includes a detail correlated with the further action identifier, the further time stamp, or both the further action identifier and the further time stamp.

In accordance with a sixth further implementation that includes a computing system performing one or more functions of the set of functions 375 or all of the functions of the set of functions 375, a computing system that performs the set of functions 375 includes a display. The method further includes before initiating or after ending the first vehicle history session, transmitting, by the computing system, a request to search the remote cloud-based computer-readable media to locate all reports for vehicle history sessions pertaining to a selected vehicle identification number. The request includes a share-option identifier associated with the computing system. The method also includes displaying, by the computing system on the display, an overview of vehicle history sessions regarding the selected vehicle identification number that is based, at least in part, on a response to the request. The response includes a respective indicator for each of one or more vehicle history sessions regarding the selected vehicle identification number stored at the remote cloud-based computer-readable media. A report associated with each of the one or more vehicle history sessions regarding the selected vehicle identification number includes a share-option identifier that matches the share-option identifier associated with the computing system.

In at least some instances of the sixth further implementations, the overview includes a particular indicator for a particular vehicle history session regarding the selected vehicle identification number. The method also includes transmitting, by the computing system over the off-board communication network, a request for a particular report that is associated with the particular vehicle history session. The request for the particular report includes the particular indicator. Furthermore, the method includes displaying, by the computing system on the display, the particular report, received in response to the request for the particular report. In some cases, the particular report includes multiple report inputs, and each report input of the particular report is configured to be displayed in a respective row of the particular report arranged as a grid of multiple columns and multiple rows, a respective column of the particular report arranged as the grid of multiple columns and multiple rows, a single display card, or as wizard display page.

In at least some instances of the sixth further implementations, the selected vehicle identification number matches the particular vehicle identification number. The request is transmitted after ending the first vehicle history session. The overview of vehicle history sessions regarding the selected vehicle identification number is further based on one or more vehicle history sessions stored in computer-readable media local to the computing system. The one or more vehicle history sessions stored in computer-readable media local to the computing system include the first vehicle history session. Additionally, the method includes generating, by the computing system, the overview, at least in part, by aggregating the respective indicator for each of one or more vehicle history sessions regarding the selected vehicle identification number stored at the remote cloud-based computer-readable media and a respective indicator for each of the one or more vehicle history sessions stored in computer-readable media local to the computing system. In at least some implementations, aggregating the respective vehicle history session indicators can include sorting the vehicle history sessions based on a particular type of identifier within each vehicle history session, such as an identifier of a time stamp or of a vehicle.

In at least some instances of the sixth further implementations, the overview includes an indicator of the report for the first vehicle history. In accordance with these implementations, the method also includes displaying, on the display, the report for the first vehicle history. The one or more report inputs of the report for the first vehicle history include a particular report input. Additionally, the particular report input includes a particular action identifier from among the one or more action identifiers, a particular time stamp correlated with the particular action identifier, and at least a particular summary of a particular detail correlated with the particular action identifier. Furthermore, the particular summary includes a link for accessing at least a portion of the particular detail. Furthermore still, displaying the report for the first vehicle history includes displaying the link on the display. The method also includes displaying, by the computing system on the display, at least the portion of the particular detail in response to a selection of the link for accessing at least a portion of the particular detail.

In accordance with at least some of the implementations discussed in the preceding paragraph, the particular action identifier includes an action identifier associated with requesting life or trip data from the vehicle. Moreover, at least the portion of the particular detail includes life or trip data the computing system received from the vehicle in response to transmitting a request for life or trip data, and displaying at least the portion of the particular detail includes displaying the life or trip data.

In at least some instances of the sixth further implementations, the summary of the respective detail correlated with the action identifier for a particular action identifier of the one or more action identifiers includes a link. Moreover, the method of those implementations further include determining that a selection of the link has occurred while the display is displaying the report, and displaying, on the display, a further detail correlated with the particular action identifier. In some cases, displaying the further detail correlated with the particular action identifier includes displaying the further detail correlated with the particular action identifier overlaid upon the report.

Next, FIG. 14 shows a flow chart depicting a set of functions 385 of a method in accordance with one or more of the example implementations. Two or more functions and/or portions of two or more functions of the set of functions 385 may, but need not necessarily, be performed at the same time. A method that includes performing the set of functions 385 can further include performing one or more functions of the set of functions 375 or all of the functions of the set of functions 375 shown in FIG. 13. Moreover, performing one or more functions of the set of functions 385 may include performing one or more functions from the set of functions 375.

In at least some implementations, the set of functions 385 are performed by the processor 162, alone or in combination with one or more other components of the computing system 104. In accordance with those implementations, the vehicle communications transceiver 178 functions as the vehicle communication interface discussed in the description of the set of functions 385. In at least some other implementations, the set of functions are performed by the processor 162 and the vehicle communication interface 200, alone or in combination with one or more other components of the computing system 190.

Block 386 includes determining a selected vehicle communication interface. Determining the selected vehicle communication interface can include determining a vendor of the vehicle communication interface and a connection type to be used by the vehicle communication interface. Additionally or alternatively, determining the selected vehicle communication interface can include determining a model identifier associated with the vehicle communication interface.

Figure 16:
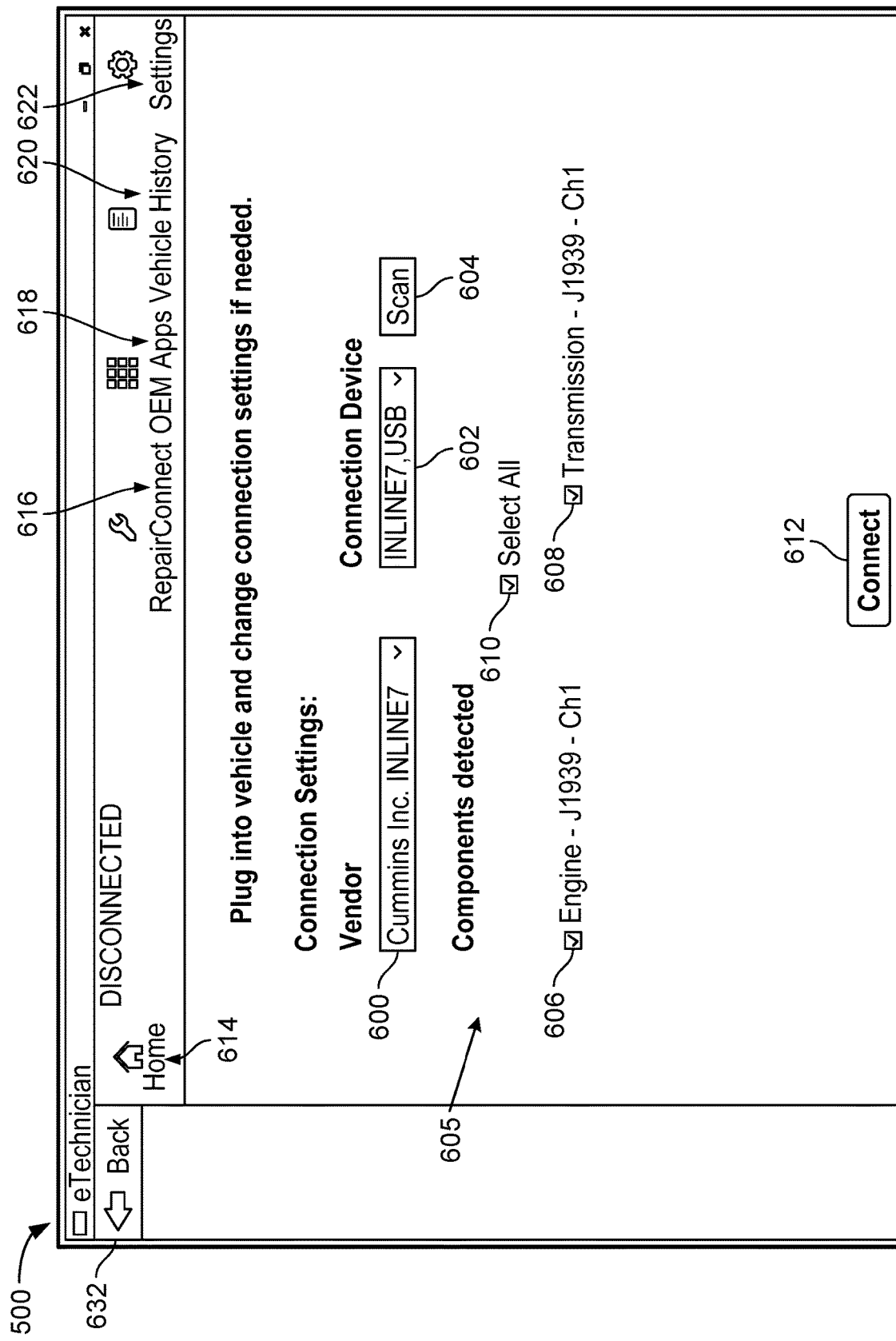
FIG. 16, FIG. 17, FIG. 18, FIG. 19, FIG. 20, FIG. 21, FIG. 22, FIG. 23, FIG. 24, FIG. 25, FIG. 26, FIG. 27, FIG. 28, FIG. 29, and FIG. 30 are example graphical user interfaces in accordance with the example implementations.

In at least some implementations, the processor 162 determines the selected vehicle communication interface via a selection made on a GUI, such as the GUI 500 shown in FIG. 16. In accordance with those implementations that use a GUI, such as the GUI 500, the processor 162 determines the selected vehicle communication interface via selections made the VCI-vendor-selection menu 600 and the VCI-connection-type menu 602. In those or in at least some other implementations, the processor 162 can alternatively determine the selected vehicle communication interface by receiving a VCI-identification communication from the vehicle communication interface. The VCI-identification communication can include data that indicate the vendor and model of the vehicle communication interface. The VCI-identification communication can include data indicating the connection type being used by the vehicle communication interface, such as the connection-type can be a USB connection, a WiFi® standard connection, a BLUETOOTH® standard connection. Furthermore still, in at least some other implementations, the computing system 104 determines the selected vehicle communication interface is the vehicle communications transceiver 178 contained therein.

After determining the selected vehicle communication interface, the processor 162 can request the vehicle communication interface to perform an action to detect vehicle components on the vehicle 102. The action to detect vehicle components on the vehicle can include transmitting one or more messages onto the vehicle network 117 and monitoring the vehicle network for messages sent in response to the one or more messages transmitted by the vehicle 102.

Next, block 387 includes determining a vehicle communication interface is connected to a vehicle. Determining the vehicle communication interface is connected to the vehicle 102 can include the processor 162 determining that the vehicle communications transceiver 178 and/or the vehicle communication interface 200 received from the vehicle 102 a vehicle data message transmitted over the vehicle network 117. In at least some implementations, the processor 162 is programmed to determine whether the vehicle communication interface is connected to the vehicle 102 in response to determining that the connect USC 612 has been selected. Additionally or alternatively, the processor 162 is programmed to determine whether the vehicle communication interface is connected to the vehicle 102 in response to determining that the scan USC 604 has been selected.

Next, block 388 includes initiating a vehicle history session. In at least some implementations, initiating the vehicle history session can include initiating the first vehicle history session for the vehicle associated with the particular vehicle identification number, as set forth in block 376 above.

In at least some implementations, initiating the vehicle history session can include generating a file within the memory 164 for storing at least a portion of a report for the vehicle history session. As an example, the file can include a mark-up language file, such as an XML file. Moreover, initiating the vehicle history session or after initiating the vehicle history session, an identifier of the vehicle history session and/or a time stamp indicating when the vehicle history session was initiated can be generated. In at least some implementations, the vehicle history session identifier and/or the aforementioned time stamp can be stored as metadata correlated with the vehicle history session file and/or added to the vehicle history session file. FIG. 37A, FIG. 37B. FIG. 37C. FIG. 37D, FIG. 37E FIG. 37F FIG. 37G, FIG. 37H, FIG. 37I, FIG. 37J, FIG. 37K. FIG. 37L, FIG. 37M, FIG. 37N, FIG. 37O, FIG. 37P, FIG. 37Q. FIG. 37R, FIG. 37S, and FIG. 37T, which extend across twenty drawing sheets FIG. 37A, FIG. 37B, FIG. 37C, FIG. 37D, FIG. 37E, FIG. 37F, FIG. 37G, FIG. 37H, FIG. 37I, FIG. 37J, FIG. 37K. FIG. 37L, FIG. 37M, FIG. 37N, FIG. 37O, FIG. 37P. FIG. 37Q, FIG. 37R, FIG. 37S and FIG. 37T show an example vehicle history session file. Line 2 of that example file shows an example of a vehicle history session identifier and a time stamp indicating when the vehicle history session was initiated.

Initiating the vehicle history session can include causing the computing system 104, 190 to transition from a state in which the computing system 104, 190 is not waiting for performance of a vehicle history session action to a state in which the computing system 104, 190 is waiting for performance of a vehicle history session action.

Next, block 389 includes waiting for performance of a vehicle history session action. In at least some implementations, an action of the vehicle history session occurs automatically. As an example, an automatic action of vehicle history session can include an action occurring as a result of an ECU on the vehicle 102 transmitting a vehicle data message over the vehicle network 117. In some instances, that vehicle data message is a broadcast vehicle data message that is not directed to any other specific ECU on the vehicle network 117. In other instances, the vehicle data message can be directed to one or more specific ECUs on the vehicle network, to the computing system 104, 190, or to the VCI 200.

Additionally or alternatively, an action of a vehicle history session can occur in response to a user request, such as a request made by selecting a USC displayed on a GUI, such as the GUI 500, 502. For example, selecting the record USC 624 in the GUI 502 can cause performance of a recording action.

Moreover, while waiting for performance of a vehicle history session action, the processor 162 can determine that the vehicle history session has ended. In at least some implementations, the processor 162 can determine that the vehicle history session has ended by receiving a selection of a USC displayed within a GUI to end the vehicle history session. As an example, that USC could include the disconnection USC 628, the home USC 614, the back USC 632, the vehicle-history USC 620, or some other USC. Additionally or alternatively, the processor 162 can determine that the vehicle history session has ended by determining that the vehicle communication interface is no longer connected to the vehicle 102.

Next, block 390 includes adding a report input to a vehicle history session. In at least some implementations, adding the report input can include and/or occur after performing the functions of block 378, block 379, and/or block 380. Referring to the example vehicle history session file shown in FIG. 37A to FIG. 37T, adding a report input to a vehicle history session for scanning components on a vehicle can include adding lines 8 to 58 into the example vehicle history session file. Referring to the same vehicle history session file, adding a report input to a vehicle history session for life/trip data received from the vehicle can include adding lines 59 to 128. Adding a report input to the vehicle history session with respect to a clearing faults action can include adding lines 129 to 159 of the vehicle history session file shown in FIG. 37A to FIG. 37T. Adding a report input to the vehicle history session with respect to a receiving faults action can include adding lines 160 to 194 of the vehicle history session file shown in FIG. 37A to FIG. 37T. Adding a report input to the vehicle history session with respect to a requesting a full report can include adding lines 195 to 197 of the vehicle history session file shown in FIG. 37A to FIG. 37T. Adding a report input to the vehicle history session with respect to a requesting another full report can include adding lines 198 to 200 of the vehicle history session file shown in FIG. 37A to FIG. 37T. Adding a report input to the vehicle history session with respect to adding a log note can include adding lines 201 to 202 of the vehicle history session file shown in FIG. 37A to FIG. 37T. Adding a report input to the vehicle history session with respect to a requesting another full report can include adding lines 203 to 205 of the vehicle history session file shown in FIG. 37A to FIG. 37T. Adding a report input to the vehicle history session with respect to a requesting yet another full report can include adding lines 206 to 208 of the vehicle history session file shown in FIG. 37A to FIG. 37T. Adding a report input to the vehicle history session with respect to a requesting recording can include adding lines 209 to 214 of the vehicle history session file shown in FIG. 37A to FIG. 37T.

Next, block 391 includes completing storing a vehicle history session report in a local memory. As an example, completing storing the vehicle history session report can include adding a line in a file to indicate the vehicle history session report is complete, such as line 215 in the example vehicle history session file shown in FIG. 37A to FIG. 37T. As another example, completing storing the vehicle history session report can include can include generating metadata regarding the vehicle history session report and/or correlating metadata with the vehicle history session report if the processor did not previously correlate the metadata with the vehicle history session report while the with the vehicle history session report while the computing system 104, 190 was in the state of waiting for performance of a vehicle history session action.

Next, block 392 includes determining whether a condition indicating the vehicle history session report should be uploaded to a remote cloud-based memory exists. As an example, the condition can include that a VIN associated with the vehicle 102 is determined to be a valid VIN. In at least some implementations, the processor 162 executes program instructions stored the memory 164 to determine whether the VIN is valid based on a check digit within the VIN being a correct check digit. In those or in other implementations, the processor 162 transmits the VIN to the server 108 or another server on the communication network 106 that determines whether the VIN is valid and responds to the processor 162 with data indicating whether the VIN is valid.

As another example, the condition can include that a share-option identifier associated with the vehicle history session and/or the computing device is set to sharing. If the share-option identifier is set to no-sharing, than the processor 162 determines that the vehicle history session should not be uploaded to the remote cloud-based memory. On the other hand, if the share-option identifier is set to sharing, that the processor 162 determines that the vehicle history session should be uploaded to the remote cloud-based memory.

Next, block 393 includes uploading the vehicle history session to the remote cloud-based memory. In at least some implementations, uploading the vehicle history session can include or occur after converting the vehicle history session report from a first format to a second format. As an example, the first format can include an XML file format and the second format can include a JSON file or data interchange format. In at least some other implementations, uploading the vehicle history session can occur without converting the vehicle history session report. For instance, if the vehicle history session report is stored in the memory 164 as an XML file, the XML file can be uploaded to the server 108 and/or database 110. As an example, the conversion of the vehicle history session can include converting the vehicle history session using an open source library called Newton-soft.Json.

Additionally or alternatively, uploading the vehicle history session can include automatically transmitting the report for the first vehicle history session over the off-board communication network for storage at the remote cloud-based computer-readable media as set forth in block 381 shown in FIG. 13.

Next, FIG. 15 shows a flow chart depicting a set of functions 410 of a method in accordance with one or more of the example implementations. Two or more functions and/or portions of two or more functions of the set of functions 410 may, but need not necessarily, be performed at the same time. A method that includes performing the set of functions 410 can further include performing: one or more or all of the functions of the set of functions 375 shown in FIG. 13, one or more or all of the functions of the set of functions 385 shown in FIG. 14, or one or more or all of the functions of the set of functions 375 shown in FIG. 13 and one or more functions of the set of functions 385 shown in FIG. 14.

Block 411 includes registering a computing system at a server for accessing vehicle history sessions. In at least some implementations, registering the computing system can include the computing system 104, 190 transmitting an e-mail address to the server 108 and receiving a user GUID that the server 108 maps to the e-mail address. The server 108 can send a secret code to the e-mail address. The computing system 104, 190 can display a GUI including a code field 974 for entry of the secret code and a verify USC 976 to cause the secret code to be sent to the server 108 to verify the e-mail address received at the server 108 was correct. The computing system 104, 190 can display a GUI 512 shown in FIG. 28 while registering the computing system 104, 190. In at least some implementations, the secret code includes a randomly selected string of characters, such as randomly selected string of ASCII characters.

Next, block 412 incudes selecting a share setting for computing system. Selecting the share setting can include selecting "no-sharing" if sharing of vehicle history sessions generated at the computing system 104, 190 is not desired. Alternatively, selecting the share setting can include selecting "sharing" if sharing of vehicle history session generated at the computing system 104, 190 beyond the computing system 104, 190 is desired. If the share setting of "sharing" is selected, than selecting the share setting can also include selecting a share-option identifier indicating a share type, such as "user" sharing, "domain" sharing, or "global" sharing. Selection of a share setting and a share type can occur via use of the GUI 512 shown in FIG. 28. The share setting and the share type can be stored in the vehicle history session metadata 185.

Next, block 413 includes determining a vehicle identifier for a particular vehicle. In at least some implementations the vehicle identifier is a VIN correlated with the particular vehicle, a portion of a VIN (e.g., the first eleven characters of the VIN correlated with the particular vehicle) of a vehicle type corresponding to the particular vehicle, or a unit number associate with the particular vehicle that belongs to a particular fleet of vehicles. Moreover, determining the VIN can occur via selecting or entering the VIN using a VIN selector in a GUI, such as the VIN selector 908 in the GUI 508 shown in FIG. 26. Additionally or alternatively, determining the VIN at the computing system 104, 190 can include determining the VIN from a vehicle data message containing the VIN.

Next, block 414 includes requesting vehicle history session information from a server. In at least some implementations, requesting the vehicle history session information can include transmitting a request to the server 108. That request can include the vehicle identifier determined at block 413, the user GUID associated with the computing system 104, 190, a share setting and the share-option identifier selected for the computing system 104, 190. The server 108 can determine vehicle history session information that can be provided to the computing system 104, 190 or the web portal device 135, whichever transmitted the request. The server's determination can be based on the vehicle identifier, the user GUID, a domain GUID, the share setting and the share-option identifier. As an example, the vehicle history session information can include a session activity log, such as the session activity log 757 shown in FIG. 22 or a summary of vehicle history sessions, such as the summary of vehicle history sessions 951 shown in FIG. 27.

Next, block 415 includes displaying the vehicle history session information. In at least some implementations, displaying the vehicle history session information can include displaying the vehicle history session information in a GUI like a GUI show in FIG. 18 to FIG. 27, FIG. 29, or FIG. 30, and/or the type of vehicle history session information shown in any of those figures. In at least some implementations, displaying the vehicle history session information can include displaying a link that is selectable to access at least a portion of a detail correlated with a report input, such as the link 676, 678 shown in FIG. 18.

Next, block 416 includes requesting a detail correlated with a detail indicator in vehicle history session information. In at least some implementations, the vehicle history session information received from the server 108 includes the detail correlated with the detail indicator. In accordance with those implementations, requesting the detail correlated with the detail indicator can include requesting the detail from the memory local to the computing system or web portal device that requested the detail. In accordance with some other implementations, requesting the detail correlated with the detail indicator can include requesting the detail from the server 108 and/or the database 110 by transmitting a request to the server than indicates the detail indicator was selected from a display that is displaying the vehicle history session information.

Next, block 417 includes displaying the detail correlated with the detail indicator in the vehicle history session information. In at least some implementations, displaying the detail correlated with the detail indicator can include displaying a window overlaid upon a GUI showing the vehicle history session information. FIG. 19, FIG. 20, FIG. 21, FIG. 23, FIG. 24, and FIG. 25 show examples of displaying a detail correlated with the detail indicator, such as the link 676, link 680, link 682, link 768, link 772, and link 774, shown in FIG. 18 or FIG. 22. In at least some implementations, displaying the detail correlated with the detail indicator can include displaying a new GUI (such as the GUI 518 shown in FIG. 32, the GUI 520 shown in FIG. 33, or the GUI 522 shown in FIG. 34) other than the GUI that includes the detail indicator.

In at least some implementations, determining the vehicle identifier for the particular vehicle, requesting the vehicle history session information from server 108, displaying vehicle history session information, requesting the detail correlated with detail indicator in vehicle history session information, and displaying the detail correlated with the detail indicator in the vehicle history session information can be carried out by the web portal device 135.

In at least some implementations, determining the vehicle identifier for the particular vehicle, requesting the vehicle history session information from server 108, displaying vehicle history session information, requesting the detail correlated with detail indicator in vehicle history session information, and displaying detail correlated with the detail indicator in the vehicle history session information can be carried out by the computing system 104, 190.

IV. Example Graphical User Interfaces

Next, FIG. 16 to FIG. 30 show graphical user interfaces (GUIs) 500 to 516. One or more of the GUIs in FIG. 16 to FIG. 30 can include a natural user interface (NUI) that includes one or more user interface elements that operate, in combination with another user interface component and a processor, using voice recognition, motion detection, gesture detection, and/or aural outputs. In one respect, the processor 162 is configured to output the GUIs 500 to 516 to the display 171. The display 171 is configured to display the GUIs 500 to 516. One or more of the GUI 500 to GUI 516 can include a user-selectable control (USC). The processor 162 is configured to detect selection of a USC and cause one or more functions to be performed in response to determining the USC has been selected. Selection of a USC can occur using the input device 173. For instance, a USC can be selected using a push button key of the input device 173 or by touching the display 171 configured as a touch screen display.

In particular, FIG. 16 shows the GUI 500. The GUI 500 includes a VCI-vendor-selection menu 600, a VCI-connection-type menu 602, and a scan USC 604. The VCI-vendor-selection menu 600 is configured to allow a user to select a VCI that is within the computing system 104 or a VCI that is or that will be operatively connected directly to the computing system 190. Any menu described in this description can be arranged as a drop-down menu, a menu bar menu with or without one or more sub-menus, or some other type of menu. The processor 162 is configured to determine a VCI selection (i.e., a selected VCI) through use of the VCI-vendor-selection menu 600. A VCI within the computing system 104 or connected to the computing system 190 is referred to herein, as least occasionally, as a "connected VCI." In at least some implementations, the VCI selectable from the VCI-vendor selection menu 600 include a VCI associated with a VCI application driver that has been installed on the computing device 104, 190. The application driver can be stored within the memory 164 (e.g., in the CRPI 180 or the application 181).

The VCI-connection-type menu 602 is configured to allow a user to select a VCI that is or will be operatively connected to the computing system 190. The processor 162 is configured to determine a type of connection (i.e., a connection-type) for the selected VCI through use of the VCI-connection-type menu 602. As an example, the connection-type can be a universal serial bus (USB) connection, a WiFi® standard connection, a BLUETOOTH® standard connection. Other examples of a connection-type for a selected VCI are also possible.

In response to a selection of the scan USC 604, the processor 162 is configured to transmit one or more vehicle data messages using the vehicle communications transceiver 178 in order to scan the connected vehicle to determine which ECU are disposed within the connected vehicle.

The GUI 500 also includes a vehicle component selector section 605 configured to allow a user to select one or more vehicle components identified by the computing system 104, 190 during a scan of the connected vehicle in response to selection of the scan USC 604. The vehicle component selector section 605 includes means for selecting identified vehicle components individually or collectively. As shown in FIG. 16 the vehicle component selector section 605 includes a vehicle component selector 606 for selecting a first component, such as an engine controlled by an ECU located on channel-1 of a SAE J1939 vehicle communication link, and a vehicle component selector 608 for selecting a second component different than the first component, such as a transmission controlled by an ECU on the channel-1. The vehicle component selector section 605 also includes a vehicle component selector 610 for selecting all vehicle components identified during the aforementioned scan. The vehicle component selector section 605 can include a separate, respective selector for each vehicle component detected during the scan of the connected vehicle. As an example, the vehicle component selector 606, 608, 610 can include a check-box.

The GUI 500 also includes a connect USC 612. In response to a determining the connect USC 612 has been selected, the processor 162 is configured to transmit one or more vehicle data messages to each vehicle component that was selected using the vehicle component selector section 605. As an example, the vehicle data messages sent to each selected vehicle component can include a vehicle data message to solicit component details from the vehicle component. In response to receiving a vehicle data message with a component detail, the processor 162 can parse the vehicle data message to determine the component detail indicated within the vehicle data message and the type of component detail and responsively add to a vehicle history session report an input that indicates the type of component detail and the component detail. Examples of such a report input are shown in lines 11 to 20 in the example vehicle history session file shown in FIG. 37A to FIG. 37T.

As another example, the vehicle data messages sent to each selected vehicle component can include a vehicle data message to request fault information from the selected vehicle component. In response to receiving a vehicle data message with fault information, the processor 162 can parse the vehicle data message to determine a fault identifier and a fault state (e.g., active or inactive) and responsively add to a vehicle history session report an input that indicates the fault identifier and fault state. Examples of such a report input are shown in lines 29 to 54 in the example vehicle history session file shown in FIG. 37A to FIG. 37T.

The GUI 500 as well as one or more other of the GUI 502 to GUI 516 includes a home USC 614, an online-service-information-request USC 616, an OEM-applications USC 618, a vehicle-history USC 620, a settings USC 622, and/or a back USC 632. The processor 162 is configured to switch from displaying a GUI with the home USC 614 to displaying a GUI designated as a home GUI in response to a selection of the home USC 614. The home GUI can include a vehicle selection screen configured to allow a user to select a vehicle. As an example, selection of a vehicle can occur by entry of a VIN, by entry of a year, make and model of a vehicle, by entry of a fleet vehicle unit number, or by entry of some other data indicative of a vehicle.

In response to a selection of the online-service-information-request USC 616, the processor 162 can cause the display 171 to display a GUI that includes a USC selectable to cause the processor 162 to transmit a request for online service information. As an example, the online service information can include diagnostic information, wiring diagrams, connector diagrams, photos and tests for various types of vehicles (such as medium and/or heavy duty trucks) from a vehicle service information provider, such as Mitchell Repair Information LLC of Poway, California. Other examples of the diagnostic information are also possible.

In response to a selection of the OEM-applications USC 618, the processor 162 can cause the display 171 to display a GUI that includes a USC selectable to cause the processor 162 to display on the display 171 an output by an application executable by the processor 162 to cause the display 171 to display an application provided by a vehicle OEM.

Figure 26:
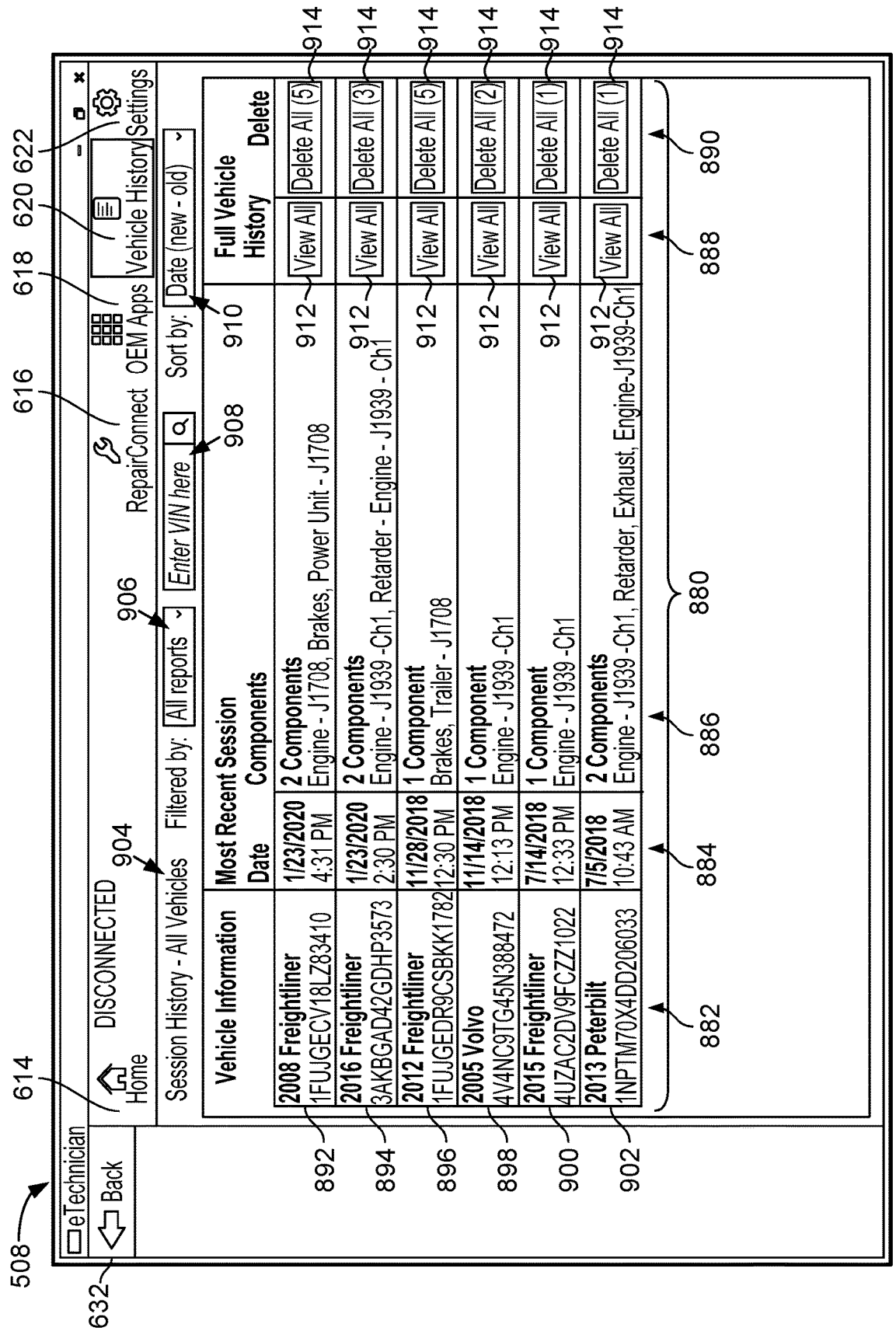

In response to a selection of the vehicle-history USC 620, the processor 162 can cause the display 171 to display a GUI that shows an identifier for one or more identifiers of a vehicle history session, such as the GUI 508 shown in FIG. 26. Alternatively, in response to a selection of the vehicle-history USC 620, the processor 162 can cause the display 171 to display a GUI that shows an identifier for one or more identifiers of a vehicle history sessions correlated with a selected vehicle, such as the GUI 510 shown in FIG. 27.

In response to a selection of the settings USC 622, the processor 162 can cause the display 171 to display a setting screen. The setting screen can includes user selectable controls to check for a software update to the computing system 104, 190, to change a units of measurement (e.g., English to Metric), add company information for inclusion on a vehicle history session report, review registration information, log into a server that provides service information, select a share-option setting (e.g., sharing or no sharing), and/or select a sharing type (e.g., user, domain or global).

In response to a selection of the back USC 632, the processor 162 can cause the display 171 to display a GUI that was displayed immediately prior to the GUI that includes the back USC 632 that was selected.

Figure 17:
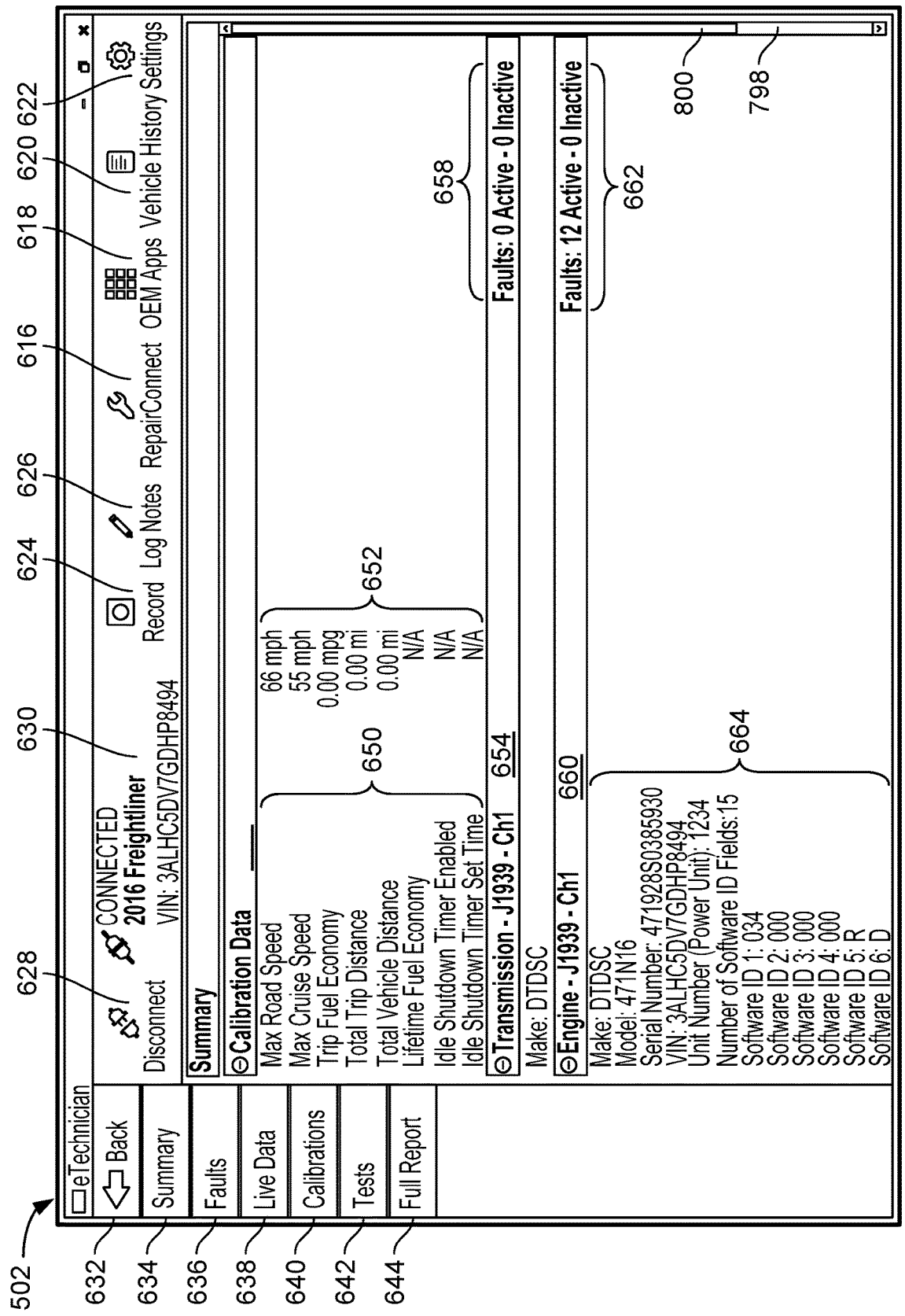

Next, FIG. 17 shows a GUI 502. The computing system 104, 190 can display the GUI 502 during the vehicle history session.

The GUI 502 includes a disconnect USC 628. In response to determining the disconnect USC 628 has been selected, the processor 162 can end a current vehicle history session.

The GUI 502 include a connection icon 630. The connection icon 530 can provide an indication that the computing system 104, 190 is connected to the vehicle 102 and a VIN associated with the vehicle 102.

The GUI 502 includes a record USC 624. In response to determining the log notes USC 626 has been selected, the processor 162 enables selection of data points from a graphical user interface displaying live data received from the vehicle 102.

The GUI 502 includes a log notes USC 626. In response to determining the log notes USC 626 has been selected, the processor 162 displays a text entry window for entry of text for a note. The text entry window can include a cancel USC selectable such that the note is not saved as a report input to a vehicle history session. The text entry window can include a save USC selectable such that the note is saved as a report input to the vehicle history session.

The GUI 502 includes a summary USC 634. In response to determining the summary USC 634 has been selected, the processor 162 displays a summary regarding one or more vehicle components within the vehicle 102. As an example, the summary can include one or more of the following: a VIN, an application loaded, a year, a module, a VDM protocol, a software part number, an end model part number, a base model part number, or a calibration part number. The GUI 502 show an example summary that includes calibration parameter identifiers 650 and corresponding calibration parameters 652, a fault count 658 pertaining to a first vehicle component indicated by a component identifier 654, a fault count 662 pertaining to a second vehicle component indicated by a component identifier 660, and data 664 regarding the second vehicle component. The GUI 502 includes a scroll pane including a track 798 and a button 800 operable to cause further information of the summary to be displayed within the GUI 502.

The GUI 502 includes a faults USC 636. In response to determining the faults USC 636 has been selected, the processor 162 displays fault data retrieved from the vehicle. The fault data can include a list of active and inactive faults, a description of one or more faults, freeze-frame data for a selected fault, and diagnostic information regarding the selected fault.

The GUI 502 includes a live data USC 638. In response to determining the live data USC 638 has been selected, the processor 162 displays real-time data for any vehicle component on the vehicle 102 that will respond to requests for vehicle data or that is broadcasting vehicle data message(s).

The GUI 502 includes a calibrations USC 640. In response to determining the calibrations USC 640 has been selected, the processor 162 displays a GUI from which a calibration available for uploading to a vehicle component on the vehicle 102 can be selected for uploading to the vehicle component. As an example, selecting the calibration can include selecting or entering a programmable parameter for the vehicle component. After selecting or entering the programmable parameter, the computing system 104, 190 can send the programmable parameter to the vehicle 102 in a request to calibrate the vehicle component. Moreover, the processor 162 can add to a vehicle history session a report input indicative of the vehicle component being calibrated. A detail regarding that vehicle history section action can indicate the selected programmable parameter and a date and time when the vehicle component was calibrated. At a subsequent time, the computing system 104, 190 can view the vehicle history session and the detail regarding calibrating the vehicle component to assess how the vehicle has performed since performing the calibration and/or to determine a different value of the programmable parameter for re-calibrating the vehicle component.

The GUI 502 includes a tests USC 642. In response to determining the tests USC 642 has been selected, the processor 162 displays a GUI from which tests to be performed to the vehicle 102 during the vehicle history session can be selected and started.

The GUI 502 includes a full report USC 644. In response to determining the full report USC 644 has been selected, the processor 162 can display selectors for selecting what types of data will be included in a report generated during the vehicle history session, such as faults, live data, and/or trip data, and display selectors for selecting what type of components will be covered in the report.

Next, FIG. 18 shows a GUI 504. The GUI 504 includes a session activity log 669 for a particular vehicle history session captured for a particular vehicle. An identifier 671 of the session activity log 669 includes year and make identifiers 673 for the particular vehicle, a VIN 675 of the particular vehicle, and temporal information 677 correlated with the session activity log 669. As an example, the GUI 504 can be displayed in response to selecting a vehicle history session summary 940 from the GUI 510 shown in FIG. 27.

In at least some implementations, the session activity log 669 is displayed in a grid 668 in which each row of the grid 668 includes a report input, and each column of the grid 668 includes one of the following columns: a temporal column 670 including a time stamp and/or a date; an action column 672 including action identifiers; and a detail column 674. In other implementations, each column of a grid can represent a report input, and each row of the grid can include one of the following rows: a temporal row including a time stamp and/or a date; an action row including action identifiers; and a row column. In other implementations, the session activity log 669 is displayed in a format other than a grid format. In at least some implementations, the time stamp can indicate a time when the computing system 104, 190 receives an input requesting performance of the respective action or a time when the computing system 104, 190 receives the response to a vehicle data message sent as part of performing the action.

The session activity log 669 includes a report input 701, 703, 705, 707, 709, 711, 713, 715, 717. In one respect, the report input 701, 703, 707, 711, 713, 715, 717 is a report input that includes an action identifier for an action that is performed in response to a user request, and the report input 705, 709 is a report input that includes an action identifier for an action that is performed automatically, without a user request. In another respect, the report input 701, 703, 705, 707, 709, 713, 715, 717 includes at least a summary of a detail correlated with the report input. Moreover, the report input 703 includes a link 676 and a link 678 that is selectable to access at least a portion of the detail correlated with the report input 703. Likewise, the report input 705, 707, 709, 711, 715 include a link 680, 682, 684, 686, 688, respectively, that is selectable to access at least a portion of the detail correlated with the report input 705, 707, 709, 711, 715, respectively. In response to determining a link to at least a portion of a detail has been selected, the processor 162 can cause the display 171 to display at least the portion of the detail in a different GUI or overlaid upon a GUI from which the link was selected. In at least some implementations, selecting of a link to further details, such as the link 686, can cause the processor 162 to open an application to display the details. As an example, the details can be stored in an electronic file having a file name extension: PDF, and the application to view those details can be an application that is referred to as ACROBAT® and that is provided by Adobe Inc. of San Jose, California. Other examples of a file extension for the file and/or an application configured to display results in the file are also possible.

Figure 19:
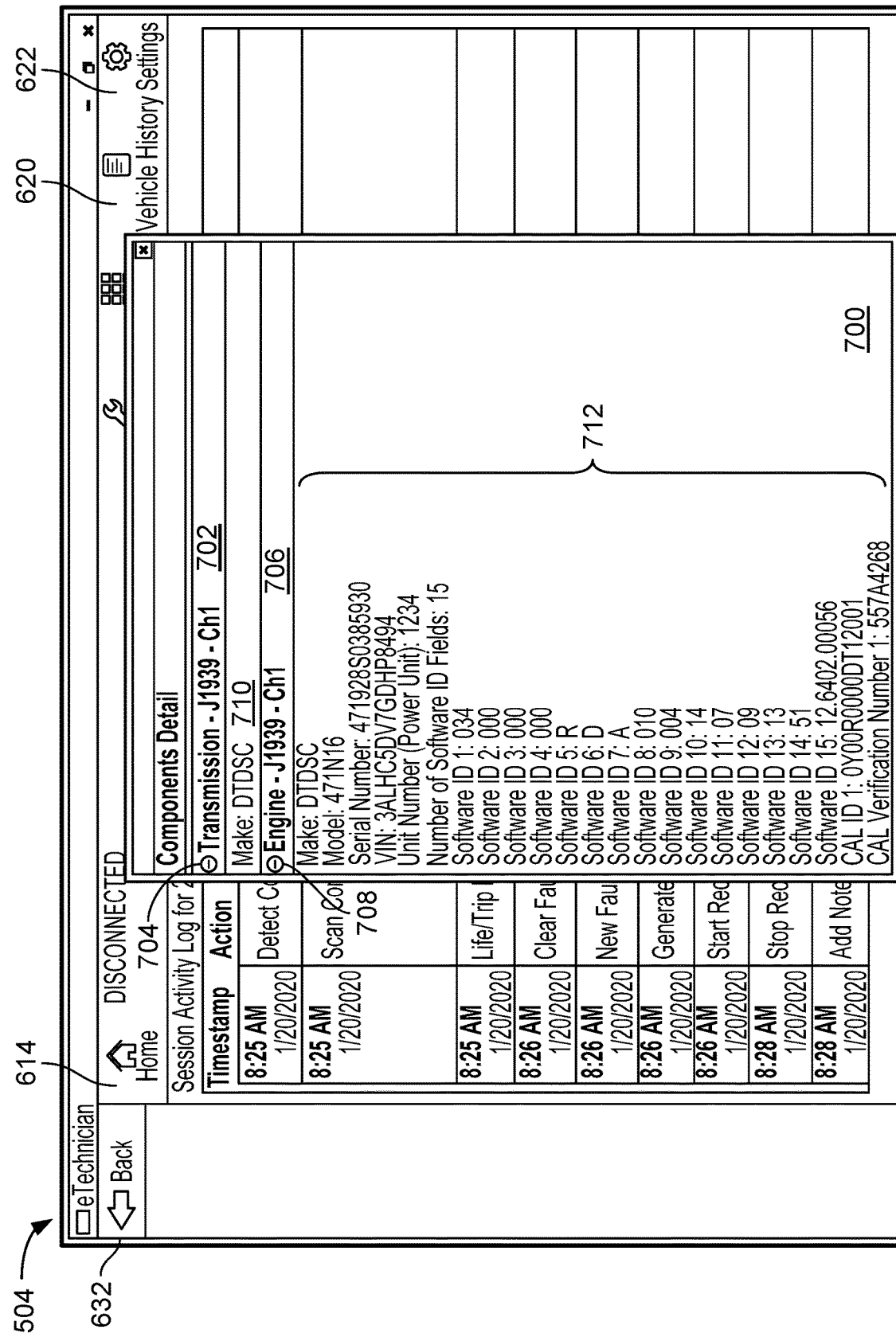

Next, FIG. 19 shows the GUI 504 in accordance with an implementation in which a window 700 is overlaid upon the GUI 504. The processor 162 can cause the display 171 to display the window 700 in response to determining the link 676 is selected from the GUI 504. The window 700 shows components detail determined in response to the computing system 104, 190 performing an action that includes scanning the vehicle for components. The detail summary for the report input 703 in FIG. 18 shows that two components were identified during the component scan action. The window 700 includes a component identifier 702, 706 and expansion/contraction selector 704, 708, and component details 710, 712. The component details 710, 712 include data contained with vehicle data message the vehicle 102 sends in response to performing the action indicated in the report input 703.

With the component details 710 displayed in the window 700, the processor 162 can cause the component details 710 to be removed from the window 700 in response to a selection of the expansion/contraction selector 704. Likewise, with the component details 712 displayed in the window 700, the processor 162 can cause the component details 712 to be removed from the window 700 in response to a selection of the expansion/contraction selector 708.

When the component details 710 are not displayed in the window 700, the processor 162 causes the component details 710 to be displayed in response to a selection of the expansion/contraction selector 704. Similarly, when the component details 712 are not displayed in the window 700, the processor 162 causes the component details 712 to be displayed in response to a selection of the expansion/contraction selector 708.

Figure 20:
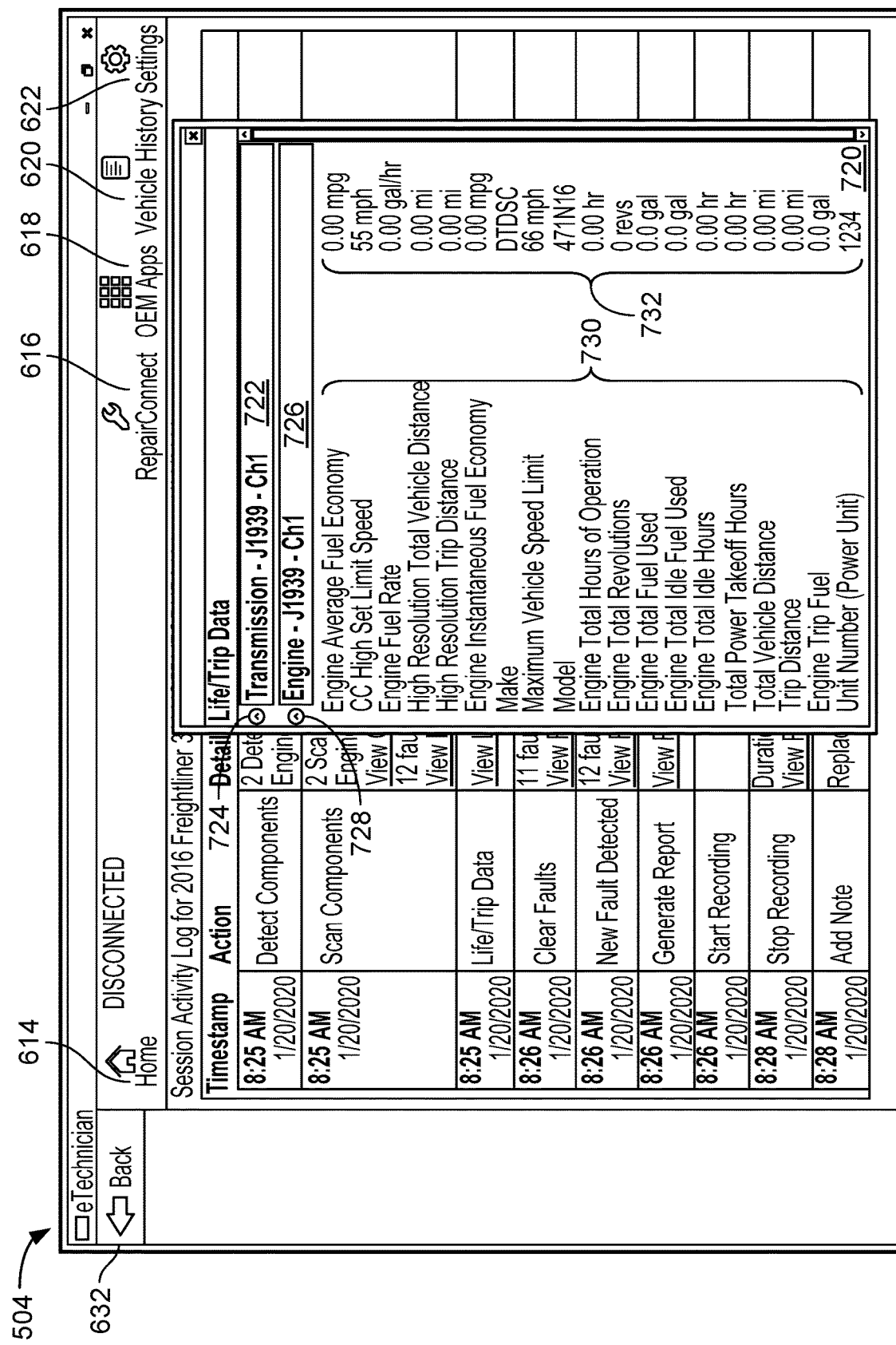

Next, FIG. 20 shows the GUI 504 in accordance with an implementation in which a window 720 is overlaid upon the GUI 504. The processor 162 can cause the display 171 to display the window 720 in response to determining the link 680 is selected from the GUI 504. The window 720 shows life/trip data detail determined in response to the computing system 104, 190 performing an action that includes requesting life/trip data requested from the vehicle 102. The detail summary for the report input 705 in FIG. 18 shows the link 680. The window 720 includes a component identifier 722, 726 and expansion/contraction selector 724, 728, and life/trip data 730, 732. The life/trip data 730 identifies names of parameters requested from the vehicle 102 during performance of the action indicated in the report input 705. The life/trip data 732 includes data contained with vehicle data message the vehicle 102 sends in response to performing the action indicated in the report input 705.

With life/trip data for the component identified by the component identifier 722 displayed in the window 720, the processor 162 can cause that life/trip data to be removed from the window 720 in response to a selection of the expansion/contraction selector 724. Likewise, with the life/trip data 730, 732 displayed in the window 720, the processor 162 can cause the life/trip data 730, 732 to be removed from the window 720 in response to a selection of the expansion/contraction selector 728.

When the life/trip data for the component identified by the component identifier 722 are not displayed in the window 720, the processor 162 causes that the life/trip data to be displayed in response to a selection of the expansion/contraction selector 724. Similarly, when the life/trip data 730, 732 are not displayed in the window 720, the processor 162 causes the life/trip data 730, 732 to be displayed in response to a selection of the expansion/contraction selector 728.

Figure 21:
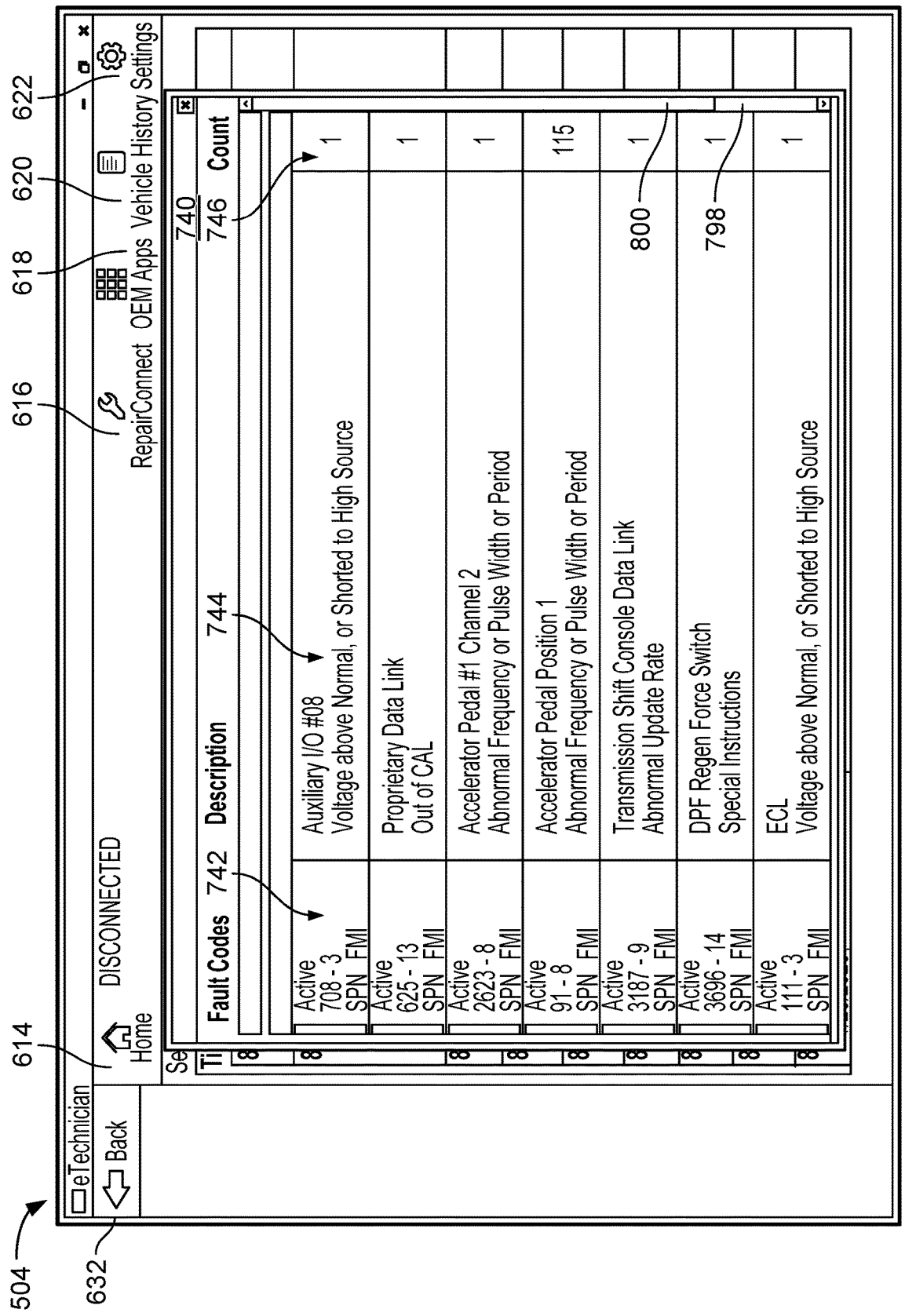

Next, FIG. 21 shows the GUI 504 in accordance with an implementation in which a window 740 is overlaid upon the GUI 504. The processor 162 can cause the display 171 to display the window 740 in response to determining the link 678, 682, 684 is selected from the GUI 504. The window 700 shows components detail determined in response to the computing system 104, 190 performing an action that includes scanning the vehicle for components. The detail summary for the report input 703, 707, 709 in FIG. 18 shows that a number of faults were detected during the action corresponding to report input 703, 707, 709. The window 740 includes a grid including a column 742 indicating a fault identifier and status of the fault, a column 744 indicating a descriptor of the faults, and a column 746 including a count associated with the faults. Each row of the grid corresponds to a respective fault. The window 740 includes a scroll pane including a track 798 and a button 800 operable to cause one or more further rows of the grid to be displayed in the window 740.

Figure 32:
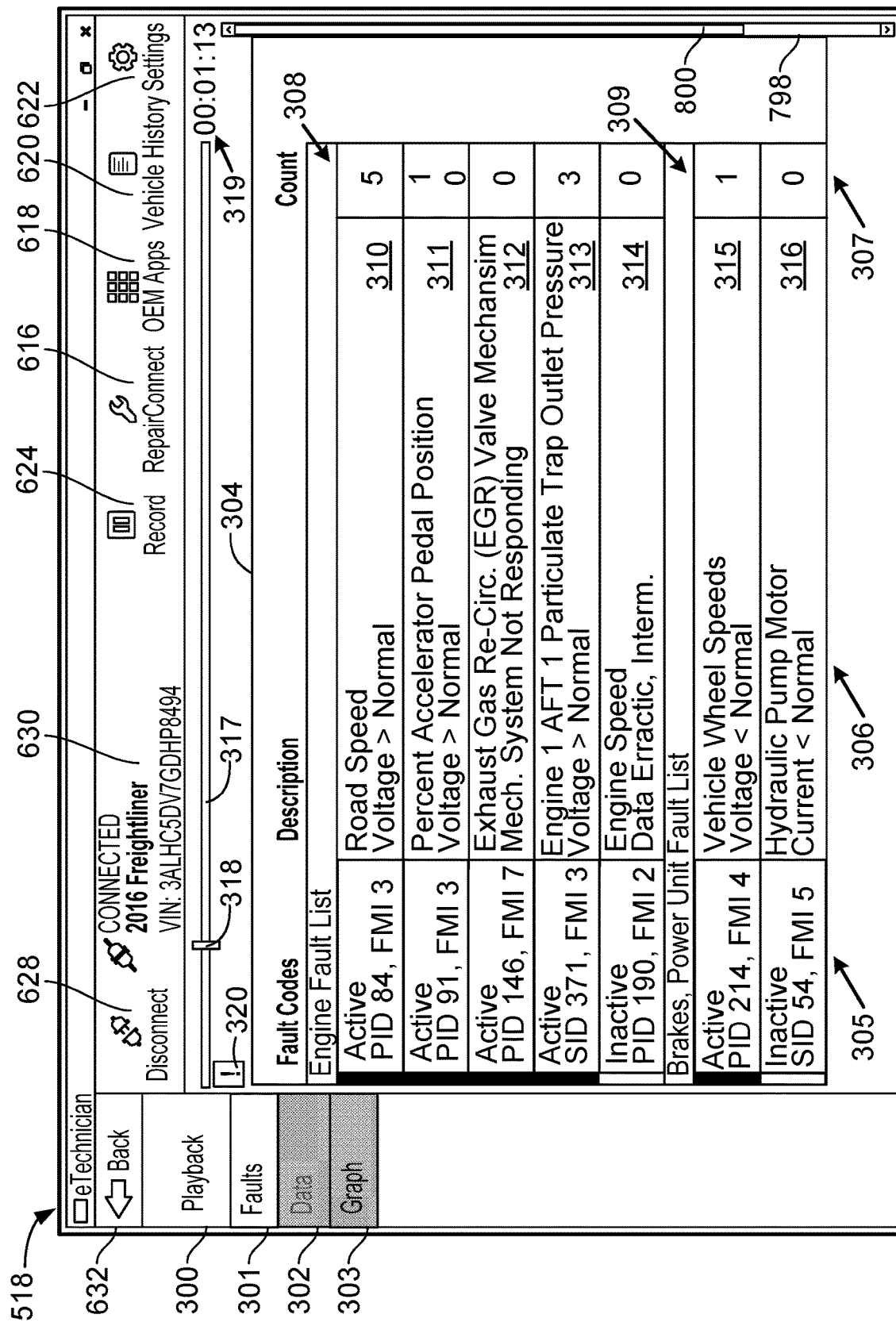
FIG. 32, FIG. 33, FIG. 34, FIG. 35, and FIG. 36 are further example graphical user interfaces in accordance with the example implementations.

Turning to FIG. 32, a GUI 518 is shown. The GUI 518 can be displayed on the display 171 in response to selection of the link 688 within the GUI 504 shown in FIG. 18 and a faults USC 301. The GUI 518 is an example of a GUI that shows details of a recording generated during a vehicle history session. The GUI 518 shows an icon 300 indicating that the computing system 104, 190 is in a playback mode. The GUI 518 includes a faults USC 301, a data USC 302, and a graph USC 303. In FIG. 32, the faults USC 301 is unshaded and the data USC 302 and the graph USC 303 are shaded to indicate that the GUI 518 is displaying details of actions regarding faults, such as a new fault detection action shown in the report input 709 in FIG. 18.

The GUI 518 includes a time bar 317 corresponding to a time period during which a recording identified in the report input 715 occurred. The GUI 518 includes a slider 318 and a time value 319. The time value 319 corresponds to a length of time of the recording, such as a time indicated in the report input 715. In the example, shown in FIG. 32, a left end of the time bar 317 can represent an initial time value of the recording in the report input 715, 0:00:00, and a right end of the time bar 317 represents an end time value of the recording in the report input 715, 0:01:13.

In one respect, the slider 318 can be moved manually to select the initial time value, the ending time value or a time value in between the initial time value and the ending time value. In another respect, the slider 318 can be moved automatically towards the initial time value or towards the ending time value. Automatic movement of the slider 318 can be initiated and stopped by selection of the record USC 624. While the slider 318 is moving, the slider 318 can be paused, for example, by selecting the record USC 624.

The GUI 518 includes fault details 304 including a fault list 308 for a first component and a fault list 309 for a second component. The fault list 308 includes a fault identifier 310, 311, 312, 313, and 314. The fault list 309 includes a fault identifier 315, 316. The fault identifier 310, 311, 312, 313, 314, 315, 316 include a fault identifier and status 305, a fault name 306, and a fault count 307. The fault count (e.g., an occurrences count) includes a value read from an electronic control unit, indicating a number of times the fault entered the active state, then the inactive state, and then returned to the active state.

As the slider 318 moves along the time bar 317 in the GUI 518, the fault details 304 show details of a vehicle history session recorded at a time corresponding to the slider 318. The GUI 518 includes the icon 320 that can appear and/or be highlighted to indicate that a fault was set to the active state at a time during the recording represented by the time bar 317. The GUI 518 includes a scroll pane including a track 798 and a button 800 operable to cause an additional portion, if any, of the fault details 304 to be displayed within the GUI 518.

Figure 33:
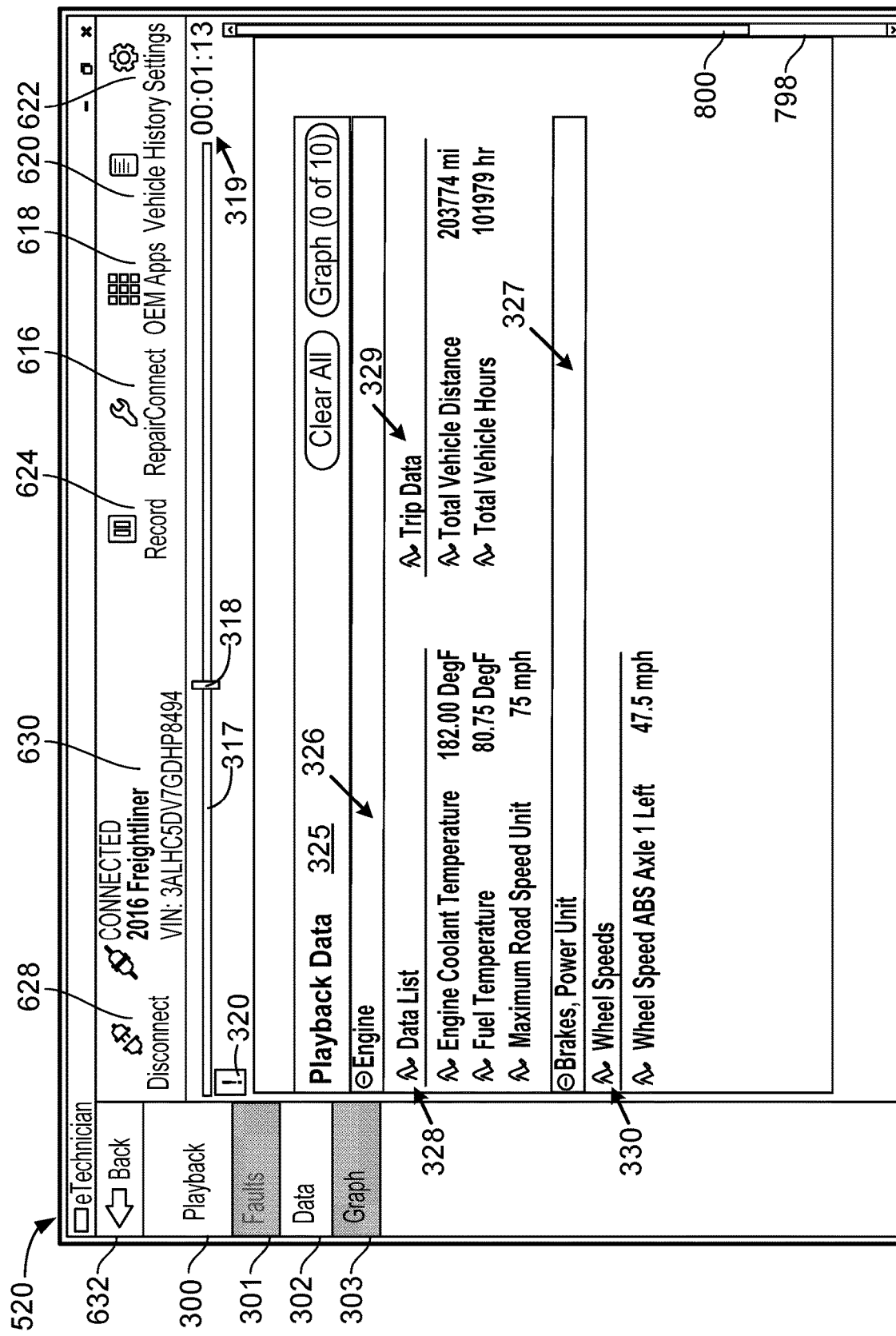

Next, FIG. 33 shows a GUI 520. The GUI 520 can be displayed on the display 171 in response to selection of the link 688 within the GUI 504 shown in FIG. 18 and a data USC 302. The GUI 520 is an example of a GUI showing details of a recording generated during a vehicle history session. The GUI 520 shows the icon 300 indicating that the computing system 104, 190 is in a playback mode. The GUI 520 includes the faults USC 301, the data USC 302, and the graph USC 303. In FIG. 33, the data USC 302 is unshaded and the faults USC 301 and the graph USC 303 are shaded to indicate that the GUI 520 is displaying details of data recorded during a vehicle history session.

The GUI 520 includes a time bar 317 corresponding to a time period during which a recording identified in the report input 715 occurred. The GUI 520 includes a slider 318 and a time value 319. The time value 319 corresponds to a length of time of the recording, such as a time indicated in the report input 715. Similar to FIG. 32, a left end of the time bar 317 can represent the initial time value of the recording in the report input 715, 0:00:00, and the right end of the time bar 317 represents the end time value of the recording in the report input 715, 0:01:13. As discussed above, the slider 318 can be moved manually or automatically, and can be paused while moving.

The GUI 520 includes playback data 325 for component (s) that provided data to the computing system 104, 190 during the vehicle history session. As shown in FIG. 33, the playback data 325 includes playback data for a first component identified by a component identifier 326 and a second component identified by a component identifier 327. Moreover, the playback data 325 includes data collected for one or more actions during the vehicle history session. As an example, the playback data 325 includes a data list 328 showing parameter identifiers and parameter values regarding the first component using a second action during the vehicle history session, and a data list 329 showing parameter identifiers and parameter values regarding the first component collected using a second action during the vehicle history session. As another example, the playback data 325 includes a data list 330 showing a parameter identifier and a parameter value regarding the second component using an action during the vehicle history session.

As the slider 318 moves along the time bar 317 in the GUI 520, the playback data 325 show details of a vehicle history session recorded at a time corresponding to the slider 318. The GUI 520 includes the icon 320 that can appear and/or be highlighted to indicate that a fault was set to the active state at a time during the recording represented by the time bar 317. The GUI 520 includes a scroll pane including a track 798 and a button 800 operable to cause an additional portion, if any, of the playback data 325 to be displayed within the GUI 520.

Figure 34:
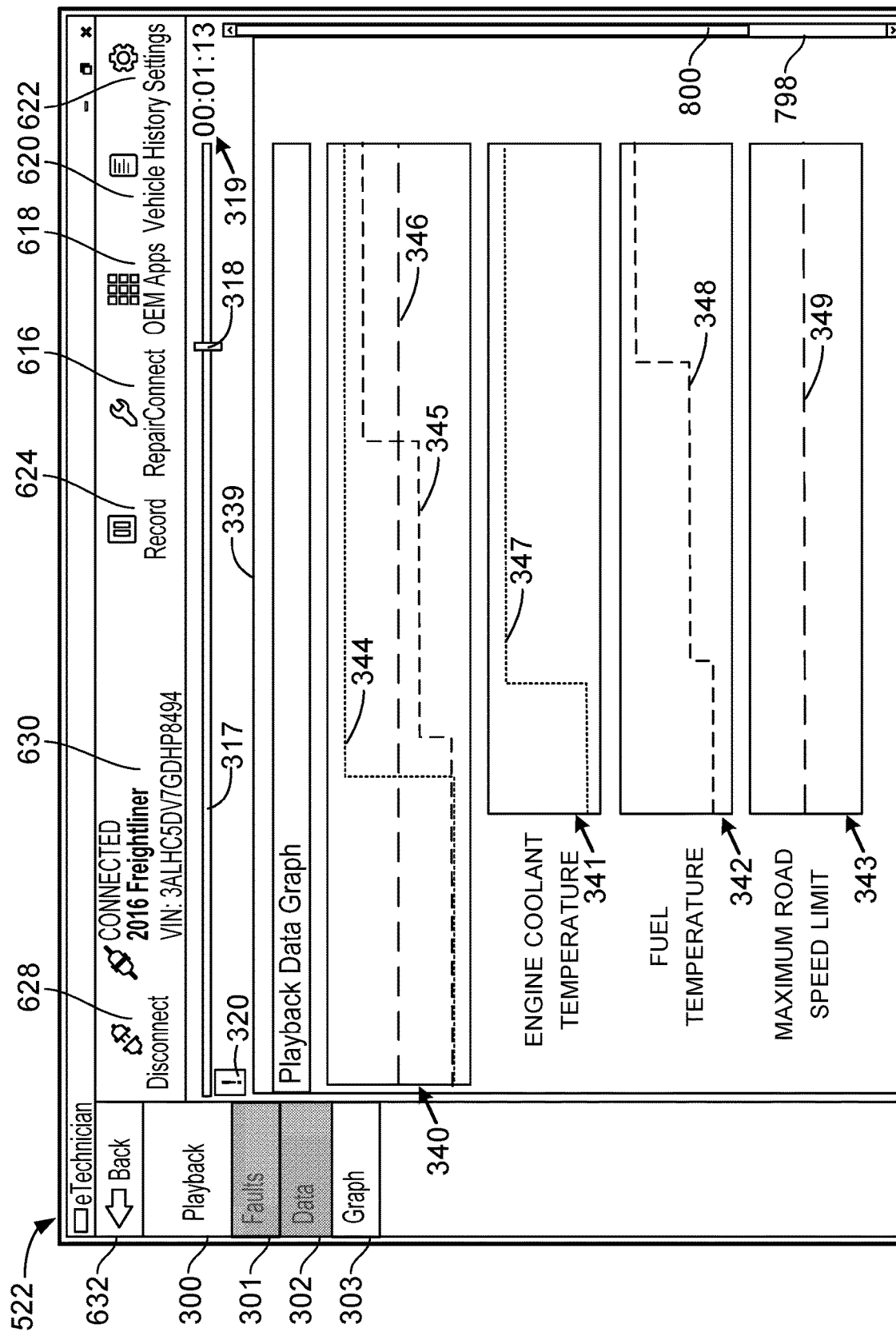

Next, FIG. 34 shows a GUI 522. The GUI 522 can be displayed on the display 171 in response to selection of the link 688 within the GUI 504 shown in FIG. 18 and a graph USC 303. The GUI 522 is an example of a GUI configured for playing back data collected during generation of a vehicle history session recording in a graph format. The GUI 522 shows the icon 300 indicating that the computing system 104, 190 is in a playback mode. The GUI 522 includes the faults USC 301, the data USC 302, and the graph USC 303. In FIG. 34, the graph USC 303 is unshaded and the faults USC 301 and the data USC 302 are shaded to indicate that the GUI 522 is playing back data in the graph format.

The GUI 522 includes the time bar 317 corresponding to a time period during which a recording identified in the report input 715 occurred. The GUI 522 includes the slider 318 and the time value 319. The time value 319 corresponds to a length of time of the recording, such as a time indicated in the report input 715. Similar to FIG. 32, a left end of the time bar 317 can represent the initial time value of the recording in the report input 715, 0:00:00, and the right end of the time bar 317 represents the end time value of the recording in the report input 715, 0:01:13. As discussed above, the slider 318 can be moved manually or automatically, and can be paused while moving.

The GUI 522 shows playback data 339 in a graph format. In particular, the playback data 339 includes a graph 341 for a first data parameter identifier (e.g., a parameter identifier associated with engine coolant temperature), a graph 342 for a second data parameter (e.g., a parameter identifier associated with fuel temperature), and a graph 343 for a third data parameter (e.g., a parameter identifier associated with maximum road speed limit). The graph 341, 342, 342 is a line graph. Other types of graphs, such as a bar graph, for data parameter identifiers can be used to playback data of a vehicle history session recording. A line 347 in the graph 341 indicates values of the first data parameter identifier. A line 348 in the graph 342 indicates values of the second data parameter. A line 349 in the graph 343 indicates values of the third data parameter.

The playback data 339 also includes a graph 340 showing a composite line graph including a line 344 corresponding to the line 347 for the first data parameter, a line 345 corresponding to the line 348 for the second data parameter, and a line 346 corresponding to the line 349 for the third data parameter. A composite line graph can include a line for each different data parameter.

As the slider 318 moves along the time bar 317 in the GUI 522, the playback data 339 shows details of a vehicle history session recorded at a time corresponding to the slider 318. The GUI 522 includes the icon 320 that can appear and/or be highlighted to indicate that a fault was set to the active state at a time during the recording represented by the time bar 317. The GUI 522 includes a scroll pane including a track 798 and a button 800 operable to cause an additional portion, if any, of the playback data 339 to be displayed within the GUI 522. For example, one or more additional graphs for other data parameters could be displayed by use of the button 800.

Figure 22:
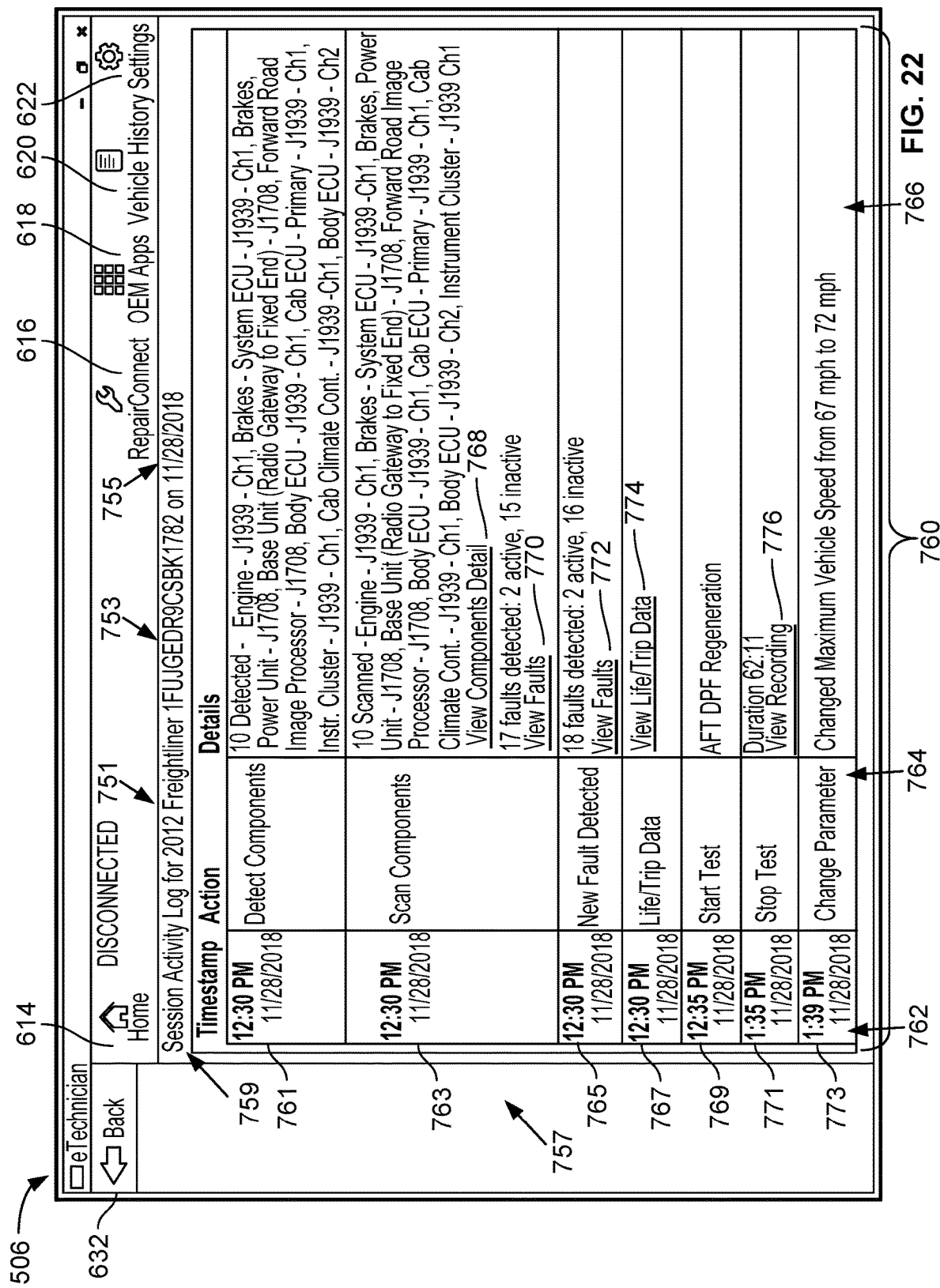

Turning back to FIG. 22, a GUI 506 is shown. The GUI 506 includes a session activity log 757 for a particular vehicle history session captured for a particular vehicle. The GUI 506 can be displayed in response to selecting a vehicle history session summary 896 from the GUI 508 shown in FIG. 26. An identifier 759 of the session activity log 757 includes year and make identifiers 751 for the particular vehicle, a VIN 753 of the particular vehicle, and temporal information 755 correlated with the session activity log 757. As shown in FIG. 22, the session activity log 757 pertains to a particular vehicle that is the vehicle type referred to as "2012 Freightliner" and associated with the VIN: 1FUJGEDR9CSBK1782, and the particular temporal condition is the date: May 8, 2019. In at least some implementations, the particular temporal condition can include a time. The time can be used to distinguish between two or more vehicle history sessions captured for the same vehicle on the same date.

In at least some implementations, the session activity log 757 is displayed in a grid 760 in which each row of the grid 760 includes a report input, and each column of the grid 760 includes one of the following columns: a temporal column 762 including a time stamp and/or a date; an action column 764 including action identifiers; and component details 766. In other implementations, each column of a grid can represent a report input, and each row of the grid can include one of the following rows: a temporal row including a time stamp and/or a date; an action row including action identifiers; and a row column. In other implementations, the session activity log 757 is displayed in a format other than a grid format.

The session activity log 757 includes a report input 761, 763, 765, 767, 769, 771, 773. In one respect, the report input 761, 763, 765, 769, 771, 773 is a report input that includes an action identifier for an action that is performed in response to a user request, and the report input 767 is a report input that includes an action identifier for an action that is performed automatically, without a user request. In another respect, the report input 761, 763, 765, 767, 769, 771, 773 includes at least a summary of a detail correlated with the report input. Moreover, the report input 763 includes a link 768 and a link 770 that is selectable to access at least a portion of the detail correlated with the report input 767. Likewise, the report input 765, 767, 771 include a link 772, 774, 776, respectively, that is selectable to access at least a portion of the detail correlated with the report input 765, 767, 771, respectively. In response to determining a link to at least a portion of a detail has been selected, the processor 162 can cause the display 171 to display at least the portion of the detail in a different GUI or overlaid upon a GUI from which the link was selected.

Figure 23:
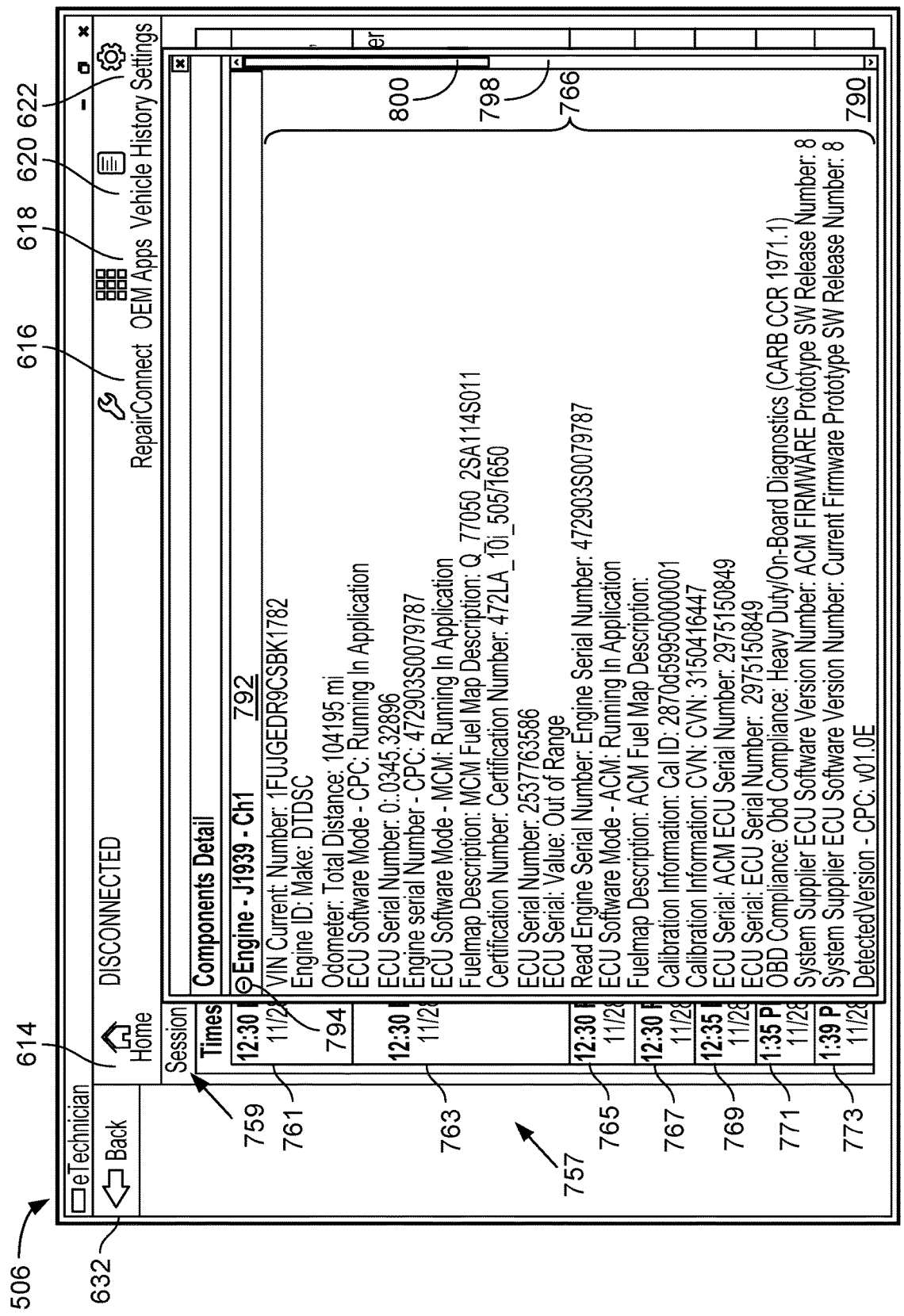

Next, FIG. 23 shows the GUI 506 in accordance with an implementation in which a window 790 is overlaid upon the GUI 506. The processor 162 can cause the display 171 to display the window 790 in response to determining the link 768 is selected from the GUI 506. The window 790 shows components detail determined in response to the computing system 104, 190 performing an action that includes scanning the vehicle for components. The detail summary for the report input 763 in FIG. 22 shows that ten components were identified during the component scan action. The window 790 includes a component identifier 792 and expansion/contraction selector 794 and component details 766. The component details 766 include data contained with vehicle data message the vehicle 102 sends in response to performing the action indicated in the report input 763.

With the component details 766 displayed in the window 790, the processor 162 can cause the component details 766 to be removed from the window 790 in response to a selection of the expansion/contraction selector 794. When the component details 766 are not displayed in the window 790, the processor 162 causes the component details 766 to be displayed in response to a selection of the expansion/contraction selector 794. The window 790 includes a scroll pane including a track 798 and a button 800 operable to cause component details for the other components identified during the component scan action corresponding to the report input 763.

Figure 24:
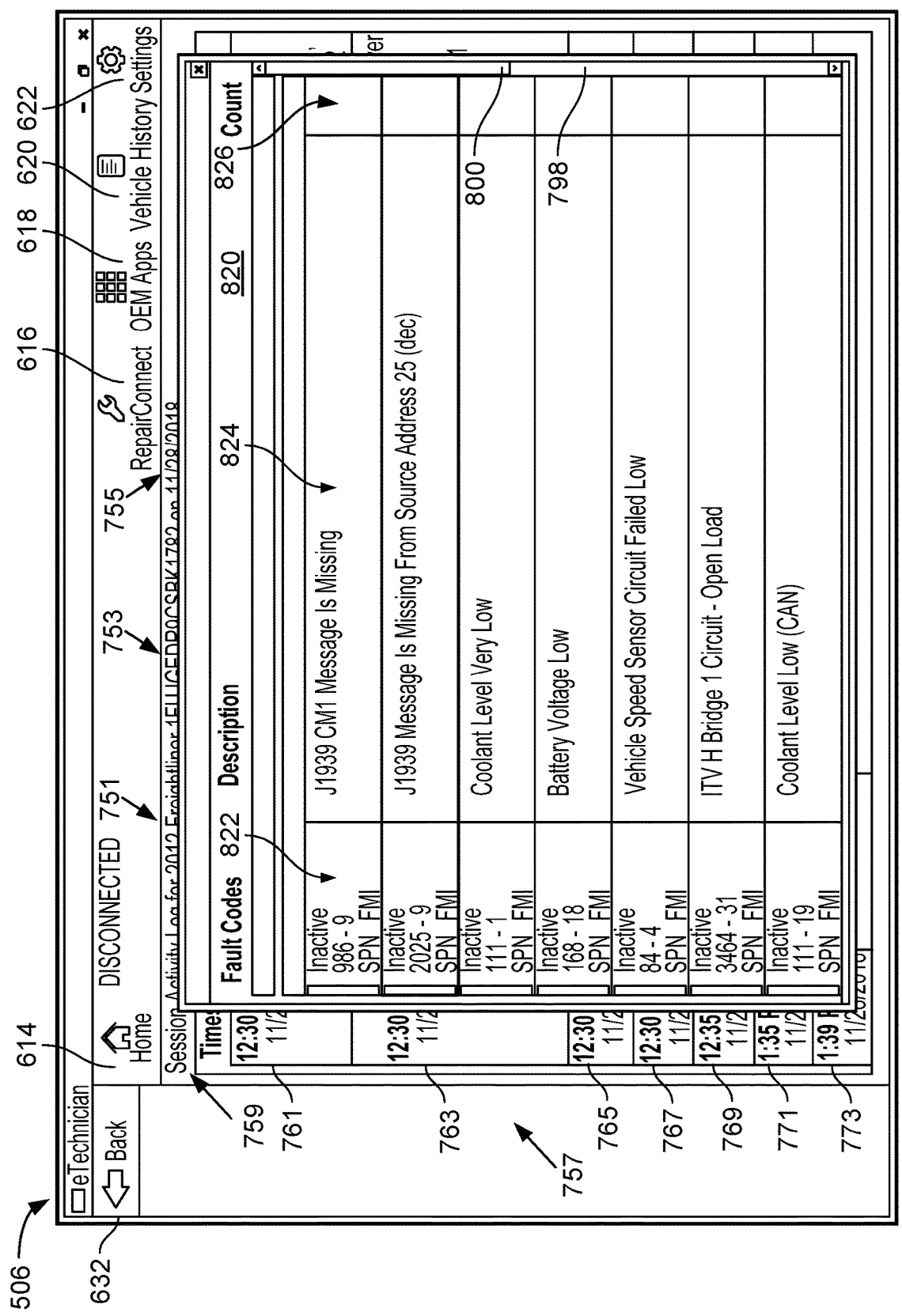

Next, FIG. 24 shows the GUI 506 in accordance with an implementation in which a window 820 is overlaid upon the GUI 506. The processor 162 can cause the display 171 to display the window 820 in response to determining the link 770, 772 is selected from the GUI 506. The window 820 shows components detail determined in response to the computing system 104, 190 performing an action that includes scanning the vehicle for components. The detail summary for the report input 763, 765 in FIG. 22 shows that a number of faults were detected during the action corresponding to report input 763. 765. The window 820 includes a grid including a column 822 indicating a fault identifier and status of the fault, a column 824 indicating a descriptor of the faults, and a column 826 including a count associated with the faults. Each row of the grid corresponds to a respective fault. The window 820 includes a scroll pane including a track 798 and a button 800 operable to cause one or more further rows of the grid to be displayed in the window 820.

Figure 25:
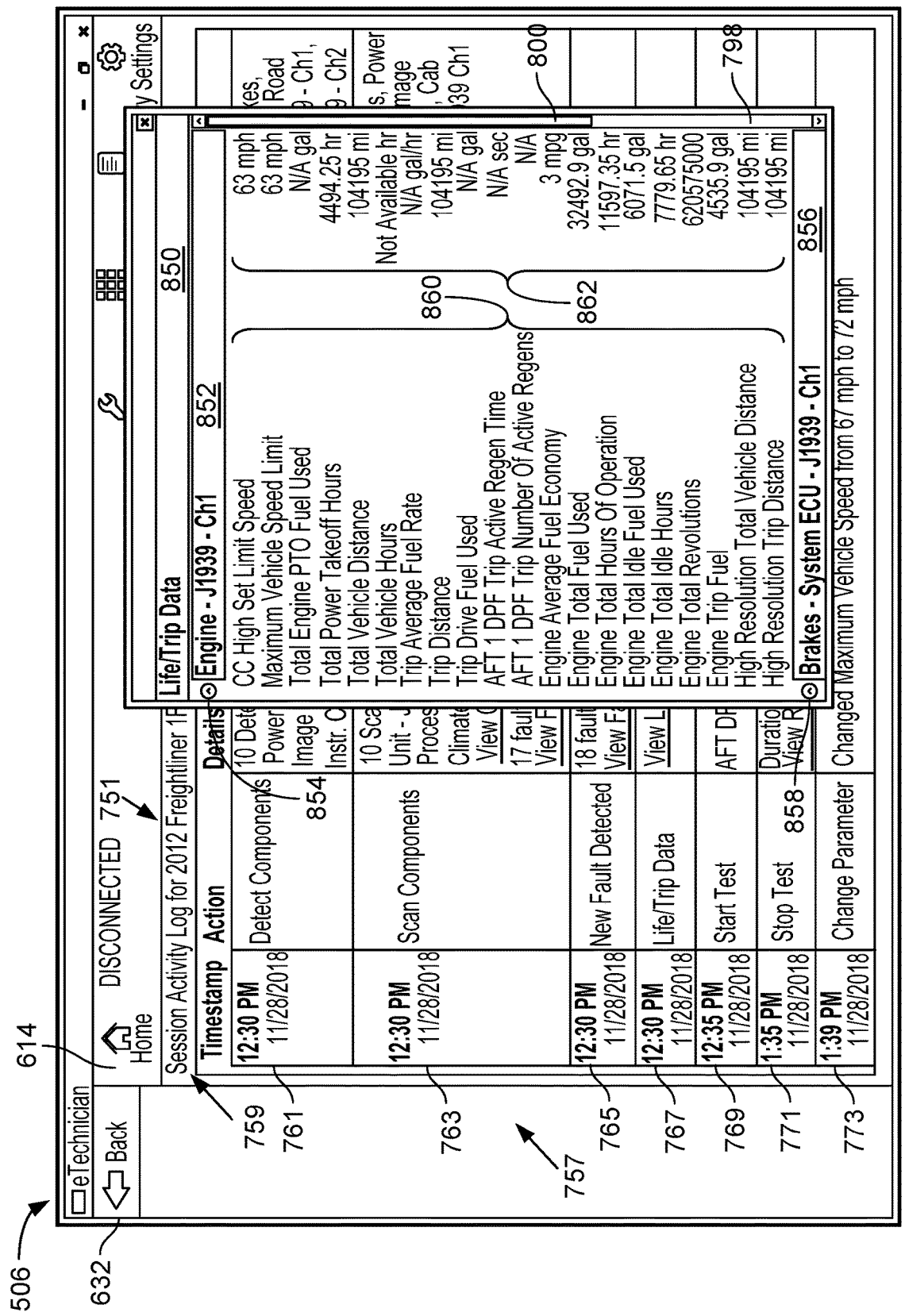

Next, FIG. 25 shows the GUI 506 in accordance with an implementation in which a window 850 is overlaid upon the GUI 506. The processor 162 can cause the display 171 to display the window 850 in response to determining the link 774 is selected from the GUI 506. The window 850 shows life/trip data detail determined in response to the computing system 104, 190 performing an action that includes requesting life/trip data requested from the vehicle 102. The detail summary for the report input 767 in FIG. 22 shows the link 774. The window 850 includes a component identifier 852, 856 and expansion/contraction selector 854, 858, and life/trip data 860, 862. The life/trip data 860 identifies names of parameters requested from the vehicle 102 during performance of the action indicated in the report input 767. The life/trip data 862 includes data contained with vehicle data message the vehicle 102 sends in response to performing the action indicated in the report input 767.

With life/trip data for the component identified by the component identifier 852 displayed in the window 850, the processor 162 can cause that life/trip data to be removed from the window 850 in response to a selection of the expansion/contraction selector 854. When the life/trip data for the component identified by the component identifier 852 are not displayed in the window 850, the processor 162 causes that the life/trip data to be displayed in response to a selection of the expansion/contraction selector 854.

The window 850 includes a scroll pane including a track 798 and a button 800 operable to cause the display 171 to display life/trip data for the component identified by the component identifier 856, and life/trip data for other components identified during the components identified during the scan action correlated with the report input 763.

Next, FIG. 26 shows a GUI 508. In at least some implementations, the processor 162 can cause the GUI 508 to be displayed in response to a selection of the vehicle-history USC 620 displayed in a GUI that includes the vehicle-history USC 620. In response to a selection of the vehicle-history USC 620, the processor 162 can perform a search for vehicle history sessions to determine content to be displayed within the GUI 508. The search for vehicle history sessions can be conditioned on the share-option selected for the computing system 104, 190. For example, if the share-option is set to no-sharing, then the processor 162 can automatically perform the search for vehicle history sessions within the memory 164 and skip requesting the server 108 to search the database 110 for vehicle history sessions. As another example, if the share-option is set to sharing, then the processor 162 can automatically perform the search for vehicle history sessions within the memory 164 and by requesting the server 108 to search the database 110 for vehicle history sessions. The request for the server 108 to search the database 110 can include some or all of the vehicle history session metadata 185.

A search for vehicle history sessions can result in the processor 162 determining the following information about the vehicle history session located during the search: vehicle information regarding a set of vehicles, a date pertaining to a vehicle history session (e.g., a date of the most-recent vehicle history session generated for a particular vehicle of the set of vehicles), and component identifiers of vehicle components identified during a vehicle history session. Information determined during the search can be displayed on the GUI 508.

As shown in FIG. 26, the GUI 508 includes search-results-and-selectors 880 displayed in a grid format. In at least some implementations, search-results-and-selectors displayed in a grid format include a vehicle identifier section, a date section, a component identifier section, a view-all USC section, and/or a delete-all USC section. In the implementation represented in FIG. 26 and in one respect, the search-results-and-selectors 880 includes a vehicle identifier section 882, a date section 884 showing a date of a most-recent vehicle history session for an identified vehicle, a component identifier section 886, a view-all USC section 888, and a delete-all USC section 890. In another respect, the search-results-and-selector 880 includes a vehicle history session summary 892, 894, 896, 898, 900, 902. Each of the vehicle history session summary 892, 894, 896, 898, 900, 902 is correlated with a particular vehicle.

The GUI 508 is configured to allow a user to select a vehicle history session summary. In response to determining a vehicle history session summary is selected from the search-results-and-selectors 880, the processor 162 is configured to display the selected vehicle history session summary. In at least some implementations, selection of a vehicle history session summary can occur by selecting a portion of a vehicle history session summary displayed on the GUI 508, such as a portion of the vehicle history session summary in the vehicle identifier section 882, the date section 884 and/or the component identifier section 886. Displaying a selected vehicle history session summary can include displaying a session activity log, such as the session activity log shown in the GUI 504 in FIG. 18 and the session activity log shown in the GUI 506 in FIG. 22.

The view-all USC section 888 includes a view-all USC 912 for each vehicle history session summary 892, 894, 896, 898, 900, 902. In response to determining the view-all USC 912 for a particular vehicle has been selected, the processor 162 can cause the display 171 to display a GUI that shows at least a portion of the vehicle history session summaries identified for the particular vehicle. As an example, in response to selecting the view-all USC 912 corresponding to the vehicle history session summary 894, the processor 162 can cause the display to display the GUI 510 shown in FIG. 27.

The delete-all USC section 890 includes a delete-all USC 914 for each of the vehicle history session summary 892, 894, 896, 898, 900, 902. As an example, the delete-all USC 914 for the vehicle history session summary 892, 894, 896, 898, 900, 902 can include a number indicating how many vehicle history sessions were identified for the particular vehicle. Moreover, the number of identified vehicle history sessions can indicate a number of vehicle history sessions for the particular vehicle within the memory 164. In response to determining the delete-all USC 914 for a particular vehicle has been selected, the processor 162 can delete the vehicle history sessions stored for the particular vehicle in the memory 164. In at least some implementations, vehicle history sessions stored for the particular vehicle in the database 110 are not deleted in response to selection of the delete-all USC 914 for the particular vehicle.

Additionally, the GUI 508 includes a search-type identifier 904. As an example, the search-type identifier 904 can indicate a category of vehicles based on a search of vehicle history sessions performed by the processor 162, a selection entered via the report filter selector 906, a selection entered via the VIN selector 908, and/or a share-option identifier associated with the computing system 104, 190. As shown in FIG. 26, the search-type identifier 904 indicates "All Vehicles," which can correspond to all vehicles identifier in a vehicle history session stored in the memory 164.

The GUI 508 includes a report filter selector 906. The report filter selector 906 can include a drop-down menu showing filtering criterion, such as all reports, latest reports, last report, and/or reports generated during a particular time period. As an example, the particular time period could be the last 7 days, the last 30 days, the last month, or some other time period. In response to selection of a filter criterion from the report filter selector 906, the processor 162 sorts the displayed vehicle history session summaries including the vehicle history session summary 892, 894, 896, 898, 900, 902 according to the selected filter criterion.

The GUI 508 includes a VIN selector 908. The VIN selector 908 can be configured for receiving a VIN entered by a user typing in digits of the VIN and/or by presenting a drop-down menu of VINs based on vehicle history sessions stored in the memory 164 and/or in the database 110. Moreover, the VIN selector 908 can be configured for receiving a portion of a VIN that is common to multiple vehicles that are a common vehicle type. As an example, the portion of the VIN can include the first eleven digits of the multiple vehicles. In response to receiving the portion of the VIN, the processor 162 can search for and display in response to the search vehicle history session summaries for vehicle history sessions that are both stored in the memory 164 and/or in the database 110 and correlated with a VIN that starts with the portion of the VIN entered via the VIN selector 908. Advantageously, a user doesn't have to enter an entire VIN in order to have the processor search for and return vehicle history session summaries for multiple vehicles using a common portion of a VIN.

The GUI 508 includes a sorting selector 910. The processor 162 can sort the vehicle history session summaries displayed on the display 171 according to a sorting criteria selected using the sorting selector 910. As an example, the selected sorting criteria can be date: newest to oldest; date: oldest to newest; alphabetical: A to Z; alphabetical: Z to A; or some other sorting criteria.

Figure 27:
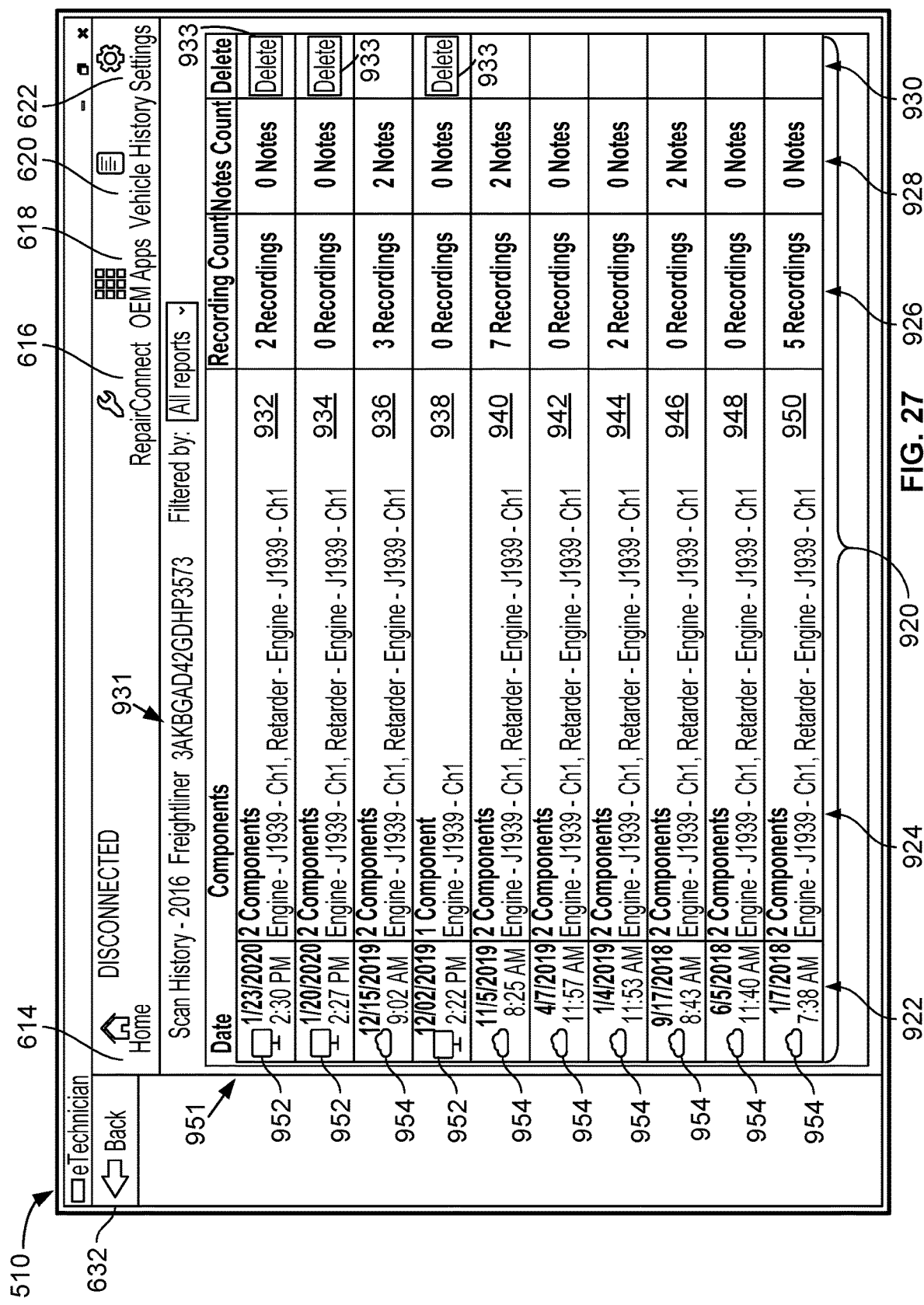

Next, FIG. 27 shows a GUI 510. The GUI 510 includes a summary of vehicle history sessions 951 for a particular vehicle. The particular vehicle is identified by a vehicle identifier 931. The vehicle identifier 931 can include a VIN or some other type of vehicle identifier, such as a fleet vehicle number (i.e., a unique identifier assigned to a particular vehicle in a fleet of vehicles owned or operated by a particular enterprise).

In at least some implementations, the summary of vehicle history sessions 951 is displayed using a grid 920. In FIG. 27, the grid 920 includes a vehicle history session summary 932, 934, 936, 938, 940, 942, 944, 946, 948, 950 in each row. Moreover, the grid 920 includes a temporal section 922, a component identification section 924, a recording count section 926, a note count section 928, and a delete USC section 930. In other implementations, the vehicle history session summary 932, 934, 936, 938, 940, 942, 944, 946, 948, 950 could be displayed in respective columns, and the temporal section 922, the component identification section 924, the recording count section 926, the note count section 928, and the delete USC section 930 could be displayed in respective rows. In still other implementations, the summary of vehicle history sessions 951 can be displayed in a different display format, such as a display card format or a wizard format.

The temporal section 922 can include a date and time correlated with the vehicle history session summary. The component identification section 924 can include a number indicating how many components in the vehicle were discovered during a scan of the vehicle, the type of component(s) identified during the scan, and a VDM protocol used to discover the vehicle component(s) during the scan. The recording count section 926 can indicate a quantity of recordings made using the computing system 104, 190 during the vehicle history session correlated with the history session summary. The note count section 928 can indicate a quantity of notes made using the computing system 104, 190 during the vehicle history session.

The summary of vehicle history sessions 951 can include an indication of whether a vehicle history session correlated with the vehicle history session summary 932, 934, 936, 938, 940, 942, 944, 946, 948, 950 is stored locally in the memory 164 and/or whether the vehicle history session correlated with the vehicle history session summary 932, 934, 936, 938, 940, 942, 944, 946, 948, 950 is stored remote from the computing system 104, 190, such as in the database 110. In the GUI 510, the vehicle history session summary 932, 934, 938 include an icon 952 to indicate that the vehicle history session summary 932, 934, 938 is stored in the memory 164, and the vehicle history session summary 936, 940, 942, 944, 946, 948, 950 include the icon 954 to indicate that the vehicle history session summary 936, 940, 942, 944, 946, 948, 950 is stored remote from the computing system 104, 190.

The GUI 510 includes a respective delete USC 933 corresponding to each of the vehicle history session that is stored in the memory 164. As shown in FIG. 27, the GUI 510 includes a delete USC 933 for the vehicle history sessions corresponding to the vehicle history session summary 932, 934, 938. In response to determining a delete USC 930 has been selected, the processor 162 can delete the vehicle history session corresponding to that delete USC 933.

In at least some implementations, the GUI 510 can be displayed in response to the processor 162 determining that the vehicle-history USC 620 was selected from a GUI while the vehicle identified by the vehicle identifier 931 was a selected vehicle. In those or in at some other implementations, the GUI 510 can be displayed in response to the processor 162 determining that a view-all USC was selected from GUI in which the view-all USC corresponds to the vehicle identified by the vehicle identifier 931. As an example, such a view-all USC can include the view-all USC 912 in the vehicle history session summary 894 shown in FIG. 26, the view-all USC 449 in the display card 431 shown in FIG. 29, or the view-all USC 468 shown in FIG. 30.

Figure 28:
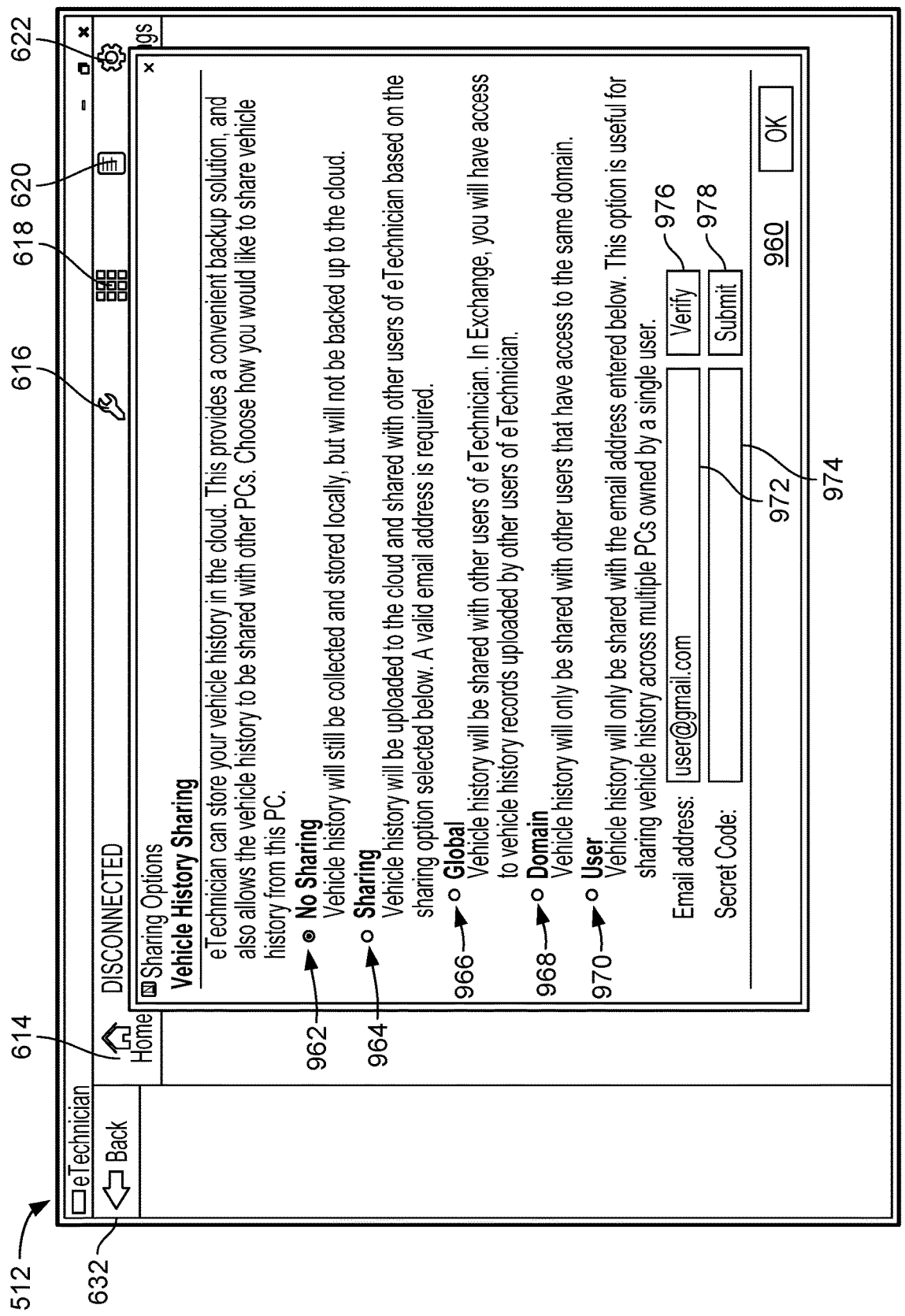

Next, FIG. 28 shows a GUI 512 and a GUI 960. The GUI 960 is overlaid upon the GUI 512. The GUI 960 includes means for selecting one or more sharing options with respect to whether a vehicle history session generated by the computing system 104, 190 will be uploaded to the server 108 and/or the database 110. The processor 162 can cause the display 171 to display the GUI 960 in response to determining a USC corresponding to selecting a sharing option has been selected. In one respect, the USC corresponding to selecting a sharing option can be located within the GUI 512 under the GUI 960. In another respect, the USC corresponding to selecting a sharing option can be selected via use of the settings USC 622 in the GUI 512 or another GUI.

The GUI 960 includes a share-option-selector USC 962, 964, 966, 968, 970. In at least some implementations, the share-option-selector USC 962, 964, 966, 968, 970 can include means to select a share-option and to show which share-option has been selected. In at least some implementations, the share-option-selector USC 962, 964, 966, 968, 970 can include a radio button selector or a checkbox.

In response to determining the share-option selector USC 962 has been selected, the processor 162 can set a share-option for the computing system 104, 190 to "no sharing." As a result of setting the share-option to "no sharing," the computing system 104, 190 can responsively operate in a state in which any vehicle history session generated by the computing system 104, 190 is stored in the memory 164 and is not uploaded to a remote cloud-based storage device, such as the database 110.

In response determining the share-option selector USC 968 has been selected, the processor 162 can set a share-option for the computing system 104, 190 to "sharing" and a share type to "domain" sharing. In at least some implementations, selecting the share-option-selector USC 968 can occur without first using the share-option-selector USC 964 to select the share-option as "sharing." In other implementations, using the share-option-selector USC 964 to select the share-option as "sharing" occurs before using the share-option selector USC 968 to select the share type "domain" sharing. As a result of setting the share-option to "sharing" and share type to "domain" sharing, the computing system 104, 190 can responsively operate in a state in which any vehicle history session generated by the computing system 104, 190 is automatically uploaded to a remote cloud-based storage device, such as the database 110.

In response determining the share-option selector USC 970 has been selected, the processor 162 can set a share-option for the computing system 104, 190 to "sharing" and a share type to "user" sharing. In at least some implementations, selecting the share-option-selector USC 970 can occur without first using the share-option-selector USC 964 to select the share-option as "sharing." In other implementations, using the share-option-selector USC 964 to select the share-option as "sharing" occurs before using the share-option selector USC 970 to select the share type "user" sharing. As a result of setting the share-option to "sharing" and share type to "user" sharing, the computing system 104, 190 can responsively operate in a state in which any vehicle history session generated by the computing system 104, 190 is automatically uploaded to a remote cloud-based storage device, such as the database 110.

The GUI 512 also includes an e-mail field 972 for entry of an email address. The computing system 104, 190 can transmit an e-mail address entered into the e-mail field 972 to the server 108 in response to selection of a verify USC 976. In response to transmitting the e-mail address, the computing system 104, 190 can receive a success code or an error code regarding the server 108 receiving the e-mail address. Moreover, the server 108 can send an e-mail including a secret code to the e-mail address. The secret code can be entered into the code field 974 and then sent to server 108 in response to selecting a submit USC 978. The secret code can expire after a predetermined amount of time.

The server 108 can map to e-mail address to a user GUID. That mapping can occur in response to receiving the e-mail address and/or after receiving the secret code from the computing system 104, 190. Once the user GUID has been mapped to the e-mail address and the server 108 has received the secret code from the computing system 104, 190, the server 108 can transmit the user GUID to the computing system 104, 190 for storage in the memory 164, such as in metadata 404. Thereafter, the computing system 104, 190 can correlate the user GUID to vehicle history sessions that the computing system 104, 190 generates while the commuting system is operating in a state in which the share-option is set to "sharing" and share type is set to "user" sharing.

Figure 29:
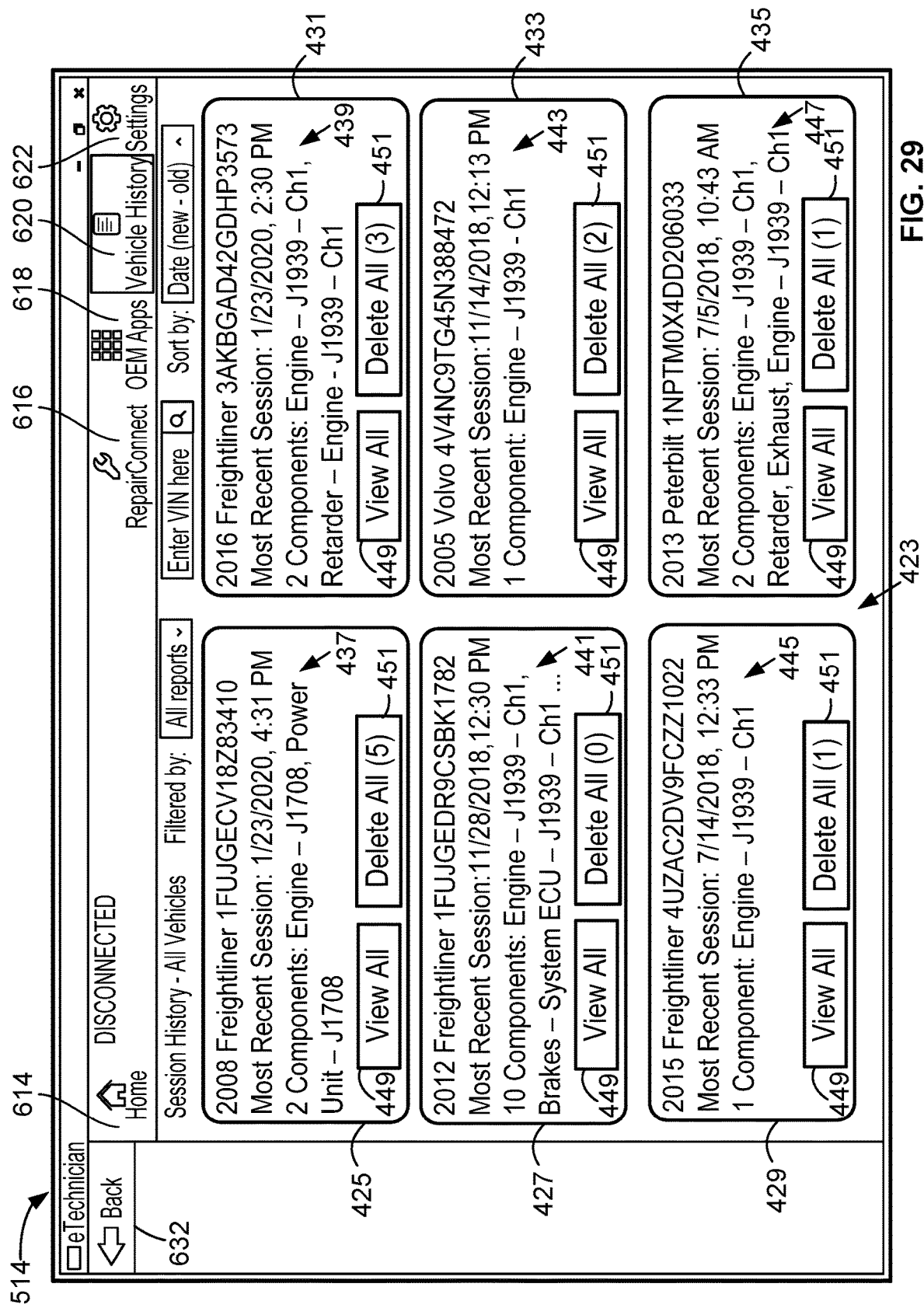

Next, FIG. 29 shows a GUI 514. The GUI 514 includes a vehicle history session overview 423 configured for displaying a vehicle history session summary in a display card format. The vehicle history session overview 423 includes a display card 425, 427, 429, 431, 433, 435 including a vehicle history session summary 437, 439, 441, 443, 445, 447, respectively. The vehicle history session summary 437, 439, 441, 443, 445, 447 is correlated with a particular vehicle. Each of the display card 425, 427, 429, 431, 433, 435 includes a view-all USC 449 and a delete-all USC 451.

In response to the processor 162 determining the view-all USC 449 is selected within the display card 425, 427, 429, 431, 433, 435, the processor 162 can cause the display 171 to display a summary of vehicle history sessions generated for a vehicle identified in the display card 425, 427, 429, 431, 433, 435. As an example, in response to determining the view-all USC 449 within the display card 427 is selected, the processor 162 can cause the display 171 to display the GUI 510 shown in FIG. 27.

In response to the processor 162 determining any portion of the display card 425, 427, 429, 431, 433, 435 other than the view-all USC 449 or the delete-all USC 451 is selected, the processor 162 can cause the display 171 to display a vehicle session activity log corresponding to the vehicle history session identified in the display card. For example, in response to the processor 162 determining any portion of the display card 427 other than the view-all USC 449 or the delete-all USC 451 is selected, the processor 162 can cause the display 171 to display the session activity log 757 (shown in FIG. 22) corresponding to the vehicle history session identified in the display card 427.

In response to the processor 162 determining the delete-all USC 451 is selected within the display card 425, 427, 429, 431, 433, 435, the processor 162 can delete the vehicle history sessions stored for the particular vehicle in the memory 164. The delete-all USC 451 within the display card 425, 427, 429, 431, 433, 435 can include a number indicating how many vehicle history sessions were identified for the particular vehicle indicated in the display card 425, 427, 429, 431, 433, 435.

Figure 30:
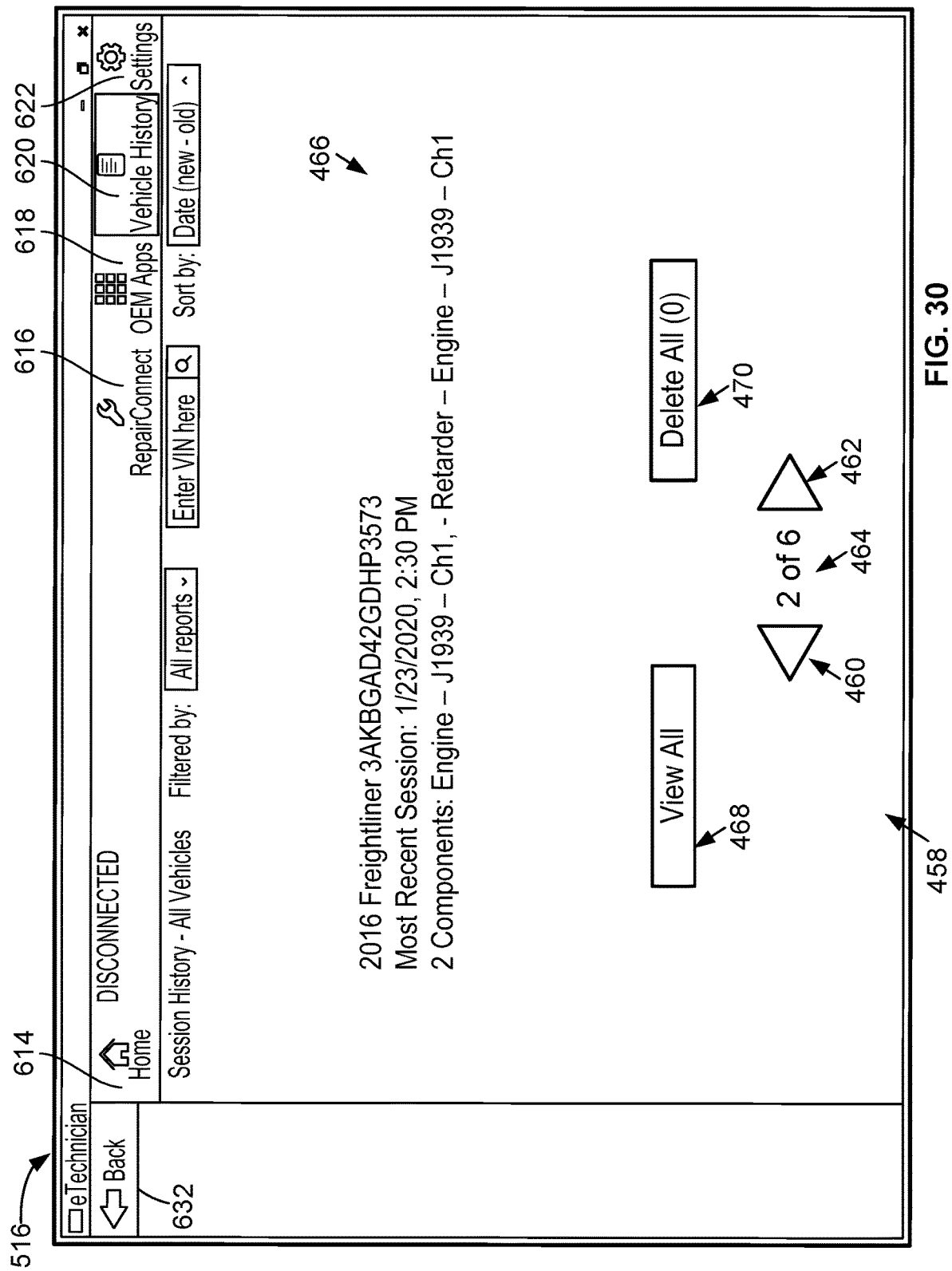

Next, FIG. 30 shows a GUI 516. The GUI 516 includes a vehicle history session overview 458 configured for displaying a vehicle history session summary in a wizard display format. In particular, the vehicle history session overview 458 is configured to display vehicle history sessions for vehicles determined in response to a search for vehicle history sessions. That search, for example, could include a search for vehicle history sessions generated by the computing system 104, 190. As another example, the search could include a search for vehicle history sessions generated by a group of computing systems associated with a particular domain, such as the group of computing systems 127. If a response to the search includes a vehicle history session for more than one vehicle, the multiple vehicle history sessions can be arranged according to an ordered set of vehicles.

The vehicle history session overview 458 includes a select-prior USC 460 configured to select a prior vehicle among the ordered set of vehicles. Use of the select-prior USC 460 also causes a vehicle history session summary for the prior vehicle to be displayed on the display 171 within the GUI 516 instead of a currently-displayed vehicle history session for a current vehicle among the ordered set of vehicles. The vehicle history session overview 458 includes a select-next USC 462 configured to select a next vehicle among the ordered set of vehicles. Use of the select-next USC 462 also causes a vehicle history session summary for the next vehicle to be displayed on the display 171 within the GUI 516 instead of the currently-displayed vehicle history session for the current vehicle among the ordered set of vehicles.

The vehicle history session overview 458 includes a counter 464. The counter 464 includes a first number (e.g., 2 in FIG. 30) to indicate which vehicle among the ordered set of vehicles is the current vehicle among the ordered set of vehicles and a second number (e.g., 6 in FIG. 30) to indicate how many vehicles are contained within the ordered set of vehicles.

The vehicle history session overview 458 includes a vehicle history session summary 466 for the current vehicle among the ordered set of vehicles. In at least some implementations, a portion of the GUI 516 can be selectable to cause the processor 162 to display a vehicle session activity log corresponding to the vehicle history session summary 466. For example, in response to the processor 162 determining a portion of the display 171 at which text of the vehicle history session summary 466 is displayed, the processor 162 can cause the display 171 to display the session activity log 669 (shown in FIG. 18) corresponding to the vehicle history session summary 466.

The vehicle history session overview 458 includes a view-all USC 468. In response to a selection of the view-all USC 468, the processor 162 is configured to display a set of vehicle history session summaries for the vehicle corresponding to the vehicle history session overview 458. The content of the set of vehicle history session summaries can be conditioned on various factors, such as how many vehicle history session summaries have been generated for the vehicle, whether a valid VIN is associated with each of the vehicle history session summaries have been generated for the vehicle, whether the memory 164 includes any vehicle history session summaries for the vehicle, a share-option identifier associated with the computing system 104, 190, a GUID (e.g., a user GUID and/or domain GUID) associated with the computing system 104, 190 and with the vehicle history sessions for the vehicle, and/or a share-option identifier associated with the vehicle history sessions for the vehicle. As an example, in response to selecting the view-all USC 468 within the GUI 516, the processor 162 can cause the display 171 to display the summary of vehicle history sessions 951 shown in FIG. 27.

The vehicle history session overview 458 includes a delete-all USC 470. In response to determining the delete-all USC 470 for the current vehicle has been selected, the processor 162 can delete the vehicle history sessions, if any, stored for the current vehicle in the memory 164. Referring to FIG. 27, the vehicle history sessions identified with the icon 952 are the vehicle history sessions that would be deleted from the memory 164 for the current vehicle identified in the vehicle history session overview 458 shown in FIG. 30.

Figure 35:
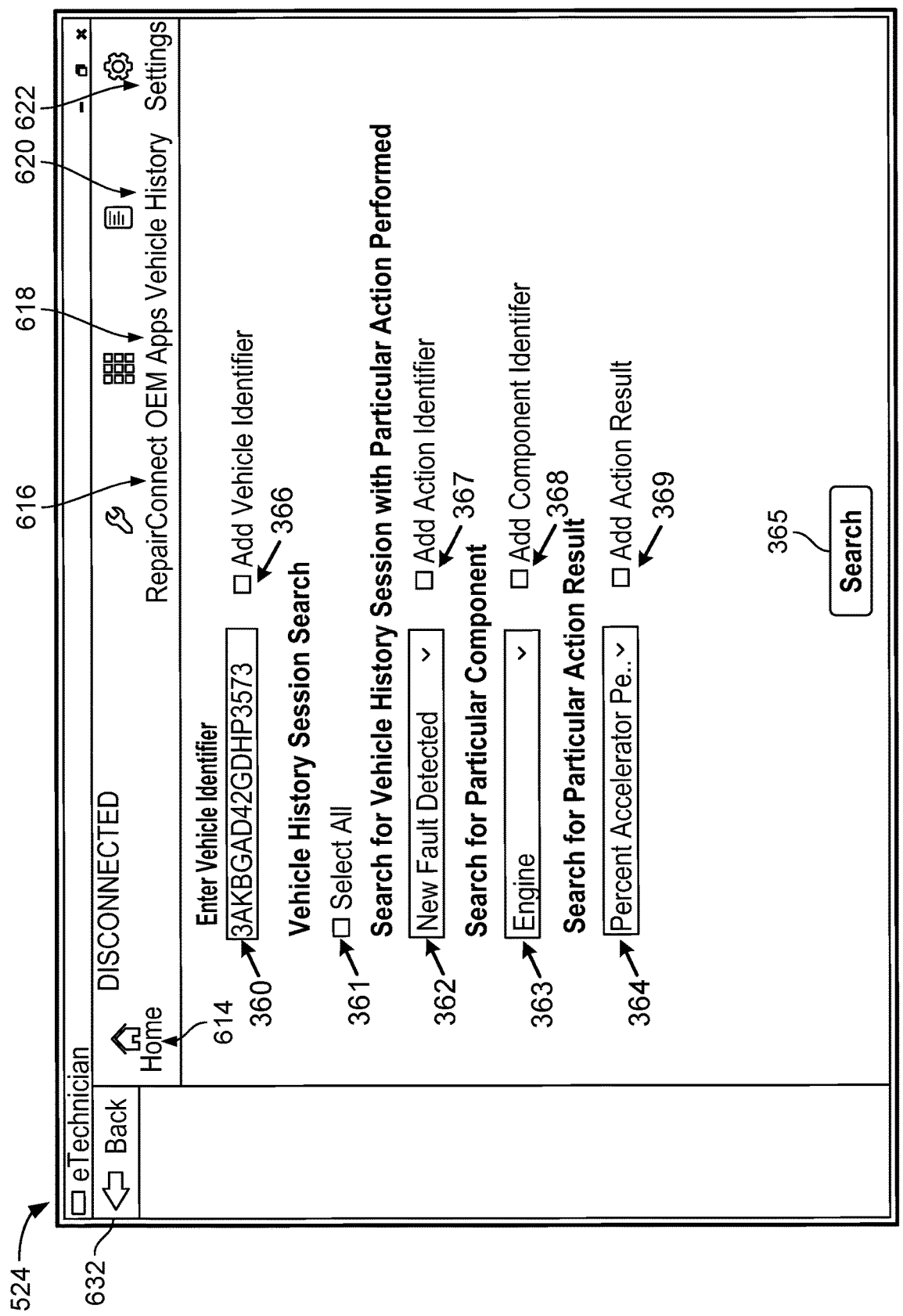

Turning to FIG. 35, a GUI 524 is shown. The GUI 524 can be displayed on the display 171 to allow a user to search for vehicle history session(s) having particular content (e.g., discrete data elements of a vehicle history session). In at least some implementations, the GUI 524 can be displayed in response to a selection of the vehicle-history session USC 620 or some other USC included in a GUI. A GUI, such as the GUI 524, configured for entering search criterion/criteria can include one or more fields in which search criterion can be entered and/or selected. The search criterion can include any discrete data element that can be included in a vehicle history session. Moreover, a range of data values corresponding to the discrete data element can be selected. As an example, selection of the search criterion can occur via a menu that the processor 162 can populate into the field before the selection is made. The search criterion can include the range of data values.

In particular, the GUI 524 includes a field 360 for entering a vehicle identifier or a portion of a vehicle identifier. A search for vehicle history session(s) can be performed even if only a portion of a vehicle identifier is entered into the field 360. As an example, the vehicle identifier can be a vehicle identification number assigned by an OEM, a unit number assigned by a fleet operator, or some other vehicle identification number. As shown in FIG. 35, a seventeen character VIN has been entered into the field 360.

The GUI 524 includes a field 361 for selecting all vehicle history session(s) corresponding to a vehicle associated with the vehicle identifier entered into the field 360 or to one or more vehicles associated with a portion of a vehicle identifier entered into the field 360. As shown in FIG. 35, the field 361 can be arranged as a check box.

The GUI 524 includes a selector 362 for entering an action identifier for actions performed during a vehicle history session. Examples of the action identifier are shown in the action column 672 in FIG. 18. As shown in FIG. 35, the action identifier entered into the field 362 can include the action identifier: New Fault Detected.

The GUI 524 includes a field 363 for entering a component identifier for components that provided data to the computing system 104, 190 during a vehicle history session. As shown in FIG. 35, the component identifier entered into the field 363 can include the component identifier: Engine.

The GUI 524 includes a field 364 for entering an action result identifier for actions performed during a vehicle history session. Examples of the action result identifier are shown in the window 700, 720, 740 shown in FIG. 19, FIG. 20, FIG. 21, respectively or the fault list 308 shown in FIG. 32. As shown in FIG. 35, the action result identifier entered into the field 364 can include the action result identifier: Percent Accelerator Pedal Position–Voltage>Normal. As shown in FIG. 35 a terminal portion of an action result identifier may be truncated while the field 364 is displayed.

The GUI 524 includes a selector 366 selectable to cause the processor 162 to modify the GUI 524 by adding a field, like the field 360, for entering another vehicle identifier. The GUI 524 includes a selector 367 selectable to cause the processor 162 to modify the GUI 524 by adding a field, like the field 362, for entering another action identifier. The GUI 524 includes a selector 368 selectable to cause the processor 162 to modify the GUI 524 by adding a field, like the field 363, for entering another component identifier. The GUI 524 includes a selector 369 selectable to cause the processor 162 to modify the GUI 524 by adding a field, like the field 364, for entering another action result identifier.

Checking the box 361 can clear out any selections entered into the field 362, 363, 364 and any further field added by use of the selector 366, 367, 368, 369. The GUI 524 includes a search USC 365. In response to determining the search USC 365 has been selected, the processor 162 can search for and/or request a search of the database 110 by the server 108 based on search criterion entered into the field 360, 362, 363, 364 and any further field added by use of the selector 366, 367, 368, 369.

Figure 36:
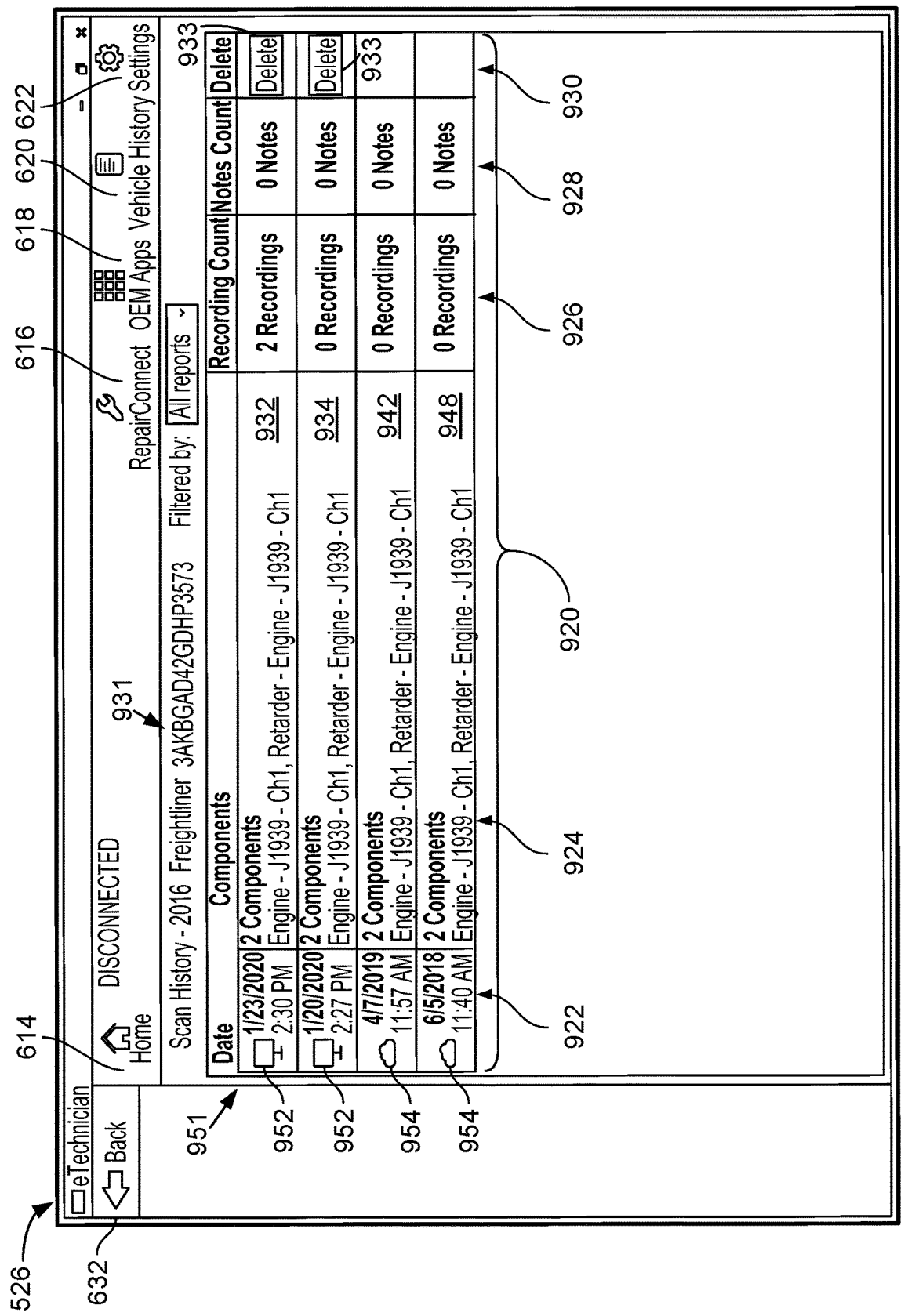

Next, FIG. 36 shows a GUI 526. The GUI 526 can be displayed in response to a search carried out by the processor 162 and/or the server 108 after the search USC 365 is selected. The GUI 526 shows a subset of the vehicle history sessions shown in the GUI 510. The vehicle history sessions shown in the GUI 510 can include all vehicle history session found during a search regarding the identified vehicle. Showing those vehicle history sessions can be conditioned on a share setting associate with the computing device 104, 190 and the vehicle history sessions stored in the database 110. The vehicle history sessions shown in the GUI 526 include only the vehicle history sessions that are associated with the vehicle identified in the field 360 and identifiers entered into the field 362, 363, 364. Advantageously, performing a search using the GUI 524 can result in providing search results for vehicle history session including particular search criterion and that are associated with a share setting of the computing system 104, 190.

The example implementations allow for other ways to search for vehicle history sessions. For example, in at least some implementations, while viewing data during a vehicle history session, a particular discrete data element can be received and displayed on the display 171. While that data element is being displayed, the data element can be selected and the processor 162 can search the memory 164 and/or cause the server 108 to search the database 110 for vehicle history sessions containing the selected data element. As an example, the selected data element can include a particular fault identifier. A search for vehicle history sessions containing the selected data element can be limited to the currently identified vehicle or can be expanded beyond the currently identified vehicle, such as other vehicles having the same year, make, and model. Other examples are possible. The results of a search performed during the vehicle history session can be displayed in a GUI like the GUI 526.

V. Example Vehicle

A vehicle is a mobile machine that can be used to transport a person, people, and/or cargo. A vehicle can be driven and/or otherwise guided along a path (e.g., a paved road or otherwise) on land, in water, in the air, and/or outer space. A vehicle can be wheeled, tracked, railed, and/or skied. A vehicle can include an automobile, a motorcycle (e.g., a two or three wheel motorcycle), an all-terrain vehicle (ATV) defined by ANSI/SVIA-1-2007, a snowmobile, a watercraft (e.g., a JET SKI® personal watercraft), a light-duty truck, a medium-duty truck, a heavy-duty truck, an on-highway truck, a semi-tractor, a drone, and/or a farm machine. A vehicle can include and/or use any appropriate voltage and/or current source, such as a battery, an alternator, a fuel cell, and the like, providing any appropriate current and/or voltage, such as about 12 volts, about 42 volts, and the like. A vehicle can, but need not necessarily, include and/or use any system and/or engine to provide its mobility. Those systems and/or engines can include vehicle components that use fossil fuels, such as gasoline, diesel, natural gas, propane, and the like, electricity, such as that generated by a battery, magneto, fuel cell, solar cell and the like, wind and hybrids and/or combinations thereof. A vehicle can, but need not necessarily, include an electronic control unit (ECU), an OBDC, and a vehicle network that connects the OBDC to the ECU. A vehicle can be configured to operate as an autonomous vehicle.

Some vehicles and types of vehicles can be identified by characteristics of the vehicle such as characteristics indicative of when the vehicle was built (e.g., a vehicle year), who built the vehicle (e.g., a vehicle make), marketing names associated with vehicle (e.g., a vehicle model name, or more simply "model"), and features of the vehicle (e.g., an engine type). This description uses an abbreviation YMME and/or Y/M/M/E, where each letter in the order shown represents a model year, vehicle make, vehicle model name, and engine type, respectively. This description uses an abbreviation YMM and/or Y/M/M, where each letter in the order shown represents a model year, vehicle make, and vehicle model name, respectively. This description uses an abbreviation YM and/or Y/M, where each letter in the order shown represents a model year and vehicle make, respectively. An example Y/M/M/E is 2016/Freightliner/Cascadia/Cummins ISX15 EPA, in which "2016" represents the model year the vehicle was built, "Freightliner" represents the name of the vehicle manufacturer Daimler Trucks North America, Cleveland, North Carolina, "Cascadia" represents a vehicle model built by that manufacturer, and "Cummins ISX15 EPA" represents an engine manufacturer and model within the vehicle. An example Y/M/M is 2016/Freightliner/Cascadia. An example Y/M is 2016/Freightliner. A person skilled in the art will understand that other features in addition to or as an alternative to "engine type" can be used to identify a vehicle. These other features can be identified in various manners, such as a regular production option (RPO) code, such as the RPO codes defined by the General Motors Company LLC, Detroit Michigan.

Some vehicles, such as automobiles and an on-highway trucks, are associated with a unique VIN. Some VINs include seventeen alpha-numeric characters. For at least some seventeen character VINs, the last six characters represent a unique serial number associated with a particular type of vehicle represented by the first eleven alpha-numeric characters of those VINs. The first eleven alpha-numeric characters typically represent at least a YMME, a YMM, and/or a YM. In some instances, a vehicle includes a one dimensional bar code and/or a multi-dimensional code indicative of a VIN associated with that vehicle.

As an example, a VIN such as 3AKJHIDR9JSJV5535 is for a particular on-highway truck referred to as a 2018 Freightliner® Cascadia 14.8 L L6 diesel, conventional cab. In some countries, a particular digit of a VIN is used as a check digit. For instance, for Canada, the United States, and Mexico, the ninth digit of a VIN is used as a check digit. A processor can be programmed to execute CRPI arranged as a check digit calculator to determine whether a VIN is valid.

A vehicle network, such as the vehicle network 117, can include one or more conductors (e.g., copper wire conductors) and/or can be wireless. As an example, a vehicle network can include one or two conductors for carrying vehicle data messages in accordance with a vehicle data message (VDM) protocol, such as a bi-directional VDM protocol. A bi-directional VDM protocol can include a SAE® J1850 (PWM or VPW) VDM protocol, an SAE® J1939 VDM protocol based on the SAE® J1939_201808 serial control and communications heavy duty vehicle network—top level document, and/or any other core J1939 standard, an ISO® 15764-4 controller area network (CAN) VDM protocol, an ISO® 9141-2 K-Line VDM protocol, an ISO® 14230-4 KWP2000 K-Line VDM protocol, an ISO® 17458 (e.g., parts 1-5) FlexRay VDM protocol, an ISO® 17987 local interconnect network (LIN) VDM protocol, a CAN 2.0 VDM protocol, standardized in part using an ISO® 11898-1:2015 road vehicle—CAN—Part I: data link layer and physical signaling protocol, a CAN FD VDM protocol (i.e., CAN with flexible data rate VDM protocol), a MOST® Cooperation VDM protocol (such as the MOST Specification Rev. 3.0 E2, or the MOST® Dynamic Specification, Rev. 3.0.2), an Ethernet VDM protocol (e.g., an Ethernet 802.3 protocol using a BROADR-REACH® physical layer transceiver specification for Automotive Applications by Broadcom Inc., San Jose, California), or some other VDM protocol defined for performing communications with or within the vehicle 102, 134, 136, 138, 140, 142, 144, 146, 148, 150, 152, 154. Each and every VDM discussed in this description is arranged according to a VDM protocol.

Instead of being bidirectional, a VDM protocol can be a unidirectional. For example, a SENT VDM protocol (i.e., a single-edge nibble transmission VDM protocol) is a unidirectional VDM protocol. The SENT VDM protocol has been standardized as the SAE J2716 VDM protocol. A sensor in a vehicle can include a transmitter configured to communicate using the SENT VDM protocol (i.e., a SENT VDM transmitter). A vehicle network can operatively connect the SENT VDM transmitter and an ECU within the vehicle. The transceiver 168 (e.g., the vehicle communications transceiver 178) can include a SENT VDM receiver connectable to the vehicle communication bus operatively connected to the SENT VDM transmitter. The SENT VDM receiver can receive SENT VDM protocol messages representing sensor values output by the sensor with the SENT VDM transmitter.

An OBDC, such as the OBDC 113 shown in FIG. 3 can include an on-board diagnostic (OBD) connector, such as a J1939 connector, an OBD-I connector, or an OBD-II connector. A J1939 connector is a connector that complies with the SAE J1939 standard. As an example, a J1939 connector can include a J1939 type-1 connector with nine connector terminals, such as a J1939 type-1 connector; part number AHD10-9-1939P, supplied by Amphenol Sine Systems, Clinton Township, Michigan. As another example, a J1939 connector can include a J1939 type-2 connector, such as a J1939 type-2 connector with nine connector terminals; part number AHD10-9-1939P80, supplied by Amphenol Sine Systems. An OBD-I connector, for example, can include slots for retaining up to twelve connector terminals. As an example, an OBD-I connector can include a connector part number 12101918 available from dealerships selling products manufactured by General Motors, Detroit, Michigan. An OBD-II connector can include slots for retaining up to sixteen connector terminals. An OBD-II connector that meets the SAE J1962 specification includes a connector 16M, part number 12110252, available from Aptiv LLC of Dublin, Ireland. Other examples of the OBDC 113 are also possible An OBDC can include conductor terminals that connect to a conductor in a vehicle. For instance, an OBDC can include connector terminals that connect to conductors that connect to positive and negative terminals of the power supply 115 and/or the power supply circuit 119. An OBDC can include one or more conductor terminals that connect to a conductor of the vehicle network 117 such that the OBDC is operatively connected to one or more ECUs in the vehicle 102. A computing system, such as the computing system 104, can operatively connect directly to an OBDC in order to receive VDM from the vehicle including that OBDC. A computing system, such as the computing system 190, can operatively connect indirectly to an OBDC by way of the vehicle communication interface 200 in order to receive VDM from the vehicle including that OBDC. A VDM can carry VDM data. The VDM data can, but need not necessarily, include a parameter identifier (PID) and data (PID data) parameters associated with the PID. The VDM data can, but need not necessarily, include a DTC. The VDM data can include data indicative of vehicle components detected during a scan of a vehicle and/or during a process the computing system 104, 190 performs to detect components in the vehicle.

An ECU can control various aspects of vehicle operation and/or components within a vehicle system. For example, an ECU can include a powertrain (PT) system ECU, an engine control module (ECM) ECU, a supplemental inflatable restraint (SIR) system (i.e., an air bag system) ECU, an entertainment system ECU, a brake system ECU, an advanced driver-assistance system (ADAS) ECU, a cab climate system ECU, an instrument cluster, ECU, or some other ECU. An ECU can receive an electrical or optical input from an ECU-connected input device (e.g., a sensor input), control an ECU-connected output device (e.g., a solenoid) via an electrical or optical signal output by the ECU, generate a vehicle data message (VDM) (such as a VDM based on a received input or a controlled output), and set a diagnostic trouble code (DTC) to a state (such as active or history). An ECU can perform a functional test in response to receiving a VDM requesting performance of the functional test. The functional test can be used to test an ECU-connected output device. As an example, the functional test can include a diesel particulate filter regeneration procedure. An ECU can change a parameter based on a request from the computing system 104, 190.

VI. Conclusion

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether. Furthermore, various functions described and/or shown in the drawings as being performed by one or more elements can be carried out by a processor executing computer-readable program instructions or by a combination of hardware, firmware, and/or software. For purposes of this description, execution of CRPI contained in a computer-readable medium to perform some function can include executing all of the program instructions of those CRPI or only a portion of those CRPI.

While various aspects and implementations are described herein, other aspects and implementations will be apparent to those skilled in the art. The various aspects and implementations disclosed herein are for purposes of illustration and are not intended to be limiting, with the true scope being indicated by the claims, along with the full scope of equivalents to which such claims are entitled. It is also to be understood that the terminology used herein for the purpose of describing implementations only, and is not intended to be limiting.

In this description, the articles "a," "an," and "the" are used to introduce elements and/or functions of the example implementations. The intent of using those articles is that there is one or more of the introduced elements and/or functions.

In this description, the intent of using the term "and/or" within a list of at least two elements or functions and the intent of using the terms "at least one of," "at least one of the following," "one or more of," and "one or more of the following" immediately preceding a list of at least two components or functions is to cover each implementation including a listed component or function independently and each implementation including a combination of the listed components or functions. For example, an implementation described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible implementations: (i) an implementation including A, but not B and not C, (ii) an implementation including B, but not A and not C, (iii) an implementation including C, but not A and not B, (iv) an implementation including A and B, but not C, (v) an implementation including A and C, but not B, (v) an implementation including B and C, but not A, and/or (vi) an implementation including A, B, and C. For the implementations including component or function A, the implementations can include one A or multiple A. For the implementations including component or function B, the implementations can include one B or multiple B. For the implementations including component or function C, the implementations can include one C or multiple C. The use of ordinal numbers such as "first," "second," "third" and so on is to distinguish respective elements rather than to denote an order of those elements unless the context of using those terms explicitly indicates otherwise. The use of the symbol "$" as prefix to a number indicates the number is a hexadecimal number.

Implementations of the present disclosure may thus relate to one of the enumerated example embodiments (EEEs) listed below.

EEE 1 is method comprising: initiating, by a computing system, a first vehicle history session for a vehicle associated with a particular vehicle identification number; generating, by the computing system, metadata regarding the first vehicle history session; determining, by the computing system, one or more action identifiers, wherein each action identifier is correlated with a respective action requested by the computing system during the first vehicle history session; correlating, by the computing system, a respective time stamp with each of the one or more action identifiers, wherein each respective time stamp indicates a time when a respective action correlated with each of the one or more action identifiers was performed; correlating, by the computing system, a respective detail with each of the one or more action identifiers, wherein each detail indicates a vehicle response to a respective vehicle data message sent to the vehicle during performance of each respective action; and automatically transmitting, by the computing system, a report for the first vehicle history session over an off-board communication network for storage at a remote cloud-based computer-readable media, wherein the report includes the metadata regarding the first vehicle history session and one or more report inputs, wherein each report input includes an action identifier from among the one or more action identifiers, a respective time stamp correlated with the action identifier, and at least a summary of the respective detail correlated with the action identifier.

EEE 2 is a method of EEE 1, wherein the metadata includes the particular vehicle identification number, wherein the method further comprises: determining, by the computing system, whether the particular vehicle identification number is a valid vehicle identification number, wherein automatically transmitting the report for the first vehicle history session is conditioned on the particular vehicle identification number being a valid vehicle identification number.

EEE 3 is a method of EEE 2, wherein the metadata includes a share-option identifier associated with the first vehicle history session, wherein the method further comprises: determining, by the computing system, whether the share-option identifier associated with the first vehicle history session is sharing or no-sharing, wherein automatically transmitting the report for the first vehicle history session is further conditioned on the share-option identifier associated with the first vehicle history session being sharing.

EEE 4 is a method of EEE 3, wherein the share-option identifier indicates global sharing.

EEE 5 is a method of EEE 3, wherein the share-option identifier indicates domain sharing, and wherein the metadata further includes a domain identifier of a domain associated with the computing system or a user using the computing system.

EEE 6 is a method of EEE 3, wherein the share-option identifier indicates user sharing, and wherein the metadata further includes a user identifier associated with the computing system or a user using the computing system.

EEE 7 is a method of EEE 1, wherein the metadata includes a share-option identifier associated with the first vehicle history session, wherein the method further comprises: determining, by the computing system, whether the share-option identifier associated with the first vehicle history session is sharing or no-sharing, wherein automatically transmitting the report for the first vehicle history session is conditioned on the share-option identifier associated with the first vehicle history session being sharing.

EEE 8 is a method of EEE 7, wherein the share-option identifier indicates global sharing.

EEE 9 is a method of EEE 7, wherein the share-option identifier indicates domain sharing, and wherein the metadata further includes a domain identifier of a domain associated with the computing system or a user using the computing system.

EEE 10 is a method of EEE 7, wherein the share-option identifier indicates user sharing, and wherein the metadata further includes a user identifier associated with the computing system or a user using the computing system.

EEE 11 is a method of any one of EEE 1 to 10, further comprising: determining, by the computing system, a type of vehicle communication interface of a particular vehicle communication interface selected as an interface between the vehicle and the computing system; transmitting, by the computing system to the particular vehicle communication interface, a request to scan electronic control units on the vehicle, wherein the request is based on the type of vehicle communication interface; receiving, at the computing system from the particular vehicle communication interface, a response to the request, the response including a list of electronic control units disposed on the vehicle; and receiving, at the computing system, a selection to connect to one or more electronic control units contained on the list of electronic control units.

EEE 12 is a method of any one of EEE 1 to 11, further comprising: determining, by the computing system, that the computing system is connected to the vehicle; wherein initiating the first vehicle history session for the vehicle occurs in response to determining that the computing system is connected to the vehicle.

EEE 13 is a method of any one of EEE 1 to 12, wherein the report also includes a further report input, wherein the further report input includes a further action identifier and a further time stamp correlated with the further action identifier, wherein the further action identifier is indicative of an action performed by the computing system that does not require sending a vehicle data message to the vehicle, and wherein the further time stamp indicates when the further action was performed.

EEE 14 is a method of EEE 13, wherein the action performed by the computing system that does not require sending a vehicle data message to the vehicle includes adding a note to the report or generating the report.

EEE 15 is a method of any one of EEE 13 to 14, wherein the further report input includes a detail correlated with the further action identifier, the further time stamp, or both the further action identifier and the further time stamp.

EEE 16 is a method of any one of EEE 1 to 15, wherein the computing system includes a display, and wherein the method further comprises: before initiating or after ending the first vehicle history session, transmitting, by the computing system, a request to search the remote cloud-based computer-readable media to locate all reports for vehicle history sessions pertaining to a selected vehicle identification number, wherein the request includes a share-option identifier associated with the computing system; and displaying, by the computing system on the display, an overview of vehicle history sessions regarding the selected vehicle identification number that is based, at least in part, on a response to the request, wherein the response includes a respective indicator for each of one or more vehicle history sessions regarding the selected vehicle identification number stored at the remote cloud-based computer-readable media, wherein a report associated with each of the one or more vehicle history sessions regarding the selected vehicle identification number includes a share-option identifier that matches the share-option identifier associated with the computing system.

EEE 17 is a method of EEE 16, wherein the overview includes a particular indicator for a particular vehicle history session regarding the selected vehicle identification number, and wherein the method further comprises: transmitting, by the computing system over the off-board communication network, a request for a particular report that is associated with the particular vehicle history session, wherein the request for the particular report includes the particular indicator; and displaying, by the computing system on the display, the particular report, received in response to the request for the particular report.

EEE 18 is a method of EEE 17, wherein the particular report includes multiple report inputs, and wherein each report input of the particular report is configured to be displayed in a respective row of the particular report arranged as a grid of multiple columns and multiple rows, a respective column of the particular report arranged as the grid of multiple columns and multiple rows, a single display card, or as wizard display page.

EEE 19 is a method of EEE 16, wherein the selected vehicle identification number matches the particular vehicle identification number, wherein the request is transmitted after ending the first vehicle history session, wherein the overview of vehicle history sessions regarding the selected vehicle identification number is further based on one or more vehicle history session stored in computer-readable media local to the computing system, wherein the one or more vehicle history sessions stored in computer-readable media local to the computing system include the first vehicle history session, and wherein the method further includes: generating, by the computing system, the overview, at least in part, by aggregating the respective indicator for each of one or more vehicle history sessions regarding the selected vehicle identification number stored at the remote cloud-based computer-readable media and a respective indicator for each of the one or more vehicle history sessions stored in computer-readable media local to the computing system.

EEE 20 is a method of EEE 19, wherein the overview includes an indicator of the report for the first vehicle history, wherein the method further comprises: displaying, by the computing system on the display, the report for the first vehicle history, wherein the one or more report inputs of the report for the first vehicle history include a particular report input, wherein the particular report input includes a particular action identifier from among the one or more action identifiers, a particular time stamp correlated with the particular action identifier, and at least a particular summary of a particular detail correlated with the particular action identifier, wherein the particular summary includes a link for accessing at least a portion of the particular detail, wherein displaying the report for the first vehicle history includes displaying the link on the display; and displaying, by the computing system on the display, at least the portion of the particular detail in response to a selection of the link for accessing at least a portion of the particular detail.

EEE 21 is a method of EEE 20, wherein the particular action identifier includes an action identifier associated with requesting life or trip data from the vehicle, wherein at least the portion of the particular detail includes life or trip data the computing system received from the vehicle in response to transmitting a request for life or trip data, and wherein displaying at least the portion of the particular detail includes displaying the life or trip data.

EEE 22 is a method of EEE 20, wherein the particular action identifier includes an action identifier associated with calibrating a vehicle component on the vehicle, wherein at least the portion of the particular detail includes data within a calibration response the computing system received from the vehicle in response to calibrating the vehicle component on the vehicle, and wherein displaying at least the portion of the particular detail includes displaying the data within the calibration response.

EEE 23 is a method of EEE 20, wherein the particular action identifier includes an action identifier associated with testing a vehicle component on the vehicle, wherein at least the portion of the particular detail includes data within a test response the computing system received from the vehicle in response to testing the vehicle component on the vehicle, and wherein displaying at least the portion of the particular detail includes displaying the data within the test response.

EEE 24 is a method of EEE 20, wherein the particular action identifier includes an action identifier associated with clearing faults within the vehicle, wherein at least the portion of the particular detail includes data within a faults response the computing system received from the vehicle in response to a request to clear faults within the vehicle, and wherein displaying at least the portion of the particular detail includes displaying the data within the faults response.

EEE 25 is a method of EEE 20, wherein the particular action identifier includes an action identifier associated with detecting a new fault within the vehicle, wherein at least the portion of the particular detail includes data indicating a new fault has been set within the vehicle, and wherein displaying at least the portion of the particular detail includes displaying the data indicating a new fault.

EEE 26 is a method of EEE 20, wherein the particular action identifier includes an action identifier associated with generating a report during the vehicle history session, wherein at least the portion of the particular detail includes a report generated during the vehicle history session, and wherein displaying at least the portion of the particular detail includes displaying the report generated during the vehicle history session.

EEE 27 is a method of EEE 20, wherein the particular action identifier includes an action identifier associated with a recording generated during the vehicle history session, wherein at least the portion of the particular detail includes the recording generated during the vehicle history session, and wherein displaying at least the portion of the recording generated during the vehicle history session.

EEE 28 is a method of EEE 20, wherein the particular action identifier includes an action identifier associated with adding a note to the vehicle history session, wherein at least the portion of the particular detail includes a note added to the vehicle history session, and wherein displaying at least the portion of the particular detail includes displaying the note added to the vehicle history session.

EEE 29 is a method of EEE 26, wherein the summary of the respective detail correlated with the action identifier for a particular action identifier of the one or more action identifiers includes a link, wherein the method further comprises: determining, by the computing system, that a selection of the link has occurred while the display is displaying the report; displaying, by the computing system on the display, a further detail correlated with the particular action identifier.

EEE 30 is a method of EEE 29, wherein displaying the further detail correlated with the particular action identifier includes displaying the further detail correlated with the particular action identifier overlaid upon the report.

EEE 31 is a method of any one of EEE 1 to 30, further comprising: determining a vehicle communication interface selected for the first vehicle history session.

EEE 32 is method of EEE 31 wherein determining the vehicle communication interface selected for the first vehicle history session includes receiving a selection of one or more of the following: an identifier of a vendor of the vehicle communication interface, an identifier of a model of the vehicle communication interface, or an identifier of a connection type used by vehicle communication interface.

EEE 33 is a method of EEE 32, wherein receiving the selection includes receiving the selection from a graphical user interface.

EEE 34 is a method of any one of EEE 32 to 33, wherein the identifier of the vendor of the vehicle communication interface, the identifier of a model of the vehicle communication interface, and/or the identifier of a connection type used by vehicle communication interface is available for selecting as a result of a computer-readable driver for the vehicle communication interface being installed onto the computing system.

EEE 35 is a method of EEE 32, wherein receiving the selection includes receiving the selection via a message transmitted by the vehicle communication interface.

EEE 36 is a method of any one of EEE 1 to 35, further comprising: receiving a search criterion into a graphical user interface displayed by the computing system, and displaying, in response to a search of the remote cloud-based computer-readable media and computer-readable media at the computing system, an identifier of one or more vehicle history sessions determined during the search.

EEE 37 is a method of EEE 36, wherein the search criterion includes one or more of: a vehicle identifier, a component identifier, an action identifier, or an action result identifier.

EEE 38 is a method of any one of EEE 36 to 37, wherein the identifier of one or more vehicle history sessions include an identifier of a particular vehicle history session, and wherein the method further comprises: receiving a selection of the identifier of the particular vehicle history session, and displaying a session activity log for a vehicle history session associated with the particular vehicle history session.

EEE 39 is a method of any one of EEE 1 to 38, further comprising: determining a vehicle communication interface is connected to the vehicle.

EEE 40 is a method of any one of EEE 1 to 39, further comprising: transitioning, by the computing system, from a state in which the computing system is not waiting for performance of a vehicle history session action to a state in which the computing system is waiting for performance of a vehicle history session action.

EEE 41 is a method of EEE 40, further comprising, receiving, while the computing system is operating in the state in which the computing system is waiting for performance of the vehicle history session action, data pertaining to a particular action of the vehicle history session performed automatically, wherein the one or more report inputs include an report input corresponding to the particular action.

EEE 42 is a method of EEE 40, further comprising, receiving, while the computing system is operating in the state in which the computing system is waiting for performance of the vehicle history session action, data pertaining to a particular action of the vehicle history session performed in response to an action requested by a user, wherein the one or more report inputs include an report input corresponding to the particular action.

EEE 43 is a method of EEE 42, wherein the action requested by the user includes an action requested by selecting a user selectable control displayed within a graphical user interface on a display of the computing system.

EEE 44 is a method of any one of EEE 1 to 43, further comprising: determining the first vehicle history session has ended; and determining whether a condition indicating a report should be uploaded to the remote cloud-based computer-readable media exists.

EEE 45 is a method of EEE 44, wherein the condition includes a condition whether the particular vehicle identification number is a valid vehicle identification number.

EEE 46 is a method of any one of EEE 44 to 45, wherein the condition includes a condition whether a share-option identifier associated with the first vehicle history session is sharing or no-sharing.

EEE 47 is a method of any one of EEE 1 to 46, further comprising: converting the report for the first vehicle history session from a first format to a second format.

EEE 48 is a method of EEE 47, wherein the first format is an extensible markup language format and the second format is a Java script object notation format.

EEE 49 is a method of any one of EEE 1 to 48, wherein metadata regarding the first vehicle history session includes one or more of the following: a user global user identifier, a domain global user identifier, a share-option identifier, or an identifier of the first vehicle history session.

EEE 50 is a method of any one of EEE 1 to 49, wherein automatically transmitting the report includes transmitting the metadata in one or more communications separate from one or more communications containing the one or more report inputs.

EEE 51 is a method of any one of EEE 1 to 50, further comprising: transmitting, by the computing system prior to initiating the first vehicle history session, an e-mail address to a server; and receiving, by the computing system, a user global user identifier that the server maps to the e-mail address after receiving the e-mail address from the computing system.

EEE 52 is a method of any one of EEE 1 to 51, wherein the computing system includes a network transceiver and a vehicle communication interface removably connectable to the network transceiver.

EEE 53 is a method of EEE 52, wherein one or more of the network transceiver or the vehicle communication interface is configured to communicate using radio signals.

EEE 54 is a method of any one of EEE 1 to 51, wherein the computing system includes a network transceiver, a vehicle communications transceiver, and a housing, and wherein at least a portion of the network transceiver and the vehicle communications transceiver are contained within the housing.

EEE 55 is a method of EEE 54, wherein one or more of the network transceiver or the vehicle communications transceiver is configured to communicate using radio signals.

EEE 56 is a computing system comprising: one or more processors; and computer-readable media storing executable instructions, wherein execution of the executable instructions by the one or more processors causes the computing system to perform functions comprising: initiating, by the computing system, a first vehicle history session for a vehicle associated with a particular vehicle identification number; generating, by the computing system, metadata regarding the first vehicle history session; determining, by the computing system, one or more action identifiers, wherein each action identifier is correlated with a respective action requested by the computing system during the first vehicle history session; correlating, by the computing system, a respective time stamp with each of the one or more action identifiers, wherein each respective time stamp indicates a time when a respective action correlated with each of the one or more action identifiers was performed; correlating, by the computing system, a respective detail with each of the one or more action identifiers, wherein each detail indicates a vehicle response to a respective vehicle data message sent to the vehicle during performance of each respective action; and automatically transmitting, by the computing system, a report for the first vehicle history session over an off-board communication network for storage at a remote cloud-based computer-readable media, wherein the report includes the metadata regarding the first vehicle history session and one or more report inputs, wherein each report input includes an action identifier from among the one or more action identifiers, a respective time stamp correlated with the action identifier, and at least a summary of the respective detail correlated with the action identifier.

EEE 57 is a computer readable medium having stored therein instructions executable by one or more processors to cause a computing system to perform functions comprising: initiating, by the computing system, a first vehicle history session for a vehicle associated with a particular vehicle identification number; generating, by the computing system, metadata regarding the first vehicle history session; determining, by the computing system, one or more action identifiers, wherein each action identifier is correlated with a respective action requested by the computing system during the first vehicle history session; correlating, by the computing system, a respective time stamp with each of the one or more action identifiers, wherein each respective time stamp indicates a time when a respective action correlated with each of the one or more action identifiers was performed; correlating, by the computing system, a respective detail with each of the one or more action identifiers, wherein each detail indicates a vehicle response to a respective vehicle data message sent to the vehicle during performance of each respective action; and automatically transmitting, by the computing system, a report for the first vehicle history session over an off-board communication network for storage at a remote cloud-based computer-readable media, wherein the report includes the metadata regarding the first vehicle history session and one or more report inputs, wherein each report input includes an action identifier from among the one or more action identifiers, a respective time stamp correlated with the action identifier, and at least a summary of the respective detail correlated with the action identifier.

EEE 58 is a computing system comprising: one or more processors, and computer readable data storage storing executable instructions, wherein execution of the executable instructions by the one or more processors causes computing system to perform the method of any one of EEE 1 to EEE 55.

EEE 59 is a non-transitory computer readable medium having stored therein instructions executable by one or more processors to cause a computing system to perform the method of any one of EEE 1 to EEE 55.

EEE 60 is a computing system comprising: means for initiating a first vehicle history session for a vehicle associated with a particular vehicle identification number; means for generating metadata regarding the first vehicle history session; means for determining one or more action identifiers, wherein each action identifier is correlated with a respective action requested by the computing system during the first vehicle history session; means for correlating a respective time stamp with each of the one or more action identifiers, wherein each respective time stamp indicates a time when a respective action correlated with each of the one or more action identifiers was performed; means for correlating a respective detail with each of the one or more action identifiers, wherein each detail indicates a vehicle response to a respective vehicle data message sent to the vehicle during performance of each respective action; and means for automatically transmitting a report for the first vehicle history session over an off-board communication network for storage at a remote cloud-based computer-readable media, wherein the report includes the metadata regarding the first vehicle history session and one or more report inputs, wherein each report input includes an action identifier from among the one or more action identifiers, a respective time stamp correlated with the action identifier, and at least a summary of the respective detail correlated with the action identifier.

What is claimed is:

1. A method comprising:
receiving, by a vehicle communications transceiver (VCT) of a computing system, a signal carried over an electrical circuit, wherein the electrical circuit is part of a vehicle network within a vehicle and the signal is arranged as a vehicle data message;
determining, by the computing system, the VCT is connected to the vehicle network by determining the signal is arranged as a first vehicle data message;
initiating, by the computing system in response to determining the computing system is connected to the vehicle network, a first vehicle history session for the vehicle, wherein initiating the first vehicle history session includes generating a file for storing a report regarding the first vehicle history session within a memory local to the computing system, and the computing system transitioning from a first state in which the computing system is not waiting for performance of user-requested actions of the first vehicle history session to a second state in which the computing system awaits performance of user-requested actions of the first vehicle history session and stores, within the memory local to the computing system, report inputs regarding each user-requested action without storing broadcast vehicle data message sent by the vehicle automatically rather than in response to user-requested actions;

generating, by the computing system, metadata regarding the first vehicle history session;

while the computing system operates in the second state transmitting, by the VCT to the vehicle, a second vehicle data message as part of performing a first user-requested action of the first vehicle history session and determining, by the computing system, a first action identifier, a first time stamp corresponding to the first action identifier, and a first detail corresponding to the first action identifier, wherein the first action identifier corresponds to the second vehicle data message, and wherein the first time stamp indicates a time when the first user-requested action of the first vehicle history session was performed;

determining, by the computing system, the first vehicle history session has ended and completing storage of the report regarding the first vehicle history session within the memory local to the computing system, wherein completing storage of the report includes adding into the report a line indicating completion of the report;

automatically transmitting, by the computing system after completing storage of the report, the report over an off-board communication network for storage at a remote cloud-based non-transitory computer-readable memory, wherein the report transmitted after completing storage of the report includes the line indicating completion of the report, a first report input, and at least a portion of the metadata regarding the first vehicle history session, wherein the first report input includes the first action identifier, the first time stamp, and at least a summary of the first detail corresponding to the first action identifier; and displaying, on a display, a graphical user interface to show at least a portion of the report for assessing how the vehicle has performed.

2. The method of claim 1,
wherein the vehicle is associated with a particular vehicle identification number,
wherein the metadata includes the particular vehicle identification number,
wherein the method further comprises determining, by the computing system, whether the particular vehicle identification number is a valid vehicle identification number, and
wherein automatically transmitting the report for the first vehicle history session is conditioned on the particular vehicle identification number being the valid vehicle identification number.

3. The method of claim 2,
wherein the metadata includes a share-option identifier associated with the first vehicle history session,
wherein the method further comprises determining, by the computing system, whether the share-option identifier associated with the first vehicle history session is sharing or no-sharing, and
wherein automatically transmitting the report for the first vehicle history session is further conditioned on the share-option identifier associated with the first vehicle history session being sharing.

4. The method of claim 3,
wherein the share-option identifier indicates: global sharing, domain sharing, or user sharing,
wherein, if the share-option identifier indicates domain sharing, then the metadata further includes a domain identifier of a domain associated with the computing system or a user using the computing system, and
wherein, if the share-option identifier indicates user sharing, then the metadata further includes a user identifier associated with the computing system or a user using the computing system.

5. The method of claim 1,
wherein the metadata includes a share-option identifier associated with the first vehicle history session,
wherein the method further comprises determining, by the computing system, whether the share-option identifier associated with the first vehicle history session is sharing or no-sharing, and
wherein automatically transmitting the report for the first vehicle history session is conditioned on the share-option identifier associated with the first vehicle history session being sharing.

6. The method of claim 5,
wherein the share-option identifier indicates global sharing, domain sharing, or user sharing,
wherein, if the share-option identifier indicates domain sharing, then the metadata further includes a domain identifier of a domain associated with the computing system or a user using the computing system, and
wherein, if the share-option identifier indicates user sharing, then the metadata further includes a user identifier associated with the computing system or a user using the computing system.

7. The method of claim 1, further comprising:
transmitting, by the computing system to the vehicle communications transceiver, a request to scan electronic control units on the vehicle, wherein the request is based on a type of vehicle communications transceiver;
receiving, at the computing system from the vehicle communications transceiver, a vehicle response to the request, the vehicle response including a list of electronic control units disposed on the vehicle; and
receiving, at the computing system, a selection to communicate with one or more electronic control units contained on the list of electronic control units.

8. The method of claim 7, further comprising:
determining, by the computing system, that the computing system is connected to the vehicle;
wherein initiating the first vehicle history session for the vehicle occurs in response to determining that the computing system is connected to the vehicle.

9. The method of claim 1,
wherein the report also includes a second report input,
wherein the second report input includes a second action identifier and a second time stamp corresponding to the second action identifier, wherein the second action identifier is indicative of an action performed by the computing system that does not require sending a vehicle data message to the vehicle, and wherein the second time stamp indicates when a second action of the first vehicle history session was performed.

10. The method of claim 9, wherein the action performed by the computing system that does not require sending a vehicle data message to the vehicle includes adding a note to the report or generating the report.

11. The method of claim 9, wherein the second report input includes a detail correlated with the second action identifier, the second time stamp, or both the second action identifier and the second time stamp.

12. The method of claim 1, wherein the vehicle is associated with a particular vehicle identification number, wherein the computing system includes a display, and wherein the method further comprises:

before initiating or after ending the first vehicle history session, transmitting, by the computing system, a request to search the remote cloud-based non-transitory computer-readable memory to locate all reports for vehicle history sessions pertaining to a selected vehicle identification number, wherein the request includes a share-option identifier associated with the computing system; and displaying, by the computing system on the display, an overview of vehicle history sessions regarding the selected vehicle identification number that is based, at least in part, on a response to the request, wherein the response includes a respective indicator for each of one or more vehicle history sessions regarding the selected vehicle identification number stored at the remote cloud-based non-transitory computer-readable memory, wherein a report associated with each of the one or more vehicle history sessions regarding the selected vehicle identification number includes a share-option identifier that matches the share-option identifier associated with the computing system.

13. The method of claim 12, wherein the overview includes a particular indicator for a particular vehicle history session regarding the selected vehicle identification number, and wherein the method further comprises:

transmitting, by the computing system over the off-board communication network, a request for a particular report that is associated with the particular vehicle history session, wherein the request for the particular report includes the particular indicator; and displaying, by the computing system on the display, the particular report, received in response to the request for the particular report.

14. The method of claim 13, wherein the particular report includes multiple report inputs, and wherein each report input of the particular report is configured to be displayed in a respective row of the particular report arranged as a grid of multiple columns and multiple rows, a respective column of the particular report arranged as the grid of multiple columns and multiple rows, a single display card, or as wizard display page.

15. The method of claim 12, wherein the selected vehicle identification number matches the particular vehicle identification number, wherein the request is transmitted after ending the first vehicle history session, wherein the overview of vehicle history sessions regarding the selected vehicle identification number is further based on one or more vehicle history sessions stored in the memory local to the computing system, wherein the one or more vehicle history sessions stored in the memory local to the computing system include the first vehicle history session, and wherein the method further includes:

generating, by the computing system, the overview, at least in part, by aggregating the respective indicator for each of one or more vehicle history sessions regarding the selected vehicle identification number stored at the remote cloud-based non-transitory computer-readable memory and a respective indicator for each of the one or more vehicle history sessions stored in the memory local to the computing system.

16. The method of claim 15, wherein the overview includes an indicator of the report regarding the first vehicle history session, wherein the method further comprises:

displaying, by the computing system on the display, the report regarding the first vehicle history session, wherein one or more report inputs of the report regarding the first vehicle history session include a particular report input, wherein the particular report input includes a particular action identifier, a particular time stamp correlated with the particular action identifier, and at least a particular summary of a particular detail correlated with the particular action identifier, wherein the particular summary includes a link for accessing at least a portion of the particular detail, wherein displaying the report regarding the first vehicle history session includes displaying the link on the display; and displaying, by the computing system on the display, at least the portion of the particular detail in response to a selection of the link for accessing at least a portion of the particular detail.

17. The method of claim 16, wherein the particular action identifier includes an action identifier associated with requesting life or trip data from the vehicle, wherein at least the portion of the particular detail includes life or trip data the computing system received from the vehicle in response to transmitting a request for life or trip data, and wherein displaying at least the portion of the particular detail includes displaying the life or trip data.

18. The method of claim 16, wherein the particular summary of the particular detail correlated with the particular action identifier includes a link, wherein the method further comprises:

determining, by the computing system, that a selection of the link has occurred while displaying the report for the first vehicle history session; and displaying, by the computing system on the display, a further detail correlated with the particular action identifier.

19. The method of claim 18, wherein displaying the further detail correlated with the particular action identifier includes displaying the further detail correlated with the particular action identifier overlaid upon the report.

20. The method of claim 1, wherein the graphical user interface includes a first user interface, and wherein the method further comprises:
    displaying, on a display of the computing system, a second user interface including a user-selectable control corresponding to a second vehicle history session for a particular vehicle, and
    displaying, on the display in response to a selection of the user-selectable control, a third user interface including the second vehicle history session.

21. The method of claim 20,
    wherein the second vehicle history session was performed prior to the first vehicle history session, and/or
    wherein the second vehicle history session is stored at a server remote from the memory local to the computing system.

22. The method of claim 20, wherein displaying the second vehicle history session includes displaying one or more from among:
    a prior fault set in the particular vehicle,
    a new fault set in the particular vehicle during the second vehicle history session,
    a log note generated during the second vehicle history session,
    a recording of live data generated during the second vehicle history session,
    a time corresponding to starting or stopping the recording of live data,
    a detail based on scanning the particular vehicle for components,
    a detail regarding life or trip data recorded by the particular vehicle,
    a confirmation that a fault code set in the particular vehicle was cleared during the second vehicle history session,
    a confirmation that a programmable vehicle component parameter was changed during the second vehicle history session, or
    a generate report action identifier.

23. The method of claim 21,
    wherein the vehicle is associated with a particular vehicle identification number, and
    wherein the particular vehicle is different than the vehicle associated with the particular vehicle identification number.

24. The method of claim 1, wherein:
    the VCT is connected to the vehicle by a particular vehicle communication interface,
    the method further comprises determining a type of vehicle communication interface of the particular vehicle communication interface,
    determining the type of vehicle communication interface is based on a selection made via a second graphical user interface output by the computing system, and
    the type of vehicle communication interface is selectable via the second graphical user interface because an application driver for the particular vehicle communication interface in stored in the memory local to the computing system.

25. The method of claim 24, wherein the selection made via the second graphical user interface includes a selection of one or more from among:
    an identifier of a vendor of the particular vehicle communication interface,
    a model identifier corresponding to the particular vehicle communication interface, or
    a connection-type identifier that indicates a communication protocol used by the particular vehicle communication interface.

26. The method of claim 1, wherein determining the vehicle communications transceiver is connected to the vehicle network within the vehicle includes the computing system determining the vehicle communications transceiver received a vehicle data message communicated over the vehicle network.

27. The method of claim 1, wherein the vehicle communications transceiver is contained within the computing system or is contained within a vehicle communication interface connected between the computing system and the vehicle.

28. The method of claim 1, wherein initiating the first vehicle history session includes the computing system transitioning from a first state in which the computing system is not waiting for performance of an action of the first vehicle history session to a second state in which the computing system awaits performance of an action of the first vehicle history session.

29. The method of claim 1,
    wherein the vehicle network is configured to carry vehicle data messages according to a particular vehicle data message protocol,
    wherein the first vehicle data message is configured according to the particular vehicle data message protocol, and
    wherein a response to the first vehicle data message is configured according to the particular vehicle data message protocol.

30. The method of claim 1, further comprising:
    receiving, by the computing system, a response to the first vehicle data message,
    wherein the response is sent to the vehicle communications transceiver from the vehicle, and
    wherein determining the first detail corresponding to the first action identifier includes parsing the response to the first vehicle data message.

31. The method of claim 1, wherein performing the first user-requested action of the first vehicle history session includes sending one or more programmable parameters to the vehicle and a request to calibrate a component on the vehicle with the one or more programmable parameters.

32. The method of claim 1, wherein:
    the first vehicle data message includes a programmable parameter for an electronic control unit within the vehicle,
    the first user-requested action includes calibrating the electronic control unit with the programmable parameter to affect a performance of the vehicle,
    the first detail indicates the programmable parameter, and
    the method further comprises:
        determining a different value of the programmable parameter; and
        re-calibrating the electronic control unit with the different value of the programmable parameter.

33. The method of claim 1, wherein completing storage of the report includes adding a line in an extensible markup language file that indicates the report is complete.

34. The method of claim 1,
    wherein generating the metadata includes generating metadata within the file for storing the report, and
    wherein the metadata within the file indicates a vehicle identification number, a timestamp when the first vehicle history session was initiated, and a session identifier corresponding to the first vehicle history session.

35. A computing system comprising:
one or more processors;
a vehicle communications transceiver (VCT); and
a non-transitory computer-readable memory local to the computing system, the memory storing executable instructions, wherein execution of the executable instructions by the one or more processors causes the computing system to perform functions comprising:
receiving, by the VCT, a signal carried over an electrical circuit, wherein the electrical circuit is part of a vehicle network within a vehicle and the signal is arranged as a vehicle data message;
determining, by the computing system, the VCT is connected to the vehicle network by determining the signal is arranged as a first vehicle data message;
initiating, by the computing system in response to determining the computing system is connected to the vehicle network, a first vehicle history session for the vehicle, wherein initiating the first vehicle history session includes generating a file for storing a report regarding the first vehicle history session within the memory, and the computing system transitioning from a first state in which the computing system is not waiting for performance of user-requested actions of the first vehicle history session to a second state in which the computing system awaits performance of user-requested actions of the first vehicle history session and stores report inputs regarding each user-requested action without storing broadcast vehicle data message sent by the vehicle automatically rather than in response to user-requested actions;
generating, by the computing system, metadata regarding the first vehicle history session;
while the computing system operates in the second state, transmitting, by the VCT to the vehicle, a second vehicle data message as part of performing a first user-requested action of the first vehicle history session and determining, by the computing system, a first action identifier, a first time stamp corresponding to the first action identifier, and a first detail corresponding to the first action identifier, wherein the first action identifier corresponds to the second vehicle data message, and wherein the first time stamp indicates a time when the first user-requested action of the first vehicle history session was performed;
determining, by the computing system, the first vehicle history session has ended and completing storage of the report regarding the first vehicle history session within the memory local to the computing system, wherein completing storage of the report includes adding into the report a line indicating completion of the report;
automatically transmitting, by the computing system after completing storage of the report, the report over an off-board communication network for storage at a remote cloud-based non-transitory computer-readable memory, wherein the report transmitted after completing storage of the report includes the line indicating completion of the report, a first report input, and at least a portion of the metadata regarding the first vehicle history session, wherein the first report input includes the first action identifier, the first time stamp, and at least a summary of the first detail corresponding to the first action identifier; and
displaying, on a display, a graphical user interface to show at least a portion of the report for assessing how the vehicle has performed.

36. A non-transitory computer readable memory local to a computing system, the memory having stored therein instructions executable by one or more processors to cause a computing system to perform functions comprising:
receiving, by a vehicle communications transceiver (VCT) of the computing system, a signal carried over an electrical circuit, wherein the electrical circuit is part of a vehicle network within a vehicle and the signal is arranged as a vehicle data message;
determining, by the computing system, the VCT is connected to the vehicle network by determining the signal is arranged as a first vehicle data message;
initiating, by the computing system in response to determining the computing system is connected to the vehicle network, a first vehicle history session for the vehicle, wherein initiating the first vehicle history session includes generating a file for storing a report regarding the first vehicle history session within the memory local to the computing system, and the computing system transitioning from a first state in which the computing system is not waiting for performance of user-requested actions of the first vehicle history session to a second state in which the computing system awaits performance of user-requested action of the first vehicle history session and stores report inputs regarding each user-requested action without storing broadcast vehicle data message sent by the vehicle automatically rather than in response to user-requested actions;
generating, by the computing system, metadata regarding the first vehicle history session,
while the computing system operates in the second state, transmitting, by the VCT to the vehicle, a second vehicle data message as part of performing a first user-requested action of the first vehicle history session and determining, by the computing system, a first action identifier, a first time stamp corresponding to the first action identifier, and a first detail corresponding to the first action identifier, wherein the first action identifier corresponds to the second vehicle data message, and wherein the first time stamp indicates a time when the first user-requested action of the first vehicle history session was performed;
determining, by the computing system, the first vehicle history session has ended and completing storage of the report regarding the first vehicle history session within the memory local to the computing system, wherein completing storage of the report includes adding into the report a line indicating completion of the report;
automatically transmitting, by the computing system after completing storage of the report, the report over an off-board communication network for storage at a remote cloud-based non-transitory computer-readable memory, wherein the report transmitted after completing storage of the report includes the line indicating completion of the report, a first report input, and at least a portion of the metadata regarding the first vehicle history session, wherein the first report input includes the first action identifier, the first time stamp, and at least a summary of the first detail corresponding to the first action identifier; and
displaying, on a display, a graphical user interface to show at least a portion of the report for assessing how the vehicle has performed.

* * * * *